US007769255B2

(12) United States Patent  
Nagy et al.

(10) Patent No.: US 7,769,255 B2
(45) Date of Patent: Aug. 3, 2010

(54) HIGH PORT COUNT INSTANTIATED WAVELENGTH SELECTIVE SWITCH

(75) Inventors: Michael L. Nagy, Lawrenceville, GA (US); Harry W. Presley, Suwanee, GA (US)

(73) Assignee: Olympus Corporation (JP)

( * ) Notice: Subject to any disclaimer, the term of this patent is extended or adjusted under 35 U.S.C. 154(b) by 0 days.

(21) Appl. No.: 12/413,568

(22) Filed: Mar. 29, 2009

(65) Prior Publication Data

US 2009/0232446 A1 Sep. 17, 2009

Related U.S. Application Data

(63) Continuation-in-part of application No. 11/811,928, filed on Jun. 12, 2007.

(60) Provisional application No. 60/857,441, filed on Nov. 7, 2006.

(51) Int. Cl.
*G02B 6/26* (2006.01)
*G02B 6/28* (2006.01)

(52) U.S. Cl. .............................. 385/18; 385/16; 385/22; 385/24; 385/47; 385/48

(58) Field of Classification Search .................. 385/16, 385/18, 22, 24, 47, 48; 359/872, 877
See application file for complete search history.

(56) References Cited

U.S. PATENT DOCUMENTS

| 3,622,792 | A | 11/1971 | Picciniani |
| 4,012,147 | A | 3/1977 | Walrafen |
| 4,076,421 | A | 2/1978 | Kishner |
| 4,655,547 | A | 4/1987 | Heritage et al. |

(Continued)

FOREIGN PATENT DOCUMENTS

| EP | 0 548 830 A1 | 6/1993 |
| JP | 2617054 | 4/1993 |
| WO | WO 2008/057347 | 5/2008 |

OTHER PUBLICATIONS

Timofeev, F.N. et al., "1.5um Free-Space Grating Multi/Demultiplexer and Routing Switch," Electronics Letters, vol. 32, No. 14, pp. 1307-1308, Jul. 4, 1996.

(Continued)

*Primary Examiner*—Charlie Peng
(74) *Attorney, Agent, or Firm*—Balser & Grell IP Law; Mathew L. Grell

(57) ABSTRACT

A high port count instantiated wavelength selective switch comprising two or more discrete sets, or instances, of m fiber ports totaling N fiber ports co-packaged together, one or more shared optical elements and dispersive elements, and one or more steering elements in each instance. The steering elements steer $\lambda_{(k)}$ from each instance of m input fiber ports to a $\lambda_{(k)}$ mirror dedicated to that fiber port instance, and wherein $\lambda_{(k)}$ mirror of the instance of m fiber ports is utilized to select and switch one $\lambda_{(k)}$ from the instance of m fiber ports to a fixed mirror which in turn reflects $\lambda_{(k)}$ to the $\lambda_{(k)}$ output mirror. The $\lambda_{(k)}$ output mirror selects and switches one $\lambda_{(k)}$ from one of the one or more instances of m fiber ports of the N×1 optical switch to the 1 output fiber port for each wavelength, and vice-versa for the 1×N optical switch.

61 Claims, 44 Drawing Sheets

U.S. PATENT DOCUMENTS

| | | | |
|---|---|---|---|
| 4,678,332 A | 7/1987 | Rock et al. |
| 4,790,654 A | 12/1988 | Clarke |
| 4,866,699 A | 9/1989 | Brackett et al. |
| 4,983,039 A | 1/1991 | Harada et al. |
| 5,130,835 A | 7/1992 | Stegmeier |
| 5,166,818 A | 11/1992 | Chase et al. |
| 5,226,099 A | 7/1993 | Mignardi et al. |
| 5,233,405 A | 8/1993 | Wildnauer et al. |
| 5,255,332 A | 10/1993 | Welch et al. |
| 5,305,402 A | 4/1994 | Hill et al. |
| 5,414,540 A | 5/1995 | Patel et al. |
| 5,436,986 A | 7/1995 | Tsai |
| 5,444,801 A | 8/1995 | Laughlin |
| 5,504,575 A | 4/1996 | Stafford |
| 5,581,643 A | 12/1996 | Wu |
| 5,610,757 A | 3/1997 | Ji et al. |
| 5,627,925 A | 5/1997 | Alferness et al. |
| 5,633,755 A | 5/1997 | Manabe et al. |
| 5,671,304 A | 9/1997 | Duguay |
| 5,768,006 A | 6/1998 | Min et al. |
| 5,796,479 A | 8/1998 | Derickson et al. |
| 5,841,917 A | 11/1998 | Jungerman et al. |
| 5,878,177 A | 3/1999 | Karasan et al. |
| 5,920,417 A | 7/1999 | Johnson |
| 6,028,689 A | 2/2000 | Michalicek et al. |
| 6,072,923 A | 6/2000 | Stone |
| 6,097,859 A | 8/2000 | Solgaard et al. |
| 6,204,919 B1 | 3/2001 | Barshad et al. |
| 6,212,309 B1 | 4/2001 | Nguyen et al. |
| 6,259,835 B1 | 7/2001 | Jing |
| 6,263,123 B1 | 7/2001 | Bishop et al. |
| 6,289,145 B1 | 9/2001 | Solgaard et al. |
| 6,327,398 B1 | 12/2001 | Solgaard et al. |
| 6,374,008 B2 | 4/2002 | Solgaard et al. |
| 6,389,190 B2 | 5/2002 | Solgaard et al. |
| 6,393,187 B1 | 5/2002 | Engelberth et al. |
| 6,434,290 B1 | 8/2002 | Berthold |
| 6,456,751 B1 | 9/2002 | Bowers et al. |
| 6,487,334 B2 | 11/2002 | Ducellier |
| 6,507,685 B1 | 1/2003 | Polynkin et al. |
| 6,535,664 B1 | 3/2003 | Anderson |
| 6,539,142 B2 | 3/2003 | Lemoff et al. |
| 6,542,657 B2 | 4/2003 | Anderson |
| 6,543,286 B2 | 4/2003 | Garverick et al. |
| 6,560,384 B1 | 5/2003 | Helkey et al. |
| 6,571,030 B1 | 5/2003 | Ramaswami et al. |
| 6,574,388 B2 | 6/2003 | Laor |
| 6,606,427 B1 | 8/2003 | Graves |
| 6,614,073 B1 | 9/2003 | Sakamoto |
| 6,618,519 B2 | 9/2003 | Chang et al. |
| 6,694,073 B2 | 2/2004 | Golub et al. |
| 6,697,557 B2 | 2/2004 | Mukherjee et al. |
| 6,705,165 B2 | 3/2004 | Garverick et al. |
| 6,707,959 B2 | 3/2004 | Ducellier et al. |
| 6,711,316 B2 | 3/2004 | Ducellier |
| 6,711,320 B2 | 3/2004 | Solgaard et al. |
| 6,728,433 B1 | 4/2004 | Bowers et al. |
| 6,757,458 B2 | 6/2004 | Neilson et al. |
| 6,760,511 B2 | 7/2004 | Garrett et al. |
| 6,782,153 B2 | 8/2004 | Polinsky et al. |
| 6,787,745 B2 | 9/2004 | Hajjar et al. |
| 6,788,981 B2 | 9/2004 | Garverick et al. |
| 6,792,177 B2 | 9/2004 | Welsh et al. |
| 6,798,941 B2 | 9/2004 | Smith et al. |
| 6,798,992 B1 | 9/2004 | Bishop et al. |
| 6,801,684 B2 | 10/2004 | Losch |
| 6,810,165 B2 | 10/2004 | Golub et al. |
| 6,826,330 B1 | 11/2004 | Godil et al. |
| 6,834,136 B2 | 12/2004 | Solgaard et al. |
| 6,842,555 B2 | 1/2005 | Bhattacharya et al. |
| 6,842,556 B2 | 1/2005 | Reznichenko |
| 6,847,749 B1 | 1/2005 | Spremo et al. |
| 6,885,807 B2 | 4/2005 | Riza |
| 6,898,341 B2 | 5/2005 | Huang et al. |
| 6,922,239 B2 | 7/2005 | Solgaard et al. |
| 6,922,529 B2 | 7/2005 | Bortz |
| 6,931,196 B2 | 8/2005 | Livas et al. |
| 6,934,440 B2 | 8/2005 | Dejima et al. |
| 6,952,260 B2 | 10/2005 | Xiao |
| 6,967,718 B1 | 11/2005 | Carlisle et al. |
| 6,980,712 B2 | 12/2005 | Huang et al. |
| 7,024,090 B2 | 4/2006 | Jeantilus et al. |
| 7,060,964 B1 | 6/2006 | Pi et al. |
| 7,149,399 B2 | 12/2006 | Meder et al. |
| 7,265,827 B2 | 9/2007 | Slutter |
| 7,268,869 B2 | 9/2007 | Baluswamy |
| 7,277,608 B2 | 10/2007 | Isomura et al. |
| 7,330,617 B2 | 2/2008 | Aota et al. |
| 7,340,126 B2 | 3/2008 | Mitamura |
| 7,426,347 B2 | 9/2008 | Hnatiw et al. |
| 7,440,648 B2 | 10/2008 | Oikawa et al. |
| 7,440,649 B2 | 10/2008 | Sakai et al. |
| 2002/0001429 A1 | 1/2002 | Milanese et al. |
| 2004/0067014 A1 | 4/2004 | Hollars et al. |
| 2004/0136648 A1 | 7/2004 | Chen et al. |
| 2004/0234226 A1 | 11/2004 | Jeantilus et al. |
| 2005/0220394 A1 | 10/2005 | Yamamoto et al. |
| 2007/0081762 A1 | 4/2007 | Sugiyama et al. |
| 2009/0028502 A1 | 1/2009 | Presley et al. |
| 2009/0103861 A1 | 4/2009 | Presley et al. |
| 2009/0110349 A1 | 4/2009 | Presley |

OTHER PUBLICATIONS

Koga, Masafumi et al., "Design and Performance of an Optical Path Cross-Connect System Based on Wavelength Path Concept," Journal of Lightwave Technology, vol. 14, No. 6, pp. 1106-1119, Jun. 1996.

Koga, Masafumi et al., "8×16 Delivery-and-Coupling-Type Optical Switches for a 320-Gbitls Throughput Optical Path Cross-Connect System," OFC/96 Technical Digest, pp. 259-261, (1996).

Toshiyoshi, Hiroshi et al., "Electrostatic Micro Torsion Mirrors for an Optical Switch Matrix," Journal of Microelectromechanical Systems, vol. 5, No. 4, pp. 231-237, Dec. 1996.

Toshiyoshi, Hiroshi et al., "An Electrostatically Operated Torsion Mirror for Optical Switching Device," presented at Transducer's 95 Eurosensors IX (Conference on Solid State Sensors and Actuator) Stockholm, Sweden, pp. 297-300, Jun. 25-29, 1995.

Okamoto, Satoru et al., "Optical Path Cross-Connect Node Architectures for Photonic Transport Network," Journal of Lightwave Technology, vol. 14, No. 6, pp. 1410-1422, Jun. 1996.

Okamoto, Satoru et al., "Optical Path Cross-Connect Systems for Photonic Transport Networks," NTT Transmission Systems Laboratories, IEEE, pp. 474-480, (1993).

Sato, Ken-ichi et al., "Optical Paths and Realization Technologes," NTT Optical Nework Systems Laboratories, IEEE, pp. 1513-1520, (1994).

Patel, J.S. et al., "Liquid Crystal and Grating-Based Multiple-Wavelength Cross-Connect Switch," IEEE Photonics Technology Letters, vol. 7, No. 5, pp. 514-516, May 1995.

Jeong, et al_., "Comparision of Wavelength-Interchanging and Wavelength-Selective Cross-Connects in Multiwavelength All-Optical Networks," Proceedings of 1996 15th Annual Joint Conference of IEEE Computer and Communications Societies, INFOCOM '96, Pt. 1 (of 3), pp. 156-163, 1996.

Toshiyoshi, Hiroshi et al., "Optical Crossconnection by Silicon Micromachined Torsion Mirrors," IEEE/LEOS 1996 Summer Topical Meetings, Advanced Applications of Lasers in Materials Processing/Broadband Optical Networksl Smart Pixels/Optical MEMs and Their Applications, pp. 63-64, Aug. 5-9, 1996.

T. Gus McDonald et al., "4×4 Fiber Optic Crossbar Switch Using the Deformable Mirror Device," Paper presented at the Spatial Light Modulators and Applications Topical Meeting, pp. 80-83, Sep. 10-12, 1990, Incline Village, NV, IEEE LEOS and OSA Photonics Reports Technical Digest Series, vol. 14, (1990).

Self, S.A., "Focusing of Spherical Gaussian Beams," Applied Optics, vol. 22, pp. 658 (1983).

Wagner, R.E., et al., "Coupling Efficiency of Optics in Single-Mode Fiber Components," Applied Optics, vol. 21, pp. 2671 (1982).

St-Amant, Y., et al., "Intrinsic Properties of the Optical Coupling Between Axisymmetric Gaussian Beams," Applied Optics, vol. 43, No. 30, pp. 5691 (2004).

Light Deflection Principles & Equations:
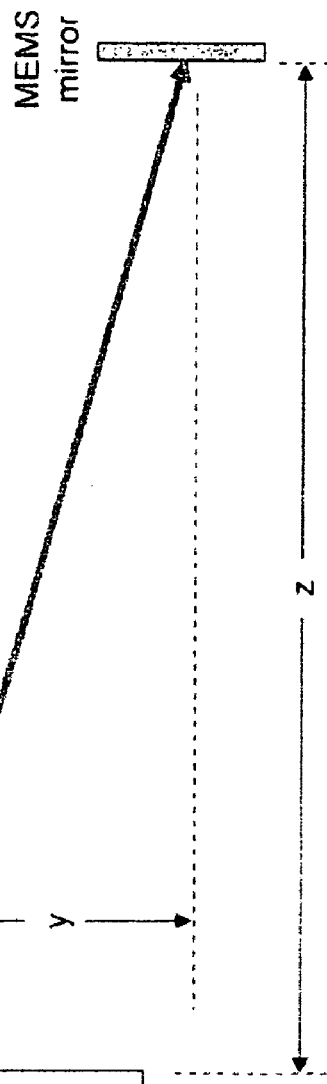
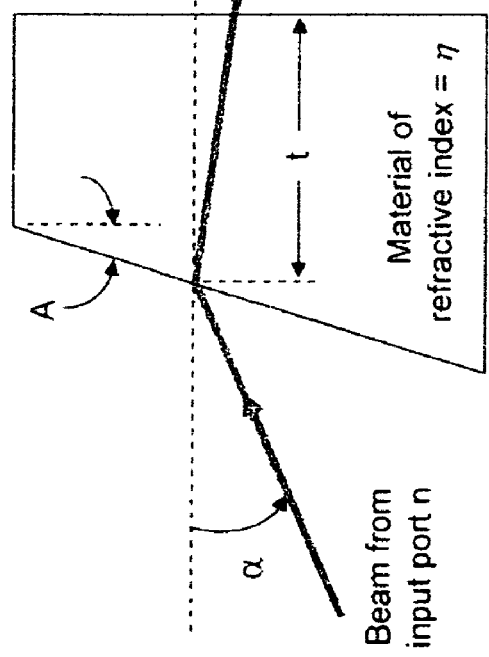
FIG. 3B

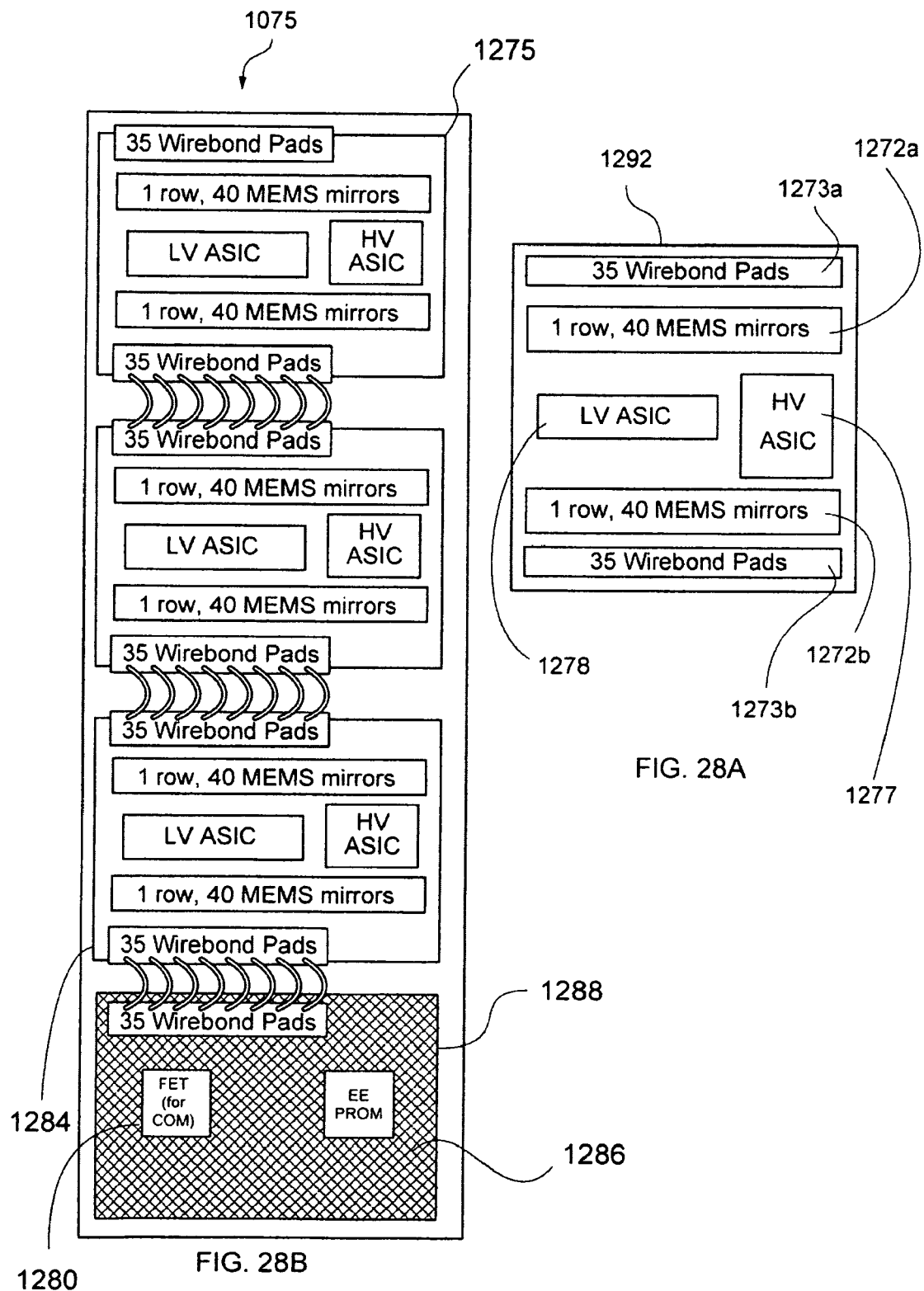

HIGH PORT COUNT INSTANTIATED WAVELENGTH SELECTIVE SWITCH

CROSS-REFERENCE AND PRIORITY CLAIM TO RELATED APPLICATION

To the full extent permitted by law, the present United States Non-Provisional patent application, is a Continuation-in-Part of, and hereby claims priority to and the benefit of, United States Non-Provisional patent application entitled "SEGMENTED PRISM ELEMENT & ASSOCIATED METHODS FOR MANIFOLD FIBEROPTIC SWITCHES," filed on Jun. 12, 2007, having assigned Ser. No. 11/811,928, which claims priority to and the benefit of United States Provisional patent application entitled "SEGMENTED PRISM ELEMENT AND ASSOCIATED METHODS FOR MANIFOLD FIBEROPTIC SWITCHES," filed on Nov. 7, 2006, having assigned Ser. No. 60/857,441; wherein the present application further claims priority to and the benefit of United States Non-Provisional patent application entitled "BEAM STEERING ELEMENT AND ASSOCIATED METHODS FOR MANIFOLD FIBEROPTIC SWITCHES," filed on Oct. 18, 2007, having assigned Ser. No. 11/975,242; United States Non-Provisional patent application entitled "BEAM STEERING ELEMENT AND ASSOCIATED METHODS FOR MANIFOLD FIBEROPTIC SWITCHES AND MONITORING," filed on Oct. 25, 2007, having assigned Ser. No. 11/977,690; United States Non-Provisional patent application entitled "BEAM STEERING ELEMENT AND ASSOCIATED METHODS FOR MIXED MANIFOLD FIBEROPTIC SWITCHES," filed on Oct. 30, 2007, having assigned Ser. No. 11/980,974; and Patent Cooperation Treaty patent application entitled "BEAM STEERING ELEMENT AND ASSOCIATED METHODS FOR MANIFOLD FIBEROPTIC SWITCHES AND MONITORING," filed Oct. 31, 2007 having assigned Serial No. PCT/US07/22955; United States Non-Provisional patent application entitled "WAVELENGTH SELECTIVE SWITCH HAVING DISTINCT PLANES OF OPERATIONS," filed on Jul. 23, 2008, having assigned Ser. No. 12/220,356; United States Non-Provisional patent application entitled "WAVELENGTH SELECTIVE SWITCH WITH REDUCED CHROMATIC DISPERSION AND POLARIZATION-DEPENDENT LOSS," filed on Nov. 4, 2008, having assigned Ser. No. 12/264,716, filed on behalf of inventors Harry Wayne Presley and Michael L. Nagy.

TECHNICAL FIELD

The present invention relates generally to all-optical fiber optic communications and datacom switches, and more specifically pertains to fiber optic switches used in multi-wavelength networks.

BACKGROUND

Modern communications networks are increasingly based on silica optical fiber which offers very wide bandwidth within several spectral wavelength bands. At the transmitter end of a typical point-to-point fiber optic communications link an electrical data signal is used to modulate the output of a semiconductor laser emitting, for example, in the 1525-1565 nanometer transmission band (the so-called C-band), and the resulting modulated optical signal is coupled into one end of the silica optical fiber. On sufficiently long links the optical signal may be directly amplified along the route by one or more amplifiers, for example, optically-pumped erbium-doped fiber amplifiers (EDFAs). At the receiving end of the fiber link, a photodetector receives the modulated light and converts it back to its original electrical form. For very long links the optical signal risks becoming excessively distorted due to fiber-related impairments such as chromatic and polarization dispersion and by noise limitations of the amplifiers, and may be reconstituted by detecting and re-launching the signal back into the fiber. This process is typically referred to as optical-electrical-optical (OEO) regeneration.

In recent developments, the transmission capacity of fiber optic systems has been greatly increased by wavelength division multiplexing (WDM) in which multiple independent optical signals, differing uniquely by wavelength, are simultaneously transmitted over the fiber optic link. For example, the C-band transmission window has a bandwidth of about 35 nanometers, determined partly by the spectral amplification bandwidth of an EDFA amplifier, in which multiple wavelengths may be simultaneously transmitted. All else being equal, for a WDM network containing a number N wavelengths, the data transmission capacity of the link is increased by a factor of N. Depending on the specifics of a WDM network, the wavelength multiplexing into a common fiber is typically accomplished with devices employing a dispersive element, an arrayed waveguide grating, or a series of thin-film filters. At the receiver of a WDM system, the multiple wavelengths can be spatially separated using the same types of devices that performed the multiplexing and then separately detected and output in their original electrical data streams.

Dense WDM (DWDM) systems are being designed in which the transmission spectrum includes 40, 80, or more wavelengths with wavelength spacing of less than 1 nanometer. Current designs have wavelength spacing of between 0.4 and 0.8 nanometer, or equivalently a frequency spacing of 50 to 100 GHz respectively. Spectral packing schemes allow for higher or lower spacing, dictated by economics, bandwidth, and other factors. Other amplifier types, for example Raman, that help to expand the available WDM spectrum are currently being commercialized. However, the same issues about signal degradation and OEO regeneration exist for WDM as with non-WDM fiber links. The expense of OEO regeneration is compounded by the large number of wavelengths present in WDM systems.

Modern fiber optic networks are evolving to be much more complicated than the simple point-to-point "long haul" systems described above. Instead, as fiber optic networks move into the regional, metro, and local arenas, they increasingly include multiple nodes along the fiber span, and connections between fiber spans (e.g., mesh networks and interconnected ring networks) at which signals received on one incoming link can be selectively switched between a variety of outgoing links, or taken off the network completely for local consumption. For electronic links, or optical signals that have been detected and converted to their original electrical form, conventional electronic switches directly route the signals to their intended destination, which may then include converting the signals to the optical domain for fiber optic transmission. However, the desire to switch fiber optic signals while still in their optical format, thereby avoiding expensive OEO regeneration to the largest extent possible, presents a new challenge to the switching problem. Purely optical switching is generally referred to as all-optical or OOO switching optical/optical (OOO).

Switching

In the most straightforward and traditional fiber switching approach, each network node that interconnects multiple fiber links includes a multitude of optical receivers which convert the signals from optical to electrical form, a conventional electronic switch which switches the electrical data signals, and an optical transmitter which converts the switched signals from electrical back to optical form. In a WDM system, this optical/electrical/optical (OEO) conversion must be performed by separate receivers and transmitters for each of the W wavelength components on each fiber. This replication of expensive OEO components is currently slowing the implementation of highly interconnected mesh WDM systems employing a large number of wavelengths.

Another approach for fiber optic switching implements sophisticated wavelength switching in an all-optical network. In a version of this approach that may be used with the present Wavelength Selective Switch (WSS) configuration, the wavelength components W from an incoming multi-wavelength fiber are demultiplexed into different spatial paths. Individual and dedicated switching elements then route the wavelength-separated signals toward the desired output fiber port before a multiplexer aggregates the optical signals of differing wavelengths onto a single outgoing fiber. In conventional fiber switching systems, all the fiber optic switching elements and associated multiplexers and demultiplexers are incorporated into a wavelength selective switch (WSS), which is a special case of an enhanced optical cross connect (OXC) having a dispersive element and wavelength-selective capability. Additionally, such systems may incorporate lenses and mirrors which focus light and lenslets which collimate such light.

Advantageously, all the fiber optic switching elements can be implemented in a single chip of a micro electromechanical system (MEMS). The MEMS chip generally includes a two-dimensional array of tiltable mirrors which may be separately controlled. U.S. Pat. No. 6,097,859 to Solgaard et al., incorporated herein in its entirety, describes the functional configuration of such a MEMS wavelength selective switch (WSS), which incorporates a wavelength from an incoming fiber and is capable of switching wavelength(s) to any one of multiple outgoing fibers. The entire switching array of several hundred micro electromechanical system (MEMS) mirrors can be fabricated on a chip having dimension of less than one centimeter by techniques well developed in the semiconductor integrated circuit industry.

Solgaard et al. further describes a large multi-port (including multiple input M and multiple output N ports) and multi-wavelength WDM wavelength selective switch (WSS), accomplishing this by splitting the WDM channels into their wavelength components W and switching those wavelength components W. The Solgaard et al. WSS has the capability of switching any wavelength channel on any input port M to the output fiber port N, wherein N=1. Moreover, each MEMS mirror in today's WDM wavelength selective switch is dedicated to a single wavelength channel whether it tilts about one or more axes.

As fiber port counts increase, however, the size of the optics of such WDM wavelength selective switches grows quickly. Manufacturing yield for the various components of these larger WDM wavelength selective switches, such as fiber channel array, MEMS mirror array, front end and back end optics, decreases with increased size and complexity resulting in rejection of expensive optical components not meeting full specifications. Thus, as optical components for WDM wavelength selective switches grow in size, performance characteristics, complexity and manufacturing tolerance limits are reached causing yields to decrease. For example, as the size of the device increases, the switching element(s) must provide a greater spatial path deflection of the wavelength components. Where a MEMS mirror array is employed, the increased size of the device requires a larger tilt angle, increasing the complexity and cost of the MEMS mirror array, and resulting in an increased rejection rate. Furthermore, many such WDM wavelength selective switches require elements dedicated to a particular special path, i.e., tuned for a particular fiber port. Such dedicated elements increase costs by virtue of their number, but also typically require extremely high performance characteristics and tight tolerances, which, likewise, increase cost.

EDFAs or other optical amplifiers may be used to amplify optical signals to compensate loss, but they amplify the entire WDM signal and their gain spectrum is typically not flat. Therefore, measures are needed to maintain the power levels of different signals at common levels or at least in predetermined ratios.

Monitoring

Monitoring of the WDM channels is especially important in optical telecommunication networks that include erbium doped fiber amplifiers (EDFAs), because a power amplitude change in one channel may degrade the performance of other channels in the network due to gain saturation effects in the EDFA. Network standard documents, such as the Bellcore GR-2918, have been published to specify wavelength locations, spacing and signal quality for WDM channels within the networks. Network performance relative to these standards can be verified by monitoring wavelength, power and signal-to-noise ratio (SNR) of the WDM channels.

A multi-wavelength detector array or spectrometer may be integrated into the free space of a WSS and utilized to monitor wavelength channels, power and signal-to-noise ratio (SNR) in telecommunication networks. Typically, a portion of the WDM channels are diverted by a splitter or partially reflective mirror to an optical power monitor or spectrometer to enable monitoring of the WDM channels. Each MEMS mirror in today's WDM wavelength selective switch (WSS) is dedicated to a single wavelength channel. Whether it tilts about one or more axes, such mirror may be used to control the amount of optical power passing through WSS for such single wavelength channel. In addition, a detector array or spectrometer may be external to the free space of the WSS or OXC, and may be utilized to monitor white light (combined wavelength channels) power, and signal-to-noise ratio of optical signal via input/output fiber port taps or splitters. More specifically, the prior art consists of costly large two-dimensional detector arrays or spectrometer utilized to monitor multiple input or output wavelength channels, power and signal-to-noise ratio.

Monitoring and switching are part of a feedback loop required to achieve per-wavelength insertion loss control and such systems comprise three classic elements: sensor for monitoring, actuator for multi wavelength switching and attenuating, and processor for controlling wavelength switching, selection and equalization. The actuator in today's WSS products is typically a MEMS-based micromirror or a liquid crystal blocker or reflector. The sensor is typically a modular optical power monitor, comprising a mechanical filter for wavelength selection and a photodetector. Depending on the system, the three elements can be co-located in the same device, or can exist as separate standalone cards connected by a backplane.

In general, higher levels of integration of the sensor, actuator, and processor are attractive from a size, cost, speed, and simplicity of operation standpoint. The proposed new solution reaps these benefits because of a very high level of integration.

Nonetheless, it is readily apparent that there is a recognizable unmet need for an improved WDM wavelength selective switch that allows for increased fiber port counts without substantially increasing the size of the device, and at the same time, reduces the performance requirements and manufacturability for the components thereof, including the switching elements, and wherein the switching node demultiplexes the aggregate multi-wavelength WDM signal from input fibers into its wavelength components, spatially switching one of many single-wavelength components from different input fibers for each wavelength channel, and wherein such switch multiplexes the switched wavelength components to one output fiber for retransmission; and wherein such wavelength components' power may be monitored and varied by controllable attenuation, resulting in a higher level of integration of the sensor, actuator, and processor, thereby enabling multiple switches in a single device capable of utilizing common optical components.

BRIEF SUMMARY

Briefly described in a preferred embodiment, the present invention overcomes the above-mentioned disadvantages and meets the recognized need for such an optical switch by providing a high port count instantiated wavelength selective switch wherein the optical switch is configured either with N input fiber ports and 1 output fiber port (N×1 optical switch) or with 1 input fiber port and N output fiber ports (1×N optical switch), comprising discrete sets, groups, or instances $a_n$ of m fiber ports each, thus totaling N=$a_n$×m fiber ports co-packaged together, and wherein $\lambda_{(k)}$ from each fiber of an instance $a_n$ of m fiber ports is focused on $\lambda_{(k)}$ mirror of the instance $a_n$ of m mirror arrays via the use of shared free space optics; one or more instances of beam steering elements, one or more shared dispersive elements, one or more shared optical elements, one or more instances of shared arrays of micro electromechanical system (MEMS) mirrors having k mirrors in each row (k being the number of lambdas in the optical signal), and one or more instances of fixed mirrors, wherein said one or more steering elements in each instance an simultaneously steers the one $\lambda_{(k)}$ from each of m fiber ports of instance an onto $\lambda_{(k)}$ instance input mirror ($\lambda_{(k)}$ instance input mirror receives one or more of the one $\lambda_{(k)}$ from each of m fiber ports of instance an) of instance an of m fiber ports, and wherein $\lambda_{(k)}$ instance input mirror of instance $a_n$ of m fiber ports is utilized to select and switch one $\lambda_{(k)}$ from one of m fiber ports of instance an to a fixed mirror which in turn reflects $\lambda_{(k)}$ to $\lambda_{(k)}$ output mirror of one output fiber port ($\lambda_{(k)}$ output mirror receives one or more $\lambda_{(k)}$ from one or more instance an), wherein $\lambda_{(k)}$ output mirror for the one output fiber port selects and switches one $\lambda_{(k)}$ from one of one or more instance $a_n$ of m fiber ports of the N×1 optical switch to the one output fiber port for each wavelength k of the one or more instances instance $a_n$ of m fiber ports N×1 optical switch, and vice versa for the 1×N optical switch.

According to its major aspects and broadly stated, the optical switch in its preferred form is a high port count instantiated wavelength selective switch enabled by the beam steering element (BSE) and instances of other high yield optical components, comprising an N×1 or 1×N optical switch, wherein N total fiber ports is comprised of instances $a_n$ of fiber channel arrays (FCAs), each FCA comprising m fiber ports positioned on a precision mount, free space optics (FSO) common to and shared by all instances $a_n$ of FCA (the FSO including but not limited to various lenses and a dispersive element for spatially separating/combining the wavelength components of the aggregate multi-wavelength WDM signal of each fiber m), and a BSE (instance $a_n$) positioned on a precision mount, a row of MEMS mirrors (instance $a_n$) positioned in an array of MEMS mirrors having k mirrors in each row (k being the number of lambdas) whose individual mirrors $\lambda_{(k)}$ correspond to unique wavelengths operating within the WDM network (for example, λ1 instance mirror corresponding to λ1 and receives λ1 from all m fiber ports of instance an, wherein by moving moveable MEMS λ1 instance mirror, the preferred optical path is generated via beam steering between an input fiber port m, λ1 instance mirror selects and switches one λ1 to a fixed mirror corresponding to that instance $a_n$ of m fiber ports, which in turn reflects the selected λ1 from among the m fiber ports to the λ1 mirror for the 1 output fiber port of the N×1 optical switch and vice versa for the 1×N optical switch, this being repeated independently for every wavelength in each instance an of the optical switch, wherein such switch multiplexes the MEMS-steered wavelength components from various one or more instances $a_n$ of m fiber ports to one output fiber port for re-transmission, and wherein the above instantiated select-and-switch functionality is repeated one or more times within the same physical switching device (i.e., common housing) using one array of MEMS mirrors or one or more instances $a_n$ of arrays of MEMS mirrors while simultaneously sharing the other free space optic (FSO) components described above. Analogously, the light direction may be arbitrarily reversed from the above description so that wavelengths may be switched from a single input fiber port to any of a number of output fiber ports (1×N) without restriction on which wavelength is routed to which output port. Alternatively, there may be a mixture of multiple input fiber ports and multiple output fiber ports, with the restriction that there cannot be an arbitrary switching assignment of input ports to output ports within a set or optical switch for any given wavelength.

Accordingly, a feature of the present optical switch is its ability to focus wavelength components of a set from any or all of the m input fiber ports within an instance $a_n$ onto a single MEMS mirror, enabling such mirrors to select the input port wavelength component to be switched to the output fiber port mirror in an N×1 switch, and to do so for one or more instances $a_n$ of m fibers operating independently and in parallel while sharing all FSO components within the same physical housing.

Another feature of the present optical switch is its ability to focus wavelength components from the one or more m input fiber ports instances $a_n$ totaling N fiber ports onto MEMS mirrors, enabling such mirrors to select the output fiber port wavelength component to be switched to the output fiber port in a N×1 switch by simple movement, rotation or tilt of the mirror, wherein the MEMS mirrors are only required to tilt around a single common axis of rotation in order to execute switching commands.

Another feature of the present optical switch is its ability to provide an optical switch comprising two or more instances for switching one or more optical signals, the signals comprising one or more optical wavelengths, each optical wavelength constituting a work piece, the optical switch further comprising:

one or more input fiber ports grouped as a first input fiber port instance of a plurality of instances, each the input fiber port serving as an external interface for introducing the one or more input optical signals into the optical switch;

one output fiber port, the output fiber port serving as an external interface for extracting the output optical signal from the optical switch;

one or more shared optical elements, wherein each of the optical element focuses the optical signals of the one or more input fiber ports and the one output fiber port;

at least one shared wavelength dispersive element for spatially separating at least one first wavelength from one input optical signal of the one or more input optical signals from at least one other wavelength of the one input optical signal of the one or more input optical signals and for recombining at least one first wavelength of a selected input optical signal of the one or more input optical signals with at least one other wavelength of at least one other input optical signal of the one or more input optical signals to form the output optical signal;

one or more fixed mirrors, a first fixed mirror of the one or more fixed mirrors grouped as a first fixed mirror instance of the plurality of instances;

one or more arrayed input switching elements, a first arrayed input switching element of the one or more arrayed input switching elements grouped as a first input switching element instance of the plurality of instances for receiving one wavelength from each of the one or more input fiber ports grouped as a first input fiber port instance of the plurality of instances and for switching one selected wavelength from one of the one or more input fiber ports grouped as a first input fiber port instance of the plurality of instances to the first fixed mirror grouped as a first fixed mirror instance of the plurality of instances;

one or more beam steering elements, a first beam steering element of the one or more beam steering elements grouped as a first beam steering element instance of the plurality of instances configured to position each wavelength from each of the one or more input fiber ports grouped as a first input fiber port instance of the plurality of instances onto a designated input switching element of the first arrayed input switching element grouped as a first input switching element instance of the plurality of instances;

wherein the designated input switching element grouped as a first input switching element instance of the plurality of instances positions one selected wavelength from one of the one or more input fiber ports grouped as a first input fiber port instance of the plurality of instances onto a designated output switching element of an array of output switching elements, via the first fixed mirror;

wherein at least one other the designated input switching element grouped as a second input switching element instance of the plurality of instances positions another one selected wavelength from one of the one or more input fiber ports grouped as a second input fiber port instance of the plurality of instances onto the designated output switching element of an array of output switching elements, via a second fixed mirror of the one or more fixed mirrors grouped as a second fixed mirror instance of the plurality of instances; and wherein the designated output switching element of an array of output switching elements switches one wavelength from one of the one or more input fiber ports grouped as the first input fiber port instance or the second input fiber port instance of the plurality of instances to the one output fiber port.

Another feature of the present optical switch is its ability to provide an optical switch comprising two or more instances for switching one or more optical signals, the signals comprising one or more optical wavelengths, each optical wavelength constituting a work piece, the optical switch further comprising:

one input fiber port, the input fiber port serving as an external interface for introducing one input optical signal into the optical switch;

one or more output fiber ports grouped as a first output fiber port instance of a plurality of instances, each of the output fiber port serving as an external interface for extracting the one or more output optical signals from the optical switch;

one or more shared optical elements, wherein each of the optical element focuses the optical signals of the one input fiber port and the one or more output fiber ports;

at least one shared wavelength dispersive element for spatially separating at least one first wavelength of the input optical signal from at least one other wavelength of the input optical signal and for recombining at least one first wavelength with one output optical signal of the one or more output optical signals with at least one other wavelength of the output optical signal of the one or more output optical signals;

one or more fixed mirrors, a first fixed mirror of the one or more fixed mirrors grouped as a first fixed mirror instance of the plurality of instances;

one array of input switching elements for receiving each wavelength of the one input optical signal from the one input fiber port and for switching at least one wavelength from the input fiber port to the first fixed mirror of the one or more fixed mirrors grouped as a first fixed mirror instance of the plurality of instances;

one or more arrayed output switching elements, a first arrayed output switching element of the one or more arrayed output switching elements grouped as a first output switching element instance of the plurality of instances for receiving at least one wavelength from the first fixed mirror of the one or more fixed mirrors grouped as a first fixed mirror instance of the plurality of instances and for switching the at least one wavelength from the first fixed mirror of the one or more fixed mirrors grouped as a first fixed mirror instance of the plurality of instances to one selected output port of the one or more output fiber ports grouped as a first output fiber port instance of a plurality of instances;

one or more beam steering elements, a first beam steering element of the one or more beam steering elements grouped as a first beam steering element instance of the plurality of instances and configured to position each wavelength from the first arrayed output switching element of the one or more arrayed output switching elements grouped as a first output switching element instance of the plurality of instances to one selected output fiber port of the one or more output fiber ports grouped as a first output fiber port instance of the plurality of instances; and wherein one input switching element of the one arrayed input switching elements and one output switching element of the first arrayed output switching element of the one or more arrayed output switching elements grouped as a first output switching element instance are configured to switch at least one wavelength from the one input fiber port to one selected output fiber port of the one or more output fiber ports grouped as the first output fiber port instance of the plurality of instances.

Another feature of the present optical switch is its ability to provide an optical system comprising two or more optical switches for switching one or more optical signals, the signals comprising one or more optical wavelengths, each optical wavelength constituting a work piece, each optical switch further comprising:

one or more shared optical elements, wherein each of the optical element focuses the optical signals of one or more input fiber ports and one output fiber port for each optical switch of the two or more optical switches;

at least one shared wavelength dispersive element for spatially separating at least one first wavelength from one input optical signal of the one or more input optical signals from at least one other wavelength of the one input optical signal of the one or more input optical signals and for recombining at least one first wavelength of a selected input optical signal of the one or more input optical signals with at least one other wavelength of at least one other input optical signal of the one or more input optical signals to form the output optical signal, wherein the at least one shared wavelength dispersive element is utilized by each of the optical switch of the two or more optical switches;

each of the optical switches comprising a plurality of instances for switching one or more optical signals, each of the optical switches of the two or more optical switches further comprising:

one or more input fiber ports grouped as a first fiber port instance of a plurality of instances, each of the input fiber port serving as an external interface for introducing the one or more input optical signals into the optical switch;

one output fiber port, the output fiber port serving as an external interface for extracting the output optical signal from the optical switch;

one or more fixed mirrors, a first fixed mirror of the one or more fixed mirrors grouped as a first fixed mirror instance of the plurality of instances;

one or more arrayed input switching elements, a first arrayed input switching element of the one or more arrayed input switching elements grouped as a first input switching element instance of the plurality of instances for receiving at least one wavelength from each of the one or more input fiber ports grouped as a first input fiber port instance of the plurality of instances and for switching the at least one selected wavelength from one of the one or more input fiber ports grouped as a first input fiber port instance of the plurality of instances to the first fixed mirror grouped as a first fixed mirror instance of the plurality of instances;

one or more beam steering elements, a first beam steering element of the one or more beam steering elements grouped as a first beam steering element instance of the plurality of instances configured to position each wavelength from each of the one or more input fiber ports grouped as a first input fiber port instance of the plurality of instances onto a designated input switching element of the first arrayed input switching element grouped as a first input switching element instance of the plurality of instances;

wherein the designated input switching element grouped as a first input switching element instance of the plurality of instances positions the at least one selected wavelength from one of the one or more input fiber ports grouped as a first input fiber port instance of the plurality of instances onto a designated output switching element of an array of output switching elements, via the first fixed mirror;

wherein at least one other the designated input switching element grouped as a second input switching element instance of the plurality of instances positions another at least one selected wavelength from one of the one or more input fiber ports grouped as a second input fiber port instance of the plurality of instances onto the designated output switching element of an array of output switching elements, via a second fixed mirror of the one or more fixed mirrors grouped as a second fixed mirror instance of the plurality of instances; and wherein the designated output switching element of an array of output switching elements switches at least one wavelength from one of the one or more input fiber ports grouped as the first input fiber port instance or the second input fiber port instance of the plurality of instances to the one output fiber port.

Another feature of the present optical switch is its ability to provide an optical system comprising two or more optical switches for switching one or more optical signals, the signals comprising one or more optical wavelengths, each optical wavelength constituting a work piece, each optical switch further comprising:

one or more shared optical elements, wherein each of the optical element focuses the optical signals of one input fiber port and one or more output fiber ports for each optical switch of the two or more optical switches;

at least one shared wavelength dispersive element for spatially separating at least one first wavelength of the input optical signal from at least one other wavelength of the input optical signal, wherein the at least one shared wavelength dispersive element is utilized by each of the optical switch of the two or more optical switches;

each of the optical switches comprising a plurality of instances for switching one or more optical signals, each of the optical switches of the two or more optical switches further comprising:

one input fiber port, the input fiber port serving as an external interface for introducing one input optical signal into the optical switch;

one or more output fiber ports grouped as a first output fiber port instance of a plurality of instances, each the output fiber port serving as an external interface for extracting the one or more output optical signals from the optical switch;

one or more fixed mirrors, a first fixed mirror of the one or more fixed mirrors grouped as a first fixed mirror instance of the plurality of instances;

one array of input switching elements for receiving each wavelength of the one input optical signal from the one input fiber port and for switching at least one wavelength from the input fiber port to the first fixed mirror of the one or more fixed mirrors grouped as a first fixed mirror instance of the plurality of instances;

one or more arrayed output switching elements, a first arrayed output switching element of the one or more arrayed output switching elements grouped as a first output switching element instance of the plurality of instances for receiving the at least one wavelength from the first fixed mirror of the one or more fixed mirrors grouped as a first fixed mirror instance of the plurality of instances and for switching the at least one wavelength from the first fixed mirror of the one or more fixed mirrors grouped as a first fixed mirror instance of the plurality of instances to one selected output port of the one or more output fiber ports grouped as a first output fiber port instance of the plurality of instances;

one or more beam steering elements, a first beam steering element of the one or more beam steering elements grouped as a first beam steering element instance of the plurality of instances and configured to position each wavelength from the first arrayed output switching element of the one or more arrayed output switching elements grouped as a first output switching element instance of the plurality of instances to one selected output fiber port of the one or more output fiber ports grouped as a first output fiber port instance of the plurality of instances; and wherein one switching element of the one arrayed input switching elements and one switching element of the first arrayed output switching element of the one or more arrayed output switching elements grouped as a first output switching element instance are configured to switch the at least one wavelength from the one input fiber port to one selected output fiber port of the one or more output fiber ports grouped as the first output fiber port instance of the plurality of instances.

Another feature of the present optical switch is its ability to provide an optical system comprising two or more optical switches for switching one or more optical signals, the signals comprising one or more optical wavelengths, each optical wavelength constituting a work piece, each optical switch further comprising:

one or more shared optical elements, wherein each of the optical element focuses the optical signals for each optical switch of the two or more optical switches;

at least one shared wavelength dispersive element for spatially separating at least one first wavelength of at least one input optical signal from at least one other wavelength of the at least one input optical signal and for recombining at least one first wavelength of at least one output optical signal with at least one other wavelength of the at least one output optical signal; wherein the at least one shared wavelength dispersive element is utilized by each of the optical switch of the two or more optical switches;

a first optical switch of the two or more optical switches comprising a plurality of instances for switching one or more optical signals further comprising:

one or more input fiber ports grouped as a first input fiber port instance of the plurality of instances, each the input fiber port serving as an external interface for introducing the one or more input optical signals into the optical switch;

one output fiber port, the output fiber port serving as an external interface for extracting the output optical signal from the optical switch;

one or more fixed mirrors, a first fixed mirror of the one or more fixed mirrors grouped as a first fixed mirror instance of the plurality of instances;

one or more arrayed input switching elements, a first arrayed input switching element of the one or more arrayed input switching elements grouped as a first input switching element instance of the plurality of instances for receiving at least one wavelength from each of the one or more input fiber ports grouped as a first input fiber port instance of the plurality of instances and for switching the at least one selected wavelength from one of the one or more input fiber ports grouped as a first input fiber port instance of the plurality of instances to the first fixed mirror grouped as a first fixed mirror instance of the plurality of instances;

one or more beam steering elements, a first beam steering element of the one or more beam steering elements grouped as a first beam steering element instance of the plurality of instances configured to position each wavelength from each of the one or more input fiber ports grouped as a first input fiber port instance of the plurality of instances onto a designated input switching element of the first arrayed input switching element grouped as a first input switching element instance of the plurality of instances;

a second optical switch of the two or more optical switches comprising two or more instances for switching one or more optical signals further comprising:

one input fiber port, the input fiber port serving as an external interface for introducing one input optical signal into the optical switch;

one or more output fiber ports grouped as a first output fiber port instance of a plurality of instances, each the output fiber port serving as an external interface for extracting the one or more output optical signals from the optical switch;

one or more fixed mirrors, a first fixed mirror of the one or more fixed mirrors grouped as a first fixed mirror instance of the plurality of instances;

one array of input switching elements for receiving each wavelength of the one input optical signal from the one input fiber port and for switching the at least one wavelength from the input fiber port to the first fixed mirror of the one or more fixed mirrors grouped as a first fixed mirror instance of the plurality of instances;

one or more arrayed output switching elements, a first arrayed output switching element of the one or more arrayed output switching elements grouped as a first output switching element instance of the plurality of instances for receiving the at least one wavelength from the first fixed mirror of the one or more fixed mirrors grouped as a first fixed mirror instance of the plurality of instances and for switching the at least one wavelength from the first fixed mirror of the one or more fixed mirrors grouped as a first fixed mirror instance of the plurality of instances to one selected output port of the one or more output fiber ports grouped as a first output fiber port instance of the plurality of instances;

one or more beam steering elements, a first beam steering element of the one or more beam steering elements grouped as a first beam steering element instance of the plurality of instances and configured to position each wavelength from the first arrayed output switching element of the one or more arrayed output switching elements grouped as a first output switching element instance of the plurality of instances to one selected output fiber port of the one or more output fiber ports grouped as a first output fiber port instance of the plurality of instances; and wherein one input switching element of the first arrayed input switching element of the one or more arrayed input switching elements grouped as a first input switching element instance of the plurality of instances and one output switching element of the array of output switching elements are configured to switch the at least one wavelength from one of the one or more input fiber ports grouped as a first input fiber port instance of the plurality of instances to the one output fiber port for the first optical switch of the two or more optical switches;

wherein one input switching element of the one array of input switching elements and one output switching element of the first arrayed output switching element of the one or more arrayed output switching elements grouped as a first output switching element instance are configured to switch the at least one wavelength from the one input fiber port to one selected output fiber port of the one or more output fiber ports grouped as the first output fiber port instance of the plurality of instances for the second optical switch of the two or more optical switches.

Still another feature of the present optical switch is its ability to provide one or more taps or splitters for coupling power from input and/or output fiber ports.

Yet another feature of the present optical switch is its ability to provide per-wavelength monitoring of input fiber ports utilized to receive tapped or other multi-wavelength WDM signals for the purpose of optical power or other quality-of-signal measurements.

Yet another feature of the present optical switch is its ability to reuse (share) the same free space optics (various lenses, mirrors, front end optics, and back end optics for focusing wavelength components of the aggregate multiwavelength WDM signal, dispersive element for spatially separating/combining the wavelength components of the aggregate multi-wavelength WDM signal) for discrete sets of m fibers (instances); and housing, mounts, and control electronics existing in the same physical housing; enabling architectural flexibility, in that a designer can choose to implement any component in the switch as instantiated or shared, independent of whether other components are instantiated or shared.

Yet another feature of the present optical system is its ability to provide an optical path (i.e., an optical bridge) between two or more switches to create a form of M×N switch.

Yet another feature of the present optical switch is its ability to provide for ganged switching functionality of the instantiated manifold switch, wherein the MEMS mirrors, corresponding to a certain WDM wavelength, are moved, rotated or tilted synchronously between all arrays of MEMS mirrors in the manifold switch, wherein the same switch state is created for all switches in the manifold switch on a per wavelength basis.

Yet another feature of the present optical switch is flexibility wherein an almost limitless range of configurations may be obtained, wherein configuration variations may include number of input and output fiber ports, number of switches in the manifold, number of elements in an instance, uniformity or diversity in instance size, instantiation or sharing of the various components, ganged switching operations, bridging between switches in the manifold, number and spacing of wavelengths in the WDM system, and the like.

Yet another feature of the present optical switch is its ability to be calibrated such that systemic effects are canceled and the switching performance improved, wherein systemic effects to be canceled may include, for example, imperfect MEMS mirrors, assembly and component imperfections, minor misalignments of components, environmental effects, and the like, and wherein the obtained calibration data is stored in an electronic memory that can be accessed in real-time in support of switching control and command.

Yet another feature of the present optical switch is its ability to utilize a single MEMS array of mirrors for selecting at least one wavelength component from any of the discrete sets of m fibers for each wavelength of the multi-wavelength WDM signal, and wherein such switch directs the selected wavelength component to a fixed mirror, which redirects the selected wavelength component to the output mirror array, which redirects the selected wavelength component to the unary output fiber of the N×1 optical switch in the same physical housing.

Yet another feature of the present optical switch is its ability to reduce requirements imposed on system components of an N×1 optical switch by utilizing smaller discrete sets of 'm' fiber FCA, BSE, MEMS array of mirrors as instances replicated '$a_n$' times to form a larger $a_n \times m = N \times 1$ optical switch having higher yield system components.

Yet another feature of the present optical switch is its ability to provide hitless switching due to introduction of two mirrors in to the optical signal light path.

Yet another feature of the present optical switch is its ability to reduce static back reflection, and static in-to-in crosstalk entering into an optical fiber, resulting from unintended optical switch connections, by introducing two mirrors in to the optical signal light path, thus, reducing unintended optical switch connections from input to output fiber.

Yet another feature of the present optical switch is its ability to provide an arced MEMS mirror array design, reducing +/−MEMS mirror tilt range requirements and enabling finer tilt angle resolution and smaller controlled loss increments or power equalization for the required tilt range.

Yet another feature of the present optical switch is its ability to provide MEMS mirrors having pre-angled mirrors, which compensates for asymmetrical differences in +/−MEMS mirror tilt range requirements among the different MEMS arrays, thus allowing a single MEMS mirror design, with uniform tilt requirements, to be fabricated and employed.

Yet another feature of the present optical switch is its ability to provide MEMS mirrors having pre-angled mirror mounts which compensate for asymmetrical differences in +/−MEMS mirror tilt range requirements among the different MEMS arrays, thus allowing a single MEMS mirror design, with uniform tilt requirements, to be fabricated and employed.

Yet another feature of the present optical switch is its ability to provide an optical switch having instances $a_n$ of m fiber ports in a fiber channel array (FCA), m facets in a beam steering element (BSE), and a row of MEMS mirrors for positioning and adjusting shared and instantiated optical components.

Yet another feature of the present optical switch is its ability to provide a combination of fixed and adjustable mounts for shared free space optics and dispersive element, instances of m fiber ports in a fiber channel array (FCA), m facets in a beam steering element (BSE), and a row of MEMS mirrors for positioning and adjusting shared and instantiated optical components.

Yet another feature of the present optical switch, implemented as a co-packaged switch main and monitor switch, is its ability to utilize a second array, or more, of MEMS mirrors for selecting one wavelength component from any of the wavelength components of any of the tapped ports for each wavelength of the multi-wavelength WDM signal, and wherein such monitor switch directs the selected wavelength component to one monitoring output fiber port for optical power monitoring.

Yet another feature of the present optical switch is its ability to provide more MEMS mirrors in an array than there are wavelengths in the WDM network such that various spectral characteristics of the aggregate multi-wavelength WDM signal may be measured when utilizing the switching functionality for monitoring purposes. For example, by placing MEMS mirrors between the mirrors designated for WDM wavelengths a measure of inter-wavelength noise can be obtained, leading to a form of signal-to-noise measurement. Further, by adding even more mirrors to the MEMS array the spectral location of the various multi-wavelength components of the WDM signal may be verified, leading to a form of absolute wavelength measurement.

Yet another feature of the present co-packaged optical switch is its ability to utilize a multi-mode fiber in the co-packaged switch fiber array leading to the photodetector, wherein the larger core of a multimode fiber increases the confidence that the true power of the intended measurement is being captured with sufficient margin for MEMS mirror pointing errors, environmental and aging effects, and the like, wherein the coupling of light from free space into a fiber is vastly less sensitive to positional errors for a multi-mode fiber than for the single-mode fibers typically used for telecom/datacom networks.

Yet another feature of the present co-packaged optical switch is its ability, during signal monitoring, to record the power levels during signal measurement as the associated MEMS mirror is swept through a range of angle on either side of the expected peak power coupling angle, wherein the peak signal recorded during this sweep, or the peak of a curve-fit through the data points so taken, represents the truest measure of the intended signal, wherein the detected peak signal is maximally isolated from the potentially detrimental effects of MEMS mirror pointing errors, environmental and aging effects of the system, and the like.

Yet another feature of the co-packaged optical switch is its ability to provide one or more fiber ports carrying aggregate multi-wavelength WDM signals for the purpose of monitoring the WDM signals, wherein the origin of the WDM signals is arbitrary.

Yet another feature and advantage of the present optical switch is its ability to self-monitor the aggregate multi-wavelength WDM signals at the input and/or output fiber ports of a manifold switch.

Yet another feature of the present optical switch is its ability to monitor signals within fibers, wherein signals to be monitored may be produced by wideband optical power taps placed on the fibers to be monitored, wherein other approaches make only approximate measurements of signals by sampling them in free-space and therefore neglecting free-space-to-fiber coupling effects.

Yet another feature of the present co-packaged optical switch is its ability, with regard to signal monitoring, to be calibrated such that systematic effects are canceled and the measurement accuracy increased, wherein systematic effects to be canceled may include the path-dependent insertion loss of various optical paths through the system, imperfect MEMS mirrors, tap characteristics, assembly and component imperfections, environmental effects, and the like, wherein so obtained calibration data is stored in an electronic memory that can be accessed in real-time in order to provide corrections to signal measurements in real-time.

Yet another feature of the present co-packaged optical switch is its ability to utilize the measurement of power levels of WDM wavelengths obtained via the co-packaged monitoring functionality as a form of feedback to the 1×N or N×1 switch, wherein the insertion loss of each wavelength through the switch may be actively adjusted to correct for mirror movement errors, environmental effects, and the like, or similarly to produce desired spectral distributions of the aggregate multi-wavelength WDM signals (for example, making the power levels of all wavelengths equal via the selective attenuation of every wavelength), wherein the insertion loss of each wavelength is controlled by the movement, rotation or tilting of the associated MEMS mirrors in the 1×N or N×1 mirror array, wherein movement, rotation or tilting the MEMS mirror away from its optimal angle of lowest insertion loss steers the free space beam arriving at the output port(s) and therefore misaligns the beam with respect to the output fiber port(s) and/or fixed mirror (via two MEMS mirrors in the optical path) and introduces progressively larger insertion loss as the MEMS mirror is further tilted.

Yet another feature of the present co-packaged optical switch is its compatibility with using MEMS mirrors that can move, rotate or tilt around two independent axes of rotation, wherein the primary tilt axis is required for fiber-to-fiber switching and the secondary tilt axis may be used for auxiliary purposes, wherein such auxiliary uses of the secondary tilt axis may include insertion loss control, correction of component and assembly imperfections, environmental and aging effects, and the like.

Yet another feature of the present co-packaged optical switch is its ability to provide uniformity of power levels across the WDM spectrum, or other arbitrary spectral distribution, so that dynamic range considerations at receivers and amplifier, non-linear effects, and cross talk impairments can be minimized.

Yet another feature of the present co-packaged optical switch is its ability to provide dynamic feedback control since the various wavelengths vary in intensity with time and relative to changes in optical channel routing history among the components.

Yet another feature of the present co-packaged optical switch is its ability to provide a fiber optic switch with a means of power equalization of wavelengths, and thus provide an aggregate multi-wavelength WDM signal enabling compensation for internal variations of optical characteristics, misalignments, both integral to the device and as a result of both manufacturing and environmental variation, non-uniformity, aging, and of mechanical stress encountered in the switch.

Yet another feature of the present optical switch is its applicability for non-WDM, or "white light" switching devices by the simple removal of the dispersive element and the subsequent simplification of the MEMS array to a single MEMS mirror for each instance $a_n$ of m optical fibers in the manifold system.

These and other features of the present optical switch will become more apparent to one skilled in the art from the following Detailed Description of the Preferred and Selected Alternate Embodiments and Claims when read in light of the accompanying Figures.

BRIEF DESCRIPTION OF THE DRAWINGS

The present version of the invention will be better understood by reading the Detailed Description of the Preferred and Alternate Embodiments with reference to the accompanying drawing figures, in which like reference numerals denote similar structure and refer to like elements throughout, and in which:

FIG. 3B is a schematic illustration of an optical beam steering element and facet angle equations entitled "Light Deflection Principle and Equations";

FIG. 28A is a top view of a block diagram of a wavelength switching assembly module according to an alternate embodiment of the module shown in FIG. 27A;

FIG. 28B is a top view of a block diagram of multiple wavelength switching assembly modules of FIG. 28A mounted and co-packaged on a substrate according to an alternate embodiment;

DETAILED DESCRIPTION OF THE PREFERRED AND SELECTED ALTERNATIVE EMBODIMENTS

In describing the preferred and selected alternate embodiments of the present version of the invention, as illustrated in FIGS. 1-30, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
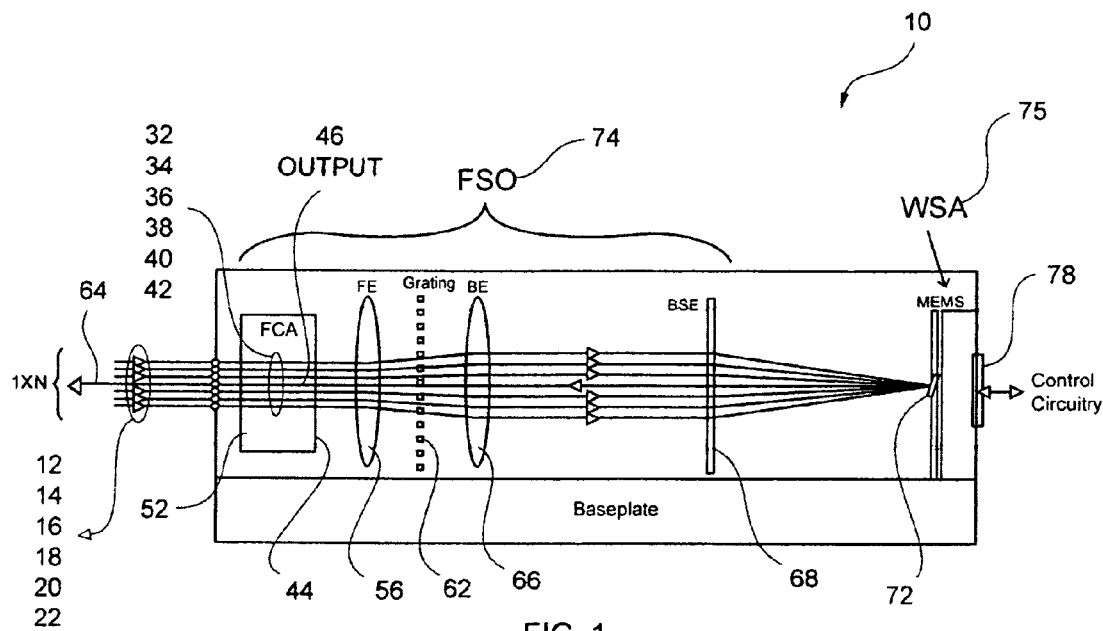
FIG. 1 is a schematic illustration of a six input port by one output fiber port wavelength selective switch (WSS) switch according to an embodiment of the present invention.

Referring now to FIG. 1, there is illustrated a schematic illustration of a six input fiber port by one output fiber port wavelength selective switch 10. However, it is emphasized that this 6×1 embodiment is illustrated only for simplicity, and that by increasing the number of input fiber ports by N, then an N×1 switch 10 is contemplated herein, wherein N represents the number of input fiber ports. Preferably, wavelength selective switch 10 can be operated in either direction, wherein N of N×1 represents N input fiber ports and one output fiber port, or one input port and N output fiber ports. In the preferred 6×1 wavelength selective switch 10 shown in FIG. 1, six input fiber ports 12, 14, 16, 18, 20, 22, and one output fiber port 64 are optically coupled to fiber concentrator array (FCA) 52 (fiber port concentrator), preferably in a linear alignment, wherein preferably all-fibers (alternatively planar waveguides) 32, 34, 36, 38, 40, 42, and 46 are used to bring the respective signals of fiber ports 12, 14, 16, 18, 20, 22 and 64 closer together on output face 44 of fiber concentrator 52 (fiber port concentrator) adjacent the optics. Further, planar waveguides 32, 34, 36, 38, 40, 42, 46 are also preferably used to output the signals in parallel in a predominantly linearly spaced grid, wherein planar waveguides 32, 34, 36, 38, 40, 42 have curved shapes (as shown in FIG. 7) within fiber concentrator 52 and are optically coupled to input fiber ports 12, 14, 16, 18, 20, 22. It is contemplated herein, that a signal, also known as optical signal, may comprise multi-wavelength WDM signals and such signals travel in free space (as beams), fiber, waveguides, and other signal carriers.

Although, other coupling arrangements are possible, preferred fiber concentrator 52 offers some additional advantages over other coupling arrangements. For example, its planar waveguides 32, 34, 36, 38, 40, 42 concentrate and reduce the spacing between input fiber ports 12, 14, 16, 18, 20, 22 from 125 micrometers, representative of the fiber diameters, to the considerably reduced spacing of, for example, 40 micrometers, which is more appropriate for the magnifying optics of switch 10. Each of waveguides 32, 34, 36, 38, 40, 42 is preferably coupled to the respective 12, 14, 16, 18, 20, 22 input fiber port. Waveguides 32, 34, 36, 38, 40, 42 preferably extend along a predominately common plane directing the multi wavelength signals to output in free space and to propagate in patterns having central axis which are also co-planar.

The free-space beams output by waveguides 32, 34, 36, 38, 40, 42 of fiber concentrator 52 are preferably divergent and preferably have a curved field. For simplicity, this discussion will describe all the beams as if they are input beams, that is, output from fiber concentrator 52 to free-space optics (FSO) 74. The beams are in fact, optical fields coupled between optical elements. As a result, the very same principles as those discussed as input beams apply to those of the beams that are output beams which eventually reenter fiber concentrator 52 for transmission onto the network.

The beams output from fiber concentrator 52 into the free space of wavelength selective switch 10 preferably pass through front end optics (FE) 56. Outputs of waveguides 32, 34, 36, 38, 40, 42 of face 44 preferably are placed at or near the focal point of front end optics 56. Front end optics 56 preferably accepts the beams coming from or going to all fibers via input 12, 14, 16, 18, 20, 22 and output 64 fiber ports. For beams emerging from a fiber or input port, front end optics 56 preferably captures, focuses, conditions, projects and/or collimates the light in preparation for spectral dispersion by dispersive element 62. The reverse of this happens for beams converging toward a fiber; that is, the principles of operation are identical in either case, and independent of the direction of the light. It should be noted that common dispersive elements do not operate exactly as shown in FIG. 1, more specifically the input and diffracted beams do not lie in the same plane as shown in FIG. 1.

Figure 8:
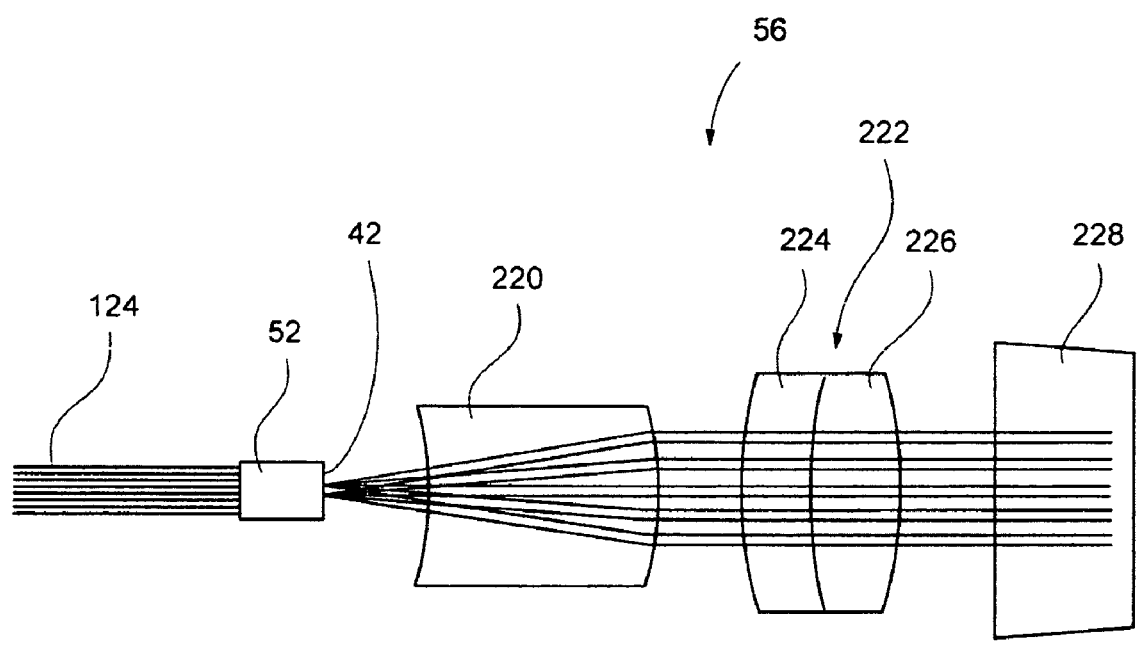
FIG. 8 is a schematic view of the shared front end optics included in the WSS of FIGS. 1 and 2.

Although a single lens is illustrated in FIG. 1, front end optics 56 may generally consist of two or more lenses and/or mirrors or a combination of the same, and may become progressively sophisticated as the demands of wavelength selective switch 10 increases (e.g., the number of fibers, the range of wavelengths, the number of input and output fiber ports, the spacing of the MEMS mirrors, etc.). For example, in a two lens front end optics 56, the first lens (closest to the fibers or input fiber ports) may be used to produce customary flat-field and telecentric beams that easily accommodate simple fiber arrays or fiber concentrator 52, and the second lens may perform the majority of the collimation task (as shown in FIG. 8). As the demands on wavelength selective switch 10 increases, front end optics 56 may further employ advanced features, such as aspheric optical surfaces, achromatic designs, and the like. Unlike traditional approaches wherein a separate lens must be critically aligned to every fiber, front end optics 56 described herein are preferably common to every fiber, thereby enabling a realization of significant savings in assembly time and cost relative to previously known switch systems.

The collimated beams exiting front end optics 56 propagate substantially within a common plane, and are incident upon dispersive element 62, a wavelength dispersive element, wherein dispersive element 62 preferably comprises grating lines extending perpendicular to the principal plane of wavelength selective switch 10. The beams may overlap when they strike dispersive element 62, wherein dispersive element 62 preferably separates the input port beams into corresponding sets of wavelength-separated beams, λ1 through λn (wavelengths) for each input port, where n is the number of wavelengths in each input port. Diffraction grating 62 angularly separates the multi-wavelength input beams into wavelength-specific sub-beams propagating in different directions parallel to the principal optical plane, or alternatively serves to recombine single-wavelength sub-beams into a multi-wavelength beam. Diffraction grating 62 is preferably uniform in the fiber direction, wherein the preferred uniformity allows use of dispersive element 62 for beams to and from multiple input and output fibers.

The line density of dispersive element 62 should preferably be as high as possible to increase spectral dispersion, but not so high as to severely reduce diffraction efficiency. Two serially arranged gratings would double the spectral dispersion. However, a single grating with a line density of approximately 1000 lines/millimeter has provided satisfactory performance. Diffraction grating 62 is preferably aligned so that the beam from front end optics 56 has an incident angle of preferably 54 degrees on grating 62, and the diffracted angle is about 63 degrees. The difference in these angles results in optical astigmatism, which may be compensated by placing a prism between front end optics 56 and dispersive element 62. In brief, the diffraction efficiency of a grating is generally dependent on the characteristics of the polarization of the light with respect to the groove direction on the grating, reaching upper and lower diffraction efficiency limits for linear polarizations that are parallel p-polarization and perpendicular s-polarization to the grooves.

In addition, polarization sensitivity of the grating may be mitigated by introducing a quarter-wave plate (not shown) after dispersive element 62 or elsewhere in switch 10 whose optical axis is oriented at forty-five degrees to the dispersive element limiting diffraction efficiency polarization states described previously. It is contemplated herein that such quarter-wave plate may be placed elsewhere in switch 10. Preferably, every wavelength-separated sub-beam passes twice through the quarter-wave plate so that its polarization state is effectively altered from input to output fiber port. That is, dispersive element 62 preferably twice diffracts any wavelength-specific sub-beam, which has twice passed through the quarter-wave plate. For example, considering the two limiting polarization cases the sub-beam passes once with a first limiting polarization (for example, p-polarization) and once again with a polarization state that is complementary to the first polarization state (for example, s-polarization) from the perspective of dispersive element 62. As a result, any polarization dependence introduced by dispersive element 62 is canceled. That is, the net efficiency of dispersive element 62 will be the product of its S-state and P-state polarization efficiencies, and hence independent of the actual polarization state of the input light.

In the wavelength division multiplexing (WDM) embodiments of the invention, each input fiber port 12, 14, 16, 18, 20, 22 is preferably capable of carrying a multi-wavelength WDM optical signal having wavelengths λ1 through λn. Wavelength selective switch 10 is preferably capable of switching the separate wavelength components from any input port to planar waveguide 46 of fiber concentrator 52, which is preferably coupled to output fiber port 64. This architecture applies as well to a WDM reconfigurable add/drop multiplexer (ROADM), such as a 1×6 ROADM in which fiber ports 12, 14, 16, 18, 20, 22 are associated respectively with the input (IN) (fiber port 12), five (5) DROP ports (fiber ports 14, 16, 18, 20, 22), and output (OUT) (fiber port 64). Or, in the 6×1 ROADM, input disclosed is (IN) (fiber port 12), five (5) ADD ports (fiber ports 14, 16, 18, 20, 22), and output (OUT) (fiber port 64). In operation, fiber ports 14, 16, 18, 20, 22, (local ports) are switched to/from by wavelength selective switch 10, either are added (ADD) to the aggregate output (OUT) port 64 or dropped (DROP) from the aggregate input (IN) port 12.

Back end optics (BE) 66 projects the wavelength-separated beams onto beam steering element (BSE) 68. Back end optics 66 creates the "light bridge" between dispersive element 62 and beam steering element 68 to switching mirror array 72. Considering the case of light diffracting from dispersive element 62 and traveling toward back end optics 66, such back end optics 66 preferably captures the angularly (versus wavelength) separated beams of light, which is made plural by the number of fibers, and wherein back end optics 66 create parallel beams of light. The parallel beams are obtained via a preferred telecentric functionality of back end optics 66. In addition, because all beams are preferably at focus simultaneously on the flat MEMS plane of switching mirror array 72; back end optics 66 preferably performs with a field-flattening functionality. After light reflects off of a MEMS mirror and back into back end optics 66, the reverse of the above occurs; the principles of operation are identical in either case and are independent of the direction of the light. Back end optics 66 preferably captures, focuses, conditions, projects and/or collimates the light in preparation for switching by switching mirror array 72. The reverse of this happens for light beams converging toward a fiber; that is, the principles of operation are identical in either case, and independent of the direction of the light.

Although a single lens is illustrated in FIG. 1, back end optics 66 may generally consist of two or more lenses and/or mirrors or combinations of the same, and may become progressively sophisticated as the demands of wavelength selective switch 10 increases (e.g., the number of fibers, the range of wavelengths, the number of input and output fiber ports, the spacing of the MEMS mirrors, etc.). The focal length of back end optics 66 (or the effective focal length in the case of multiple lenses) is preferably determined from the rate of angular dispersion versus wavelength of dispersive element 62 and the desired mirror spacing of switching mirror array 72. If the angular separation between two neighboring wavelengths is denoted by A and the spacing between their associated MEMS micro-mirrors is denoted by S, then the focal length of back end optics 66 (F) is approximated by F=S/tan (A). Because the angular dispersion of common gratings is relatively small, and/or as the spectral separation between neighboring wavelengths is decreased, then back end optics 66 focal length may become relatively large. Preferably, however, a physically compact optical system may be retained by providing back end optics 66 with a telephoto functionality, thereby reducing the physical length of back end optics 66 by a factor of two or more. A three-lens system is generally sufficient to provide all of the functionalities described above, and the lenses themselves can become increasingly sophisticated to include aspheric surfaces, achromatic design, etc., as the demands of wavelength selective switch 10 increase (e.g., depending on the number of fibers, the range of wavelengths, the number of input and output fiber port, the spacing of the MEMS mirrors, etc.). The focal length calculations set forth here with respect to the back end optics 66 are applicable to the front end optics 56 as well.

Such a preferred multi-lens back end optics 66 system, by virtue of its increased degrees-of-freedom, additionally allows for active optical adjustments to correct for various lens manufacturing tolerances and optical assembly tolerances that otherwise would not be available. Beam steering element 68, although physically existing in the beam path of back end optics 66, is preferably designed utilizing passive monolithic element containing multiple prisms or lenses, as well as stacked lenses, reflective segmented prism elements and the like or combinations of the same and preferably functions almost independently of back end optics 66.

Figure 3A:
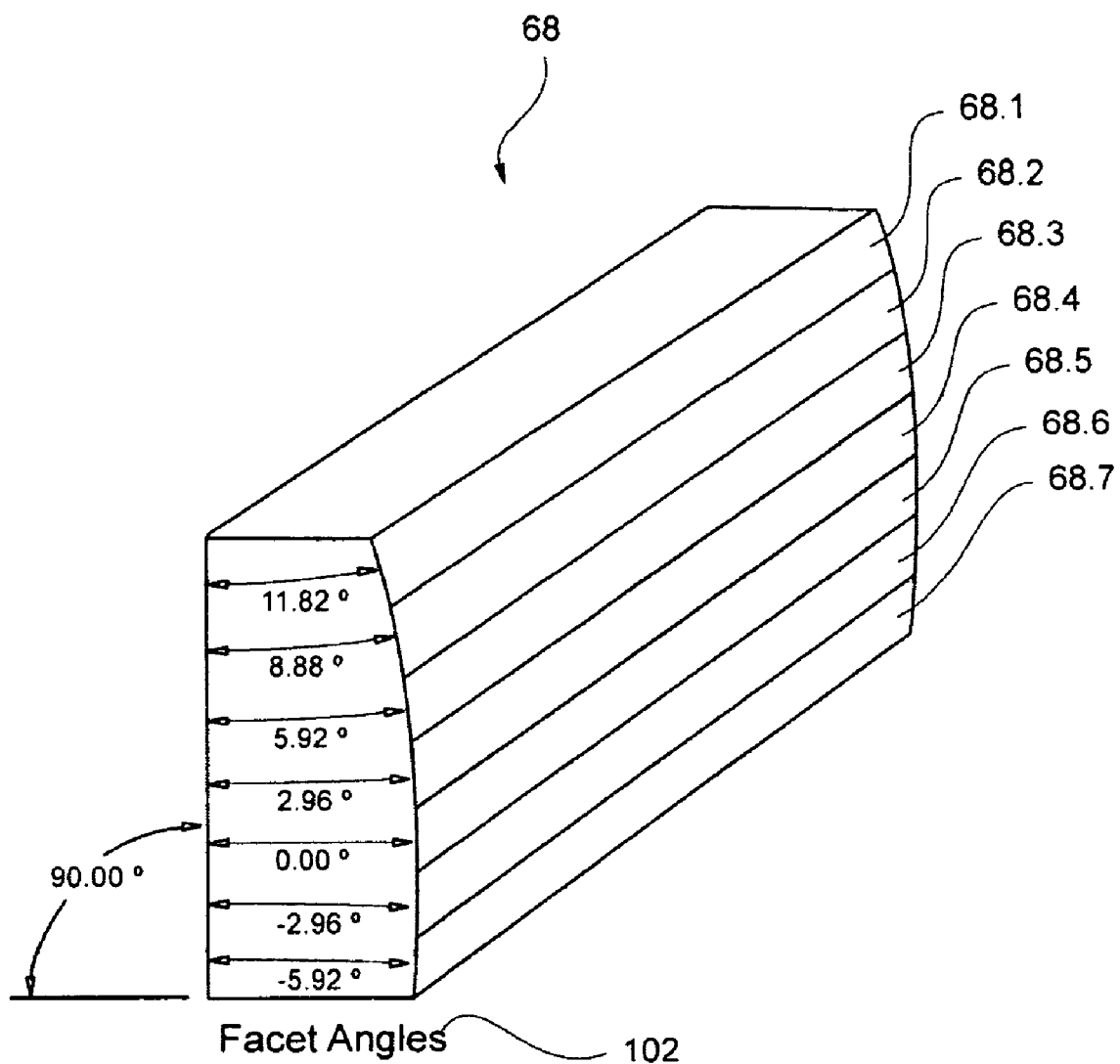
FIG. 3A is a schematic illustration of an optical beam steering element included in the WSS of FIG. 1.

Referring now to FIG. 3A, there is illustrated a schematic illustration of a preferred optical beam steering element included in the WSS of FIG. 1 (the number of segments or facets varies with the number of signals present in the WSS).

Figure 14:
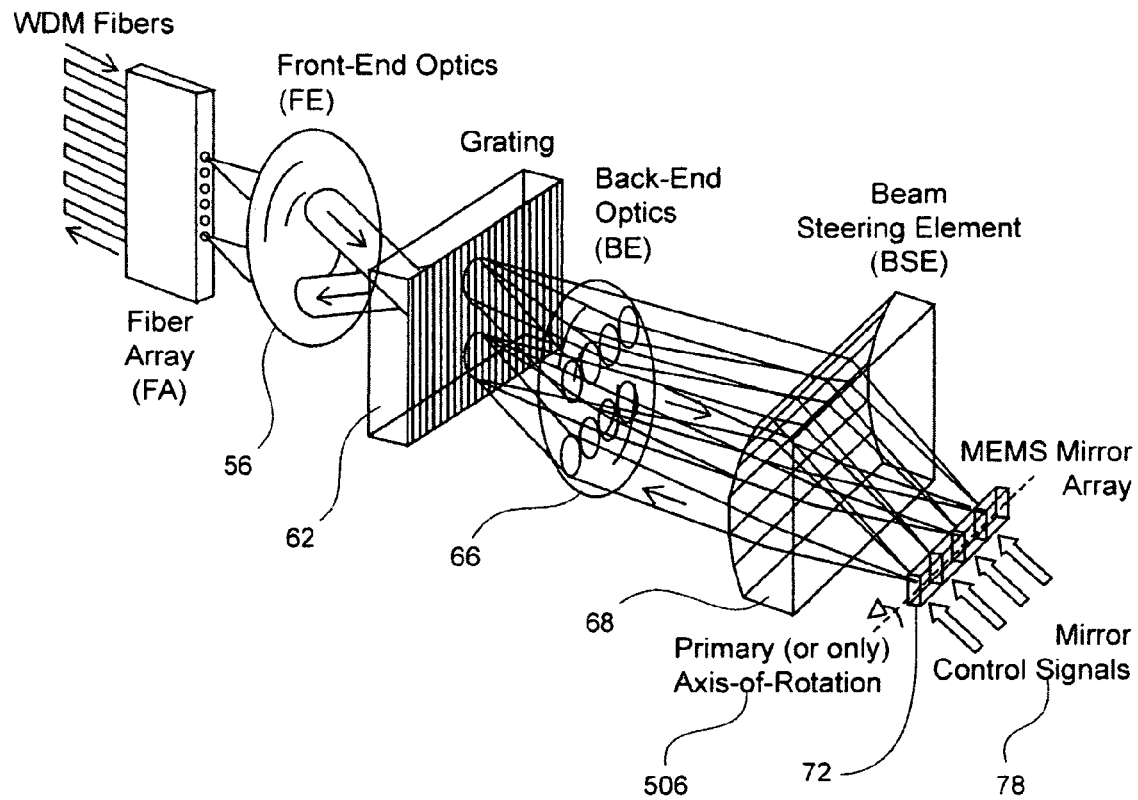
FIG. 14 is a three-dimensional schematic of a wavelength selective switch according to an alternate embodiment of the present invention.
Figure 15:
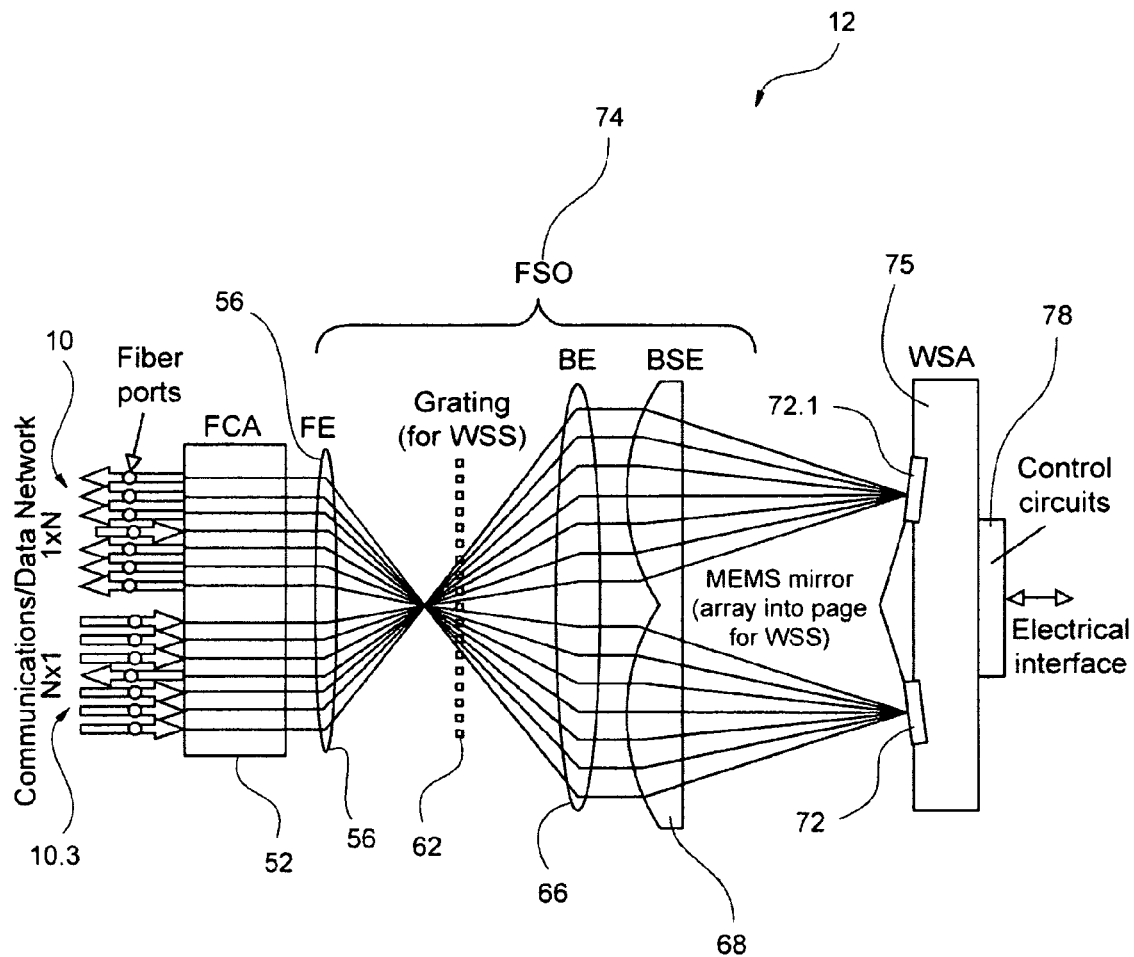
FIG. 15 is a schematic illustration of a wavelength cross-connect with BSE-based architecture for creating manifold switches within the same package switch according to an embodiment of the present invention.

Beam steering element 68 preferably refracts wavelength-separated beams from back end optics 66 and steers such beams onto switching mirror array 72 based on the refractive indices of each segment 68.1-68.7, whether focusing all λn beams on a λn mirror of switching mirror array 72 or focusing some λn beams onto one mirror and other λn beams on another mirror or a mirror in a different row. Beam steering element 68 (or segmented prism element, one possible type of steering element) preferably refracts λn from each input port 12, 14, 16, 18, 20, 22 onto λn mirror of switching mirror array 72 (as shown in FIG. 9C) of switching mirror array 72 assigned to λn. For example, preferably λ1 mirror of switching mirror array 72 has λ1(12)-λ1(22) from all input fiber ports 12-22 projected onto λ1 mirror surface via beam steering element 68, and by moving, rotating or tilting λ1 mirror of MEMS switching mirror array 72, wavelength selective switch 10 preferably switches one selected λ1 (12-22) from input fiber ports 12-22 to output fiber port 64 and blocks the remaining unselected λ1(s) from input fiber ports 12-22, and so forth for λ2-λn. Each λn mirror of switching mirror array 72, in this example, preferably has five input beams projected simultaneously onto the surface of such mirror, all at wavelength λn, wherein those five beams are preferably demultiplexed and focused by free space optics 74 from input fiber ports 12, 14, 16, 18, 20 respectively. It should be recognized that utilizing beam steering element 68 enables refracting and/or steering of multiple wavelengths onto a single mirror from one or more input fiber ports 12-22 or refracting light to any arbitrary point rather than prior art switches, which use lenses or mirrors to focus individual wavelengths to individual dedicated mirrors based on one focal point. Further, it should be recognized that utilizing beam steering element 68 enables multiple N×1 switches to be packaged as a single unit as shown in FIGS. 14 and 15. Still further, it should be recognized that utilizing beam steering element 68 enables the potential elimination of lenslets for each optical fiber port, thereby reducing the number of elements and the overall cost of the switch.

Beam steering element 68 preferably is manufactured from fine-annealed glass with class-zero bubble imperfections whose facets are very finely polished and are coated with anti-reflection material. Further, the type of glass may be chosen to have certain optical properties at the desired wavelengths of operation, including but not limited to optical transparency and refractive index. The angular deflection imparted by each facet 68.1-68.7 of beam steering element 68 is preferably a function of both the angle of the facet and the refractive index of the glass as shown in FIG. 3B—Beam steering Element 68 "Light Deflection Principles and Equations"; hence, in principle beam steering element 68 can be made from a wide variety of glass types. This allows further optimization of the glass material per the criteria of cost, ease of fabrication, etc. As an example, the type of glass known as BK7 is a common high-quality, low cost glass that is preferably suitable for this application.

Another criterion for glass selection may be its change in optical properties relative to temperature. Since the refractive index of all materials changes with temperature, which could in turn produce undesirable changes in the effective facet angles 102 produced by beam steering element 68, then for demanding applications, a glass with a very low thermo-optic coefficient may be chosen at the desired operational temperature range. For example, the common glasses known as K5 and BAK1 have very low thermo-optic coefficients at room temperature. In addition to the precision polishing of the beam steering element 68 from bulk glass, beam steering element 68 may also be fabricated using castable glass materials, such as sol-gel. Prism elements fabricated in such fashion should exhibit improved performance consistency compared with those fabricated using traditional polishing techniques. The materials for fabrication of beam steering element 68 are not limited to glass but may also include high quality plastic materials such as ZEONEX (Zeon Chemicals L.P.). As such, the cost of manufacturing beam steering element 68 may be further lowered by using plastic injection molding techniques.

An alternative to fabricating beam steering element 68 from a single monolithic piece of glass or plastic is to fabricate each facet section, and/or groups of facet sections, individually and then vertically stack them to create a single composite element.

In a preferred embodiment, beam steering element 68 is polished from bulk BK7 glass and has dimensions of length 40 millimeters, height 15 millimeters, width at the base of 4 millimeters and width at the top of 3.18 millimeters. Facet angles 102 for the six input fiber wavelengths and one output fiber wavelength model preferably are 11.82, 8.88, 5.92, 2.96, 0.00, −2.96, −5.92 degrees for each facet 68.1-68.7, respectively. For ease of fabrication so that the edges of adjacent facets are coincident, especially with regard to fabrication by polishing, beam steering element 68 preferably is designed to have varying degrees of thickness for each facet, resulting in the above stated angles of deflection, wherein such angles of deflection preferably position the six input λ1(12)-λ1(22) wavelengths on λ1 mirror and so on for λ2-λn mirrors. It should be noted, however, that beam steering element 68 may be designed and manufactured having facet angles 102 different than set forth herein, depending on the fiber spacing, number of input fiber ports, number of wavelength components per input port, lenses, grating, MEMS mirror configuration, and the like.

Referring again to FIG. 1, the distance between switching mirror array 72, beam steering element 68, and the vertical location of the beam at beam steering element 68, and free space optics 74 as well as other factors including fiber spacing, number of input fiber ports, number of wavelength components per input port, lenses, grating, MEMS mirror configuration and output fiber ports preferably determines the facet angle required to enable all six input port wavelengths to be positioned on each MEMS mirror assigned to the specific wavelength of switching mirror array 72. Because the vertical locations of the various fiber port components are different as they intercept the beam steering element 68, the facet angles of beam steering element 68 preferably vary accordingly in order to combine all of wavelengths λn at a common mirror λn of switching mirror array 72. The analogous situation exists for the selected input port wavelength λn reflecting from mirror λn of switching mirror array 72 directed to output fiber port 64. This is illustrated in FIG. 3B, and wherein the facet angle A can be determined from equation β. In finding the preferred facet angle A from equation β, the known variables are the input beam angle, α, the distance between the input beam vertical location at beam steering element 68 relative to mirror λn of switching mirror array 72, y, and the distance between the beam steering element 68 and the MEMS, z, leaving the only free variable as the refractive index material of beam steering element 68 η. Equation β is transcendental in A and may be solved by iteration or various algorithms.

Figure 2:
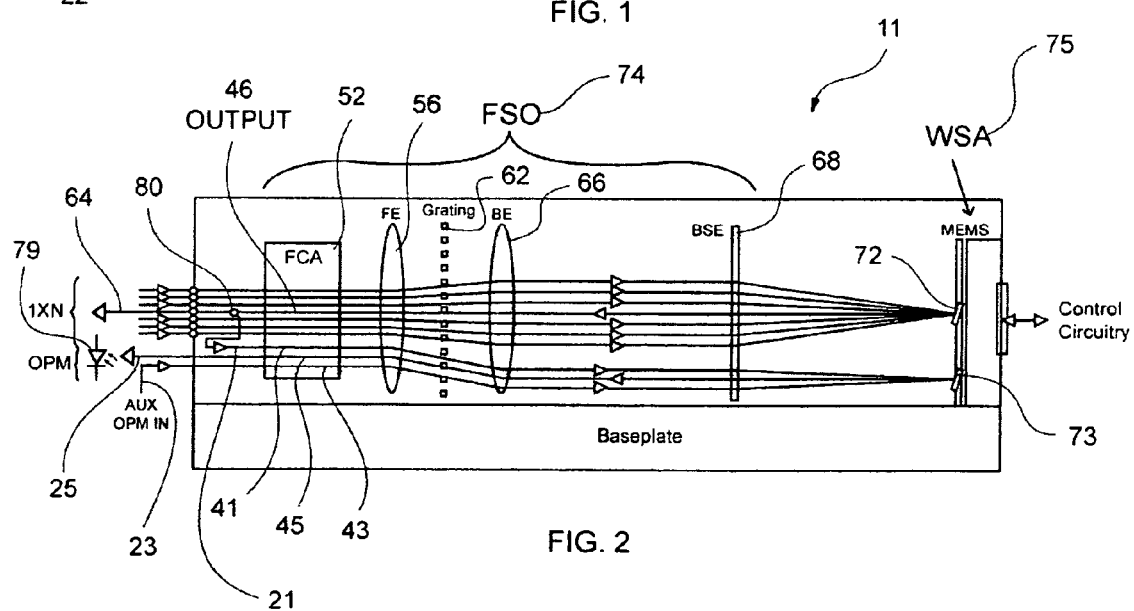
FIG. 2 is a schematic illustration of six input port by one output fiber port, dual channel MEMS mirror, output port taps, monitoring input fiber ports, monitoring output fiber port, and monitor wavelength cross-connect switch according to a preferred embodiment of the present invention.
Figure 4:
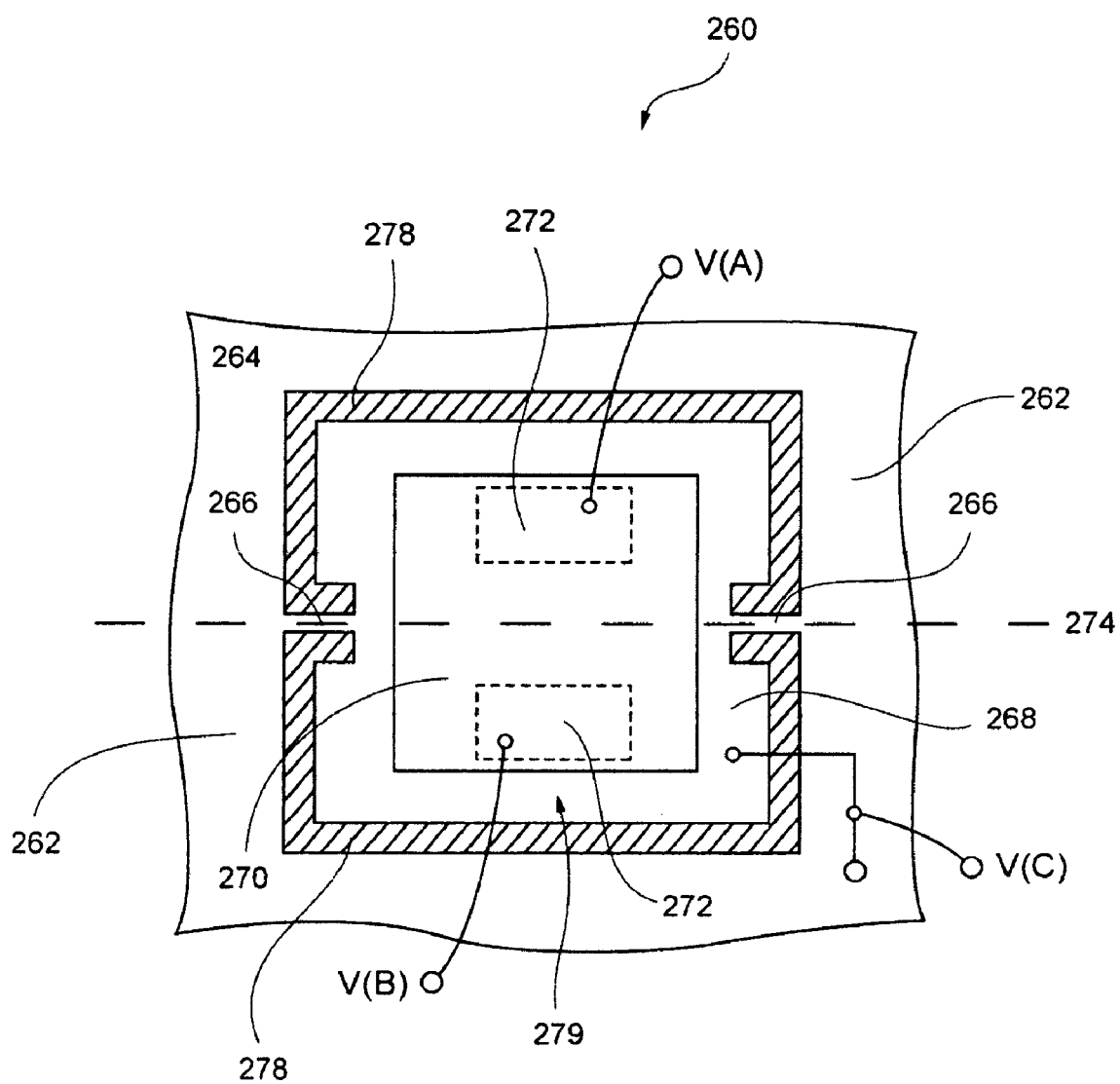
FIG. 4 is a plan view of a single axis moveable mirror useable with the present invention.

Referring now to FIG. 4, there is illustrated a top view of a single axis moveable (moveable means tilting, rotating, sliding or any other movement resulting in a change in the angle of reflection) mirror. Switching mirror array 72 (as seen in FIGS. 1 and 2) is preferably formed as a two-dimensional array (preferably two rows of 40 mirrors) of single-axis moveable mirrors, with one mirror, single cell (mirror) 260 of switching mirror array 72. Cell 260 is one of many such cells arranged typically in a two-dimensional array in a bonded structure including multiple levels of silicon and oxide layers in what is referred to as multi-level silicon-over-insulator (SOI) structure. Cell 260 preferably includes frame 262 supported in support structure 264 of switching mirror array 72. Cell 260 further includes mirror plate 268 having reflective surface 270 twistably supported on frame 262 by a pair of torsion beams 266 extending from frame 262 to mirror plate 268 and twisting about axis 274. In one MEMS fabrication technique, the illustrated structure is integrally formed in an epitaxial (epi) layer of crystalline silicon. The process has been disclosed in U.S. Provisional Application Ser. No. 60/260,749, filed Jan. 10, 2001, (now abandoned) is incorporated herein by reference in its entirety. However, other fabrication processes resulting in somewhat different structures may be used without affecting or departing from the intended scope of the present invention.

Mirror plate 268 is controllably tilted about axis 274 in one dimension by a pair of electrodes 272 under mirror plate 268. Electrodes 272 are symmetrically disposed as pairs across axis 274 respective torsion beams 266. A pair of voltage signals V(A), V(B) is applied to the two mirror electrodes 272, while a common node voltage signal V(C) is applied to both mirror plate 268 and frame 262.

Circumferentially lateral extending air gap 278 is preferably defined between frame 262 and mirror plate 268 so that mirror plate 268 can rotate with respect to frame 262 as two parts. Support structure 264, frame 262, and mirror plate 268 are driven by the common node voltage V(C), and electrodes 272 and mirror plate 268 form plates of a variable gap capacitor. Although FIG. 4 illustrates the common node voltage V(C) being connected to mirror plate 268, in practice, the electrical contact is preferably made in support structure 264 and torsion beams 266 apply the common node voltage signal to both frame 262 and mirror plate 268, which act as a top electrode. Electrical connectivity between frame 262 and mirror plate 268 can be achieved through torsion beams 266 themselves, through conductive leads formed on torsion beams 266, or through a combination of the two. Electrodes 272 are formed under mirror plate 268 and vertical air gap 279 shown into the page is further defined between electrodes 272 and mirror plate 268 and forms the gap of the two capacitors.

Torsion beams 266 act as twist springs attempting to restore mirror plate 268 to its neutral position. Any potential difference applied across electrode 272 and mirror plate 268 exerts an attractive force acting to overcome torsion beams 266 and to close the variable gap 279 between electrodes 272 and mirror plate 268. The force is approximately linearly proportional to the magnitude of the applied voltage, but non-linearities exist for large deflections. The applied voltage can be a DC drive or an AC drive per U.S. Pat. Nos. 6,543,286 and 6,705,165 issued to Garverick et al. set forth below. In practice, the precise voltages needed to achieve a particular are experimentally determined.

Because each of two electrodes 272 forms a capacitor with mirror plate 268, the amount of tilt is determined by the difference of the RMS voltages applied to the two capacitors of the pair. The tilt can be controlled in either direction depending upon the sign of the difference between the two RMS voltages applied to V(A) and V(B).

It is contemplated herein that changing the angle of reflection may be accomplished by various other means other than moving, rotating, tilting a moveable mirror, including, but not limited to, translational motion of a fixed angled mirror, translational motion of a an element with multiple fixed angled mirrors and the like.

It is further contemplated herein that forces to accomplish movement of the moveable mirror or other means of reflection other than electrostatic, including, but not limited to, magnetic, thermally activated, piezoelectric, piezoreistant, and the like.

Referring again to FIG. 1, there are many ways of configuring the MEMS array of micromirrors and their actuation as wavelength switching assembly (WSA) 75. The following is an example: The MEMS array may be bonded to and have an array of solder bumps contacting it to control circuitry 78, preferably including high-voltage circuitry needed to drive the electrostatic actuators associated with each of the mirrors. Control circuitry (controller) 78 controls the driver circuit and hence the mirrors in a multiplexed control system including address lines, data lines, and a clock line, driven in correspondence to an oscillator. The control is preferably performed according to pulse width modulation (PWM), a method for controlling the mirror tilt, as Garverick has described in U.S. Pat. Nos. 6,543,286, issued Apr. 8, 2003, and 6,705,165, issued Mar. 16, 2004, incorporated herein by reference in their entirety. In these methods, a high-voltage square-wave common node drive signal is supplied through one or more power transistors to the common electrical node comprising all the mirrors while the driver array delivers phase delayed versions of the square-wave signal to each individual electrode, the amount of delay determining the RMS voltage applied across the electrostatic actuator electrodes of each mirror. In addition, Garverick has described in U.S. Pat. No. 6,788,981, issued Sep. 7, 2004 and incorporated herein by reference in its entirety, a method wherein an analog control system for an array of moveable mechanical elements, such as moveable mirrors, formed in a micro electromechanical system (MEMS) is disclosed.

Control circuitry 78 preferably receives switch commands from the external system to effect switching of the wavelength separated channels between the input and output fibers. Preferably, the drive voltage pulse widths that correspond to mirror angles needed for switching, which is primarily representative of the physical characteristics of the MEMS array and its driver circuit, may be stored in an electrically programmable read-only memory.

Referring to FIGS. 1 and 4, the angle of a mirror in switching mirror array 72 is preferably actively tilted by control circuitry 78 applying a voltage V(A), V(B) to electrodes 272 of switching mirror array 72 so that the selected input port sub-beam λn is preferably reflected to land precisely at the center of concentrator waveguide 46 associated with the particular output fiber port 64 after retracing its path through free space optics 74. The mirror is preferably actively tilted by control circuitry 78 to the required angle such that the sub-beam, after reflection off the mirror, is properly aligned to planar waveguide 46 associated with output fiber port 64. Preferably, cell 260 (λ1 mirror) assigned to λ1 of switching mirror array 72 tilts its mirror plate 268, which has projected on its reflective surface 270 λ1(12)-λ1(22) from the six input fiber ports 12-22, and by control circuitry 78 applying a predetermined voltage V(A), V(B) to electrodes 272 of switching mirror array 72, tilts mirror plate 268 thereby selecting λ1 from any of the six input fiber ports 12-22 (the other λ1(s) being not selected are reflected into free space) and the selected λ1 is reflected to land precisely at the center of planar waveguide 46 associated with output fiber port 64 after retracing its path through free space optics 74. Wavelength selective switch 10 switches one selected λ1 from input fiber ports 12-22 to output fiber port 64 and blocks the remaining unselected λ1(s) from input fiber ports 12-22, and so forth for λ2-λn.

The described embodiment was based on 40 channels (n=40) in the ~1530-1562 nanometer band. However, the design is easily adapted to conform to various regions of the optical spectrum, including S-band, C-band, and L-band, and to comply with other wavelength grids, such as the 100 GHz, 50 GHz, etc. grids published by International Telecommunication Union (ITU).

The described design provides several advantages for facilitating its easy insertion into WDM systems of either a few wavelengths, or for dense WDM (DWDM) systems having many wavelengths. For example, the design of the present invention produces lower polarization mode dispersion (PMD) and low chromatic dispersion relative to previous designs. Low PMD and chromatic dispersion naturally follows from the free-space optics.

Other types of MEMS mirror arrays may be used, including dual axis gimbal structure cells, those relying on flexing elements other than axial torsion beams, and those moving in directions other than tilting about a central support axis. In particular, dual axis gimbaled mirrors facilitate hitless switching in regards to 1×N mode of operation. Wavelength dispersive elements other than diffraction gratings also may be used. The concentrator, although important, is not crucial to many of the aspects of the invention. Further, the concentrator may be implemented in an optical chip serving other functions such as amplification, splitting or wavelength conversion.

It is contemplated in an alternate embodiment that switching mirror array 72 could be replaced with other optical switching elements such as liquid crystal, liquid crystals on silicon, a liquid crystal array, ink jet, mechanical, thermal, nonlinear, acousto-optic elements, amplifier and attenuators or the like known by one of ordinary skill in the art.

It is further contemplated that depending on the switching element in use such switching element may position, configure, change, change state, actuate, command, tilt, rotate, phase delay, or the like known by one of ordinary skill in the art.

A white-light cross connect, that is, an optical switch that switches all λs on a given fiber together, can be adapted from the system of FIGS. 1-5 by eliminating the dispersive element or DeMux/Mux. Although the invention has been described with respect to a wavelength selective switch, many of the inventive optics can be applied to white-light optical cross connects that do not include a wavelength dispersive element. Although moveable micromirrors are particularly advantageous for the invention, there are other types of MEMS mirrors than can be electrostatically, electrically, magnetically, thermally, or otherwise actuated to different positions or orientations to affect the beam switching of the invention.

Referring now to FIG. 2, a schematic illustration of a six input fiber port by one output fiber port with integrated optical switching and monitoring system 11 is shown. Optical switching and monitoring system 11 preferably includes elements and configuration of switch 10 including six input fiber ports 12, 14, 16, 18, 20, 22, additionally auxiliary monitoring fiber port 23, fiber concentrator array (FCA) 52, planar waveguides 32, 34, 36, 38, 40, 42, additionally 41, 43 and 45, FSO 74 including front end optics (FE) 56, dispersive element 62, back end optics (BE) 66, beam steering element (BSE) 68, switching mirror array 72, control circuitry 78, WSA 75, output fiber port 64 and output monitoring fiber port 25.

According to a preferred embodiment of the invention, optical switching and monitoring system 11 is incorporated preferably by fabricating output tap 80 and planar waveguide 41 into fiber concentrator 52, whereby tap 80 preferably couples about 10% of the optical power from output fiber port 64 of planar waveguide 46 into planar waveguide 41 which directs the multi wavelength output beam to output in free space and propagate in a pattern having a central axis which is parallel with the central axis of outputs from waveguides 32, 34, 36, 38, 40, 42 of FIG. 1 in free space optics 74.

Alternatively, an optical switching and monitoring system with feedback monitoring of the output fiber may be implemented externally (off-board of the optical switching and monitoring system 11) by fusing or splicing the output fiber with a monitoring fiber or via use of face plate connector and a splitter or jumper to couple about 10% of the optical power from output fiber port 64 fiber into monitoring fiber port 21, which is coupled to planar waveguide 41. Planar waveguide 41 outputs its multi-wavelength beam in free space propagating in a pattern having a central axis which is parallel with the central axis of outputs from waveguides 32, 34, 36, 38, 40 in free space optics 74.

Optical switching and monitoring system 11 preferably includes auxiliary monitoring fiber port 23 which is preferably coupled to planar waveguide 43, and preferably outputs its multi-wavelength beam in free space propagating in a pattern having a central axis which is parallel with the central axis of outputs from waveguides 32, 34, 36, 38, 40, 41, 42, 43 in free space optics 74, thus enabling an auxiliary multi-wavelength beam to be monitored by optical switching and monitoring system 11. An external signal not found on input fiber ports 12, 14, 16, 18, 20, 22 may be input into auxiliary monitoring fiber port 23 and optical switching and monitoring system 11 may be utilized to monitor or read the power of each wavelength of a multi-wavelength beam input on auxiliary monitoring fiber port 23, and to output such data to a user interface (User i/f) port 77 shown in FIGS. 5A and 5B. It is contemplated herein that more than one auxiliary monitoring port may be provided in a similar fashion.

Free space optics 74 preferably position the two multi-wavelength beams of monitoring fiber ports 21 and 23 propagating from planar waveguides 42 and 43 onto monitoring mirror array 73 second row (row B). Cell 260 assigned to λ1 mirror of monitoring mirror array 73 tilts its mirror plate 268 (shown in FIG. 4), which has projected on its reflective surface 270 λ1(21) and λ1(23) from the two monitoring fiber ports 21 and 23 and by control circuitry 78 applying a voltage V(A), V(B) to electrodes 272 of monitoring mirror array 73 tilting mirror plate 268 selects λ1 either from monitoring fiber port 21 or 23 (the other λ1 being not selected is reflected away from the waveguides) and the selected λ1 is preferably reflected to land precisely at the center of concentrator waveguide 45 associated with the particular output monitoring fiber port 25 after retracing its path through free space optics 74.

Optical switching and monitoring system 11 is capable of simultaneously switching one selected λ1 from input fiber ports 12-22 to output fiber port 64 and blocking the remaining unselected λ1(s) from input fiber ports 12-22, and so forth for λ2-λn, and switching one selected λ from monitoring fiber ports 21 and 23 to output monitoring fiber port 25 and blocking the remaining unselected λ from monitoring fiber ports 21 or 23 as well as all other λs from monitoring fiber ports 21 and 23 and so forth for λ2-λn individually. Output monitoring fiber port 25 preferably receives the selected single wavelength λ switched by MEMS mirror array 73 (row B) after it has passed through free space optics 74. Output monitoring fiber port 25 preferably is coupled to optical power monitor 79.

Power monitor (optical measurement device) 79 preferably is a photodiode, preferably measuring the power level of wavelength λn switched by monitoring mirror array 73 (row B), measuring one wavelength at a time. As monitoring mirror array 73 (row B) selects wavelength λn and routes it to waveguide 45 coupled to output monitoring fiber port 25, power monitor 79 preferably measures the power of such wavelength λn. Alternatively, power monitor 79 may be any type of optical measuring device, for example a device capable of measuring power of one or more wavelengths by scanning the multi-wavelength components, determining signal to noise ratios by spectrum analyzing the wavelength bandwidth, measuring polarization-dependent properties, and the like. The optical intensities for all wavelength-separated signals are preferably converted to analog or digital form by power monitor 79 and supplied to control circuitry 78, which preferably adjusts switching mirror array 72 as set forth herein to adjust the power of wavelength λn to conform to one or more predetermined criteria.

Other forms of power monitoring are possible as long as the time necessary for resolutions of differences in wavelength channel power levels is sufficient for power adjustments. If the adjustments are intended to only address aging and environmental effects, the resolved measurement time may be relatively long. On the other hand, fast feedback may be necessary for initializing switch states, for compensating for transient changes in power level such as occur from the combination of polarization-dependent loss and polarization fluctuations which vary at the wavelength level, for stabilizing against vibration, and for alarm signaling to protection circuitry and for network fault recovery. Moreover, by replacing photodetector 79 with other commercially available devices, other parameters may be measured such as optical signal to noise ratio (OSNR), center wavelength, transient behavior, or bit error rate.

Moreover, various configurations of optical switching and monitoring system 11 are contemplated herein, including taps or splitters for all or a selected number of input and output fiber ports, including their associated planar waveguide, free space optics, MEMS mirrors and the like.

Figure 5A:
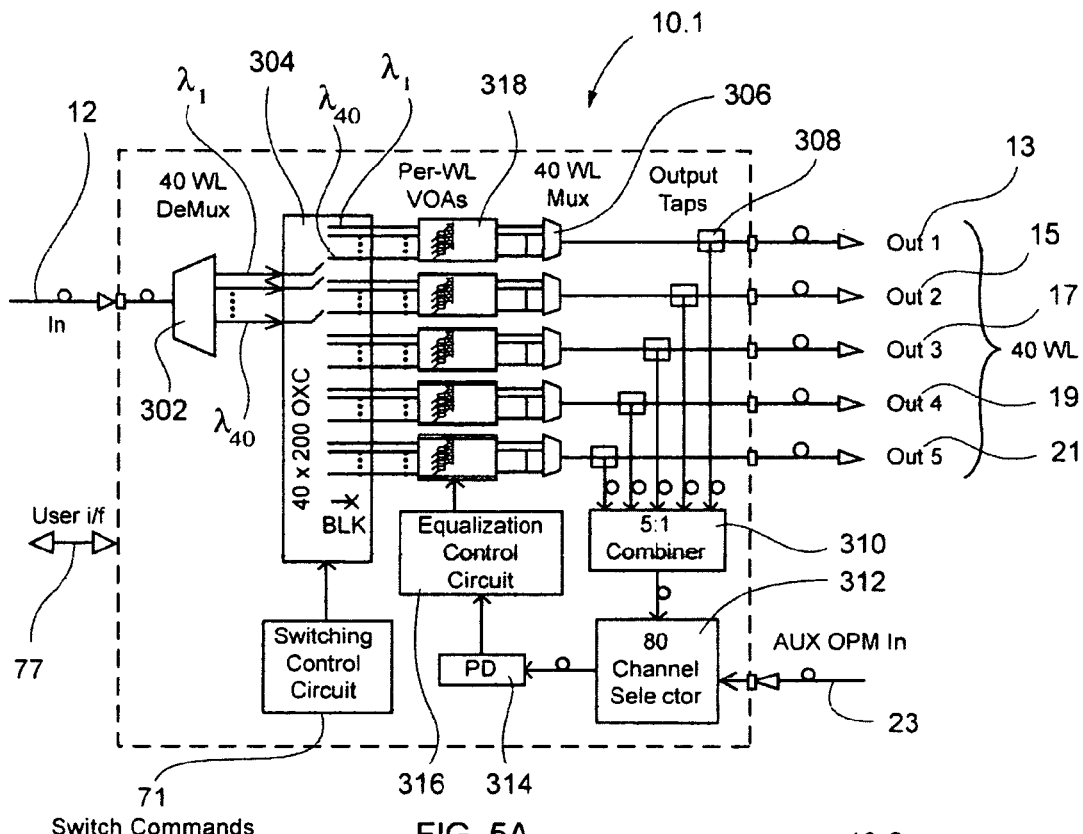
FIG. 5A is a functional block diagram of a one input port by five output fiber port wavelength selective switch with power monitor and feedback control according to an alternate embodiment of the present invention.

Referring now to FIG. 5A, a functional block diagram of a one input port by five output fiber port 1×N (N=5) optical switching and monitoring system 10.1 wavelength selective switch with power monitor and feedback control is illustrated according to an alternate embodiment of the present invention. In optical switching and monitoring system 10.1, forty wavelengths enter input port (In) 12 and are demultiplexed (DeMux) 302 into forty separate wavelengths λ1-λ40, the optical cross-connect (OXC) 304 switches the forty wavelengths, multiplexes (Mux) 306, and outputs the forty wavelengths to their switch selected output (Out 1-5) 13, 15, 17, 19, 21. Forty wavelengths in and forty wavelengths out; however, the forty wavelengths out are distributed across the output fiber ports (Out 1-5) 13, 15, 17, 19, 21 as selected by the optical cross-connect switch 304. About 10% of the optical power of each output (Out 1-5) 13, 15, 17, 19, 21 is tapped or split off (Output taps) 308 to a 5:1 combiner 310, which is coupled to an 80 channel selector 312. Channel selector 312 preferably selects one wavelength of the forty internal or forty external (Aux. OPM In) 23 and feeds such wavelength to the photo diode (PD) 314. The output from the photodiode is passed to the equalization control circuit 316 and/or to user interface 77 (User i/f). The equalization control circuit 316 preferably controls the per wavelength variable optical attenuator (VOA) 318 which adjusts the wavelength transmitted power to conform to one or more predetermined criteria. Switch commands 71 are provided for an external controller, via user interface 77, for wavelength selection from input to output switching, for wavelength selection for power monitoring, and/or power monitoring.

Figure 5B:
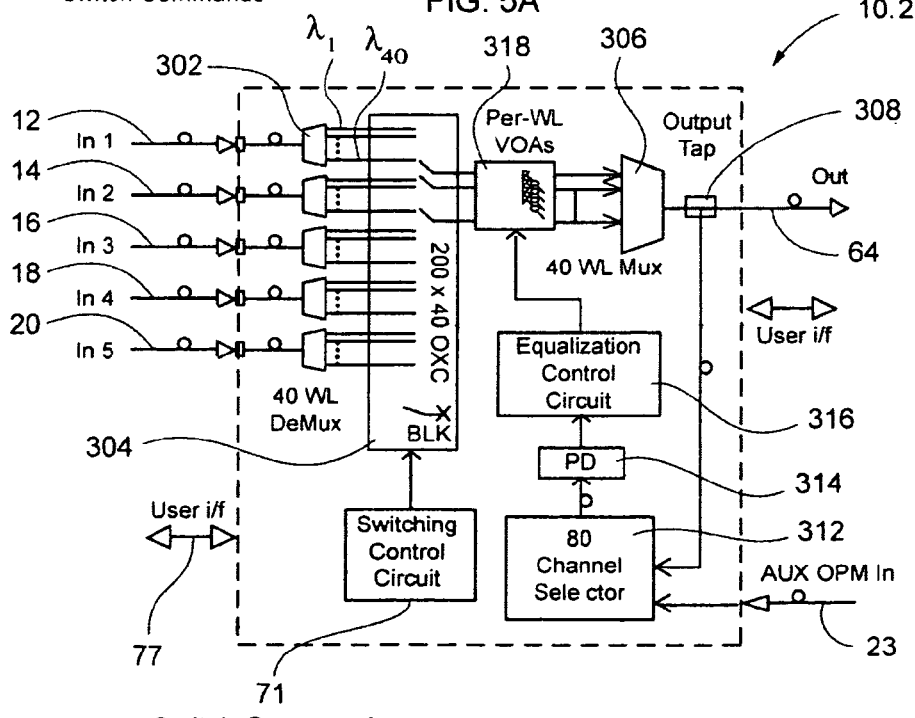
FIG. 5B is a functional block diagram of a five input port by one output fiber port wavelength selective switch with power monitor and feedback control according to a preferred embodiment of the present invention.

Referring now to FIG. 5B, a functional block diagram of five input fiber ports by one output fiber port N×1 (N=5) optical switching and monitoring system 10.2 wavelength selective switch with power monitor and feedback control is illustrated according to preferred embodiment of the present invention. In optical switching and monitoring system 10.2, forty wavelengths enter each input port (In 1-5) 12, 14, 16, 18, and are demultiplexed (DeMux) 302 into five sets of forty separate wavelengths λ1-λ40, the optical cross-connect (OXC) 304 selects and switches forty wavelengths, multiplexes (Mux) 306 and outputs forty selected wavelengths to output (Out) 64. About 10% of the optical power of output (Out) 64 is tapped or split off (Output Tap 308) to an 80 channel selector 312. The channel selector 312 selects one wavelength of the forty internal or forty external (Aux. OPM In) 23 and feeds such wavelength to the photo diode (PD) 314. The output from the photodiode is passed to the equalization control circuit 316 and/or to user interface 77 (User i/f). The equalization control circuit 316 controls the corresponding wavelength variable optical attenuator (VOA) 318 which adjusts the transmitted power to conform to one or more predetermined criteria. Switch commands 71 are provided from an external controller, via user interface 77, for wavelength selection from input to output switching, for wavelength selection for power monitoring, and/or for power monitoring.

User interface 77 preferably is an interface enabling information to pass from the optical switching and monitoring system to outside of the optical switching and monitoring system, and from outside the optical switching and monitoring system into the optical switching and monitoring system, wherein such outside systems include but are not limited to a human operator, an embedded controller, network management systems and/or network alarming systems. Information may include, but is not limited to, wavelength routing information, wavelength selection for power monitoring, wavelength to be switched from input to output, switch status, wavelength power levels, wavelength power level settings, and the like.

The optical monitoring system described above in FIGS. 2 and 5 is preferably internal to the optical switching and monitoring system and has the advantage of using all the free space optics and MEMS mirrors of such switch. However, an external optical monitoring system is possible wherein photodiode 79 is external and coupled to the optical switching and monitoring system via monitoring fiber 25 (shown in FIG. 2), with the advantage of monitoring all the output signals of the switch.

Per-wavelength power adjustment is achieved in the embodiment of FIG. 1 with relatively minor additions to the hardware other than the optical power monitor and taps shown in FIGS. 2 and 5. Mirrors 72 used for switching between channels and for optimizing transmission are used additionally for the variable attenuation of the output power, thereby effecting per-wavelength variable transmission through optical switching and monitoring system 11. To achieve such variable attenuation external to the switch would otherwise require separate attenuators in each of the multiple wavelengths of each of the optical channels. Moreover, the control functions can be incorporated into the same control circuitry 78.

Figure 6A:
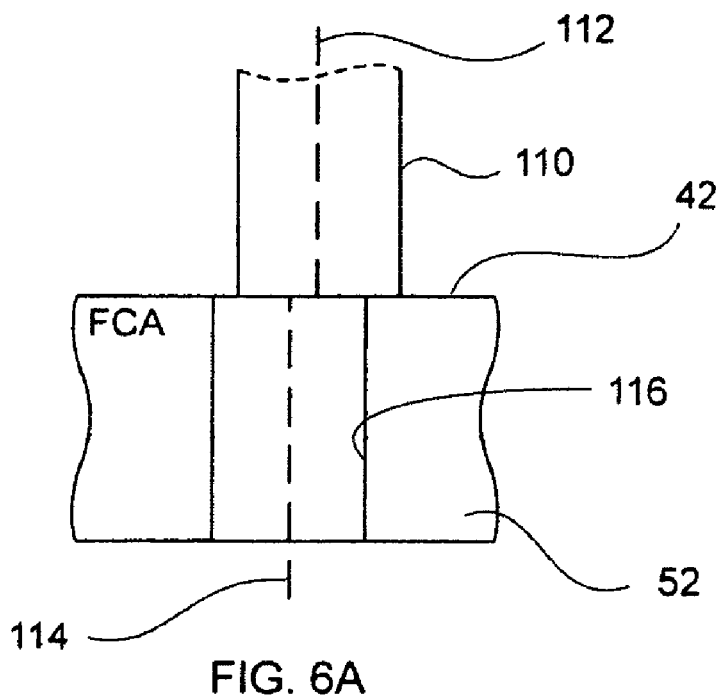
FIGS. 6A and 6B are cross sectional views illustrating two kinds of mismatch in optically coupling a wavelength component beam to the waveguide substrate according to an alternate embodiment of the present invention.

There are two principal types of misalignment or mismatch between the beam and waveguide to attain variable attenuation of the wavelength output power. Referring now to FIG. 6A, a cross sectional view illustrates a mismatch in optically coupling a wavelength component beam 110 to the waveguide substrate 52 according to a preferred embodiment of the present invention. Positional mismatch occurs when, as illustrated in the cross-sectional view of FIG. 6A, central axis 112 of wavelength λn beam 110 is offset slightly from central axis 114 of waveguide 116 of fiber concentrator 52. The figure, being suggestive only, does not illustrate the smooth variation of the optical fields both inside and outside of the illustrated wavelength λn beam 110 and waveguide 116 and across the lateral interface. FIG. 6A further assumes that the two modal fields have the same width, which is the typical object of optical design. Slightly tilting mirror λn of switching mirror array 72 (row A) to deliberately misalign or mismatch wavelength λn beam 110 entry into waveguide 116 of fiber concentrator 52, results in a degraded coupling and in loss of wavelength λn beam 110 optical power in waveguide 116. In a typical embodiment, coupling is attenuated by about 1 dB per micrometer of positional mismatch.

Figure 6B:
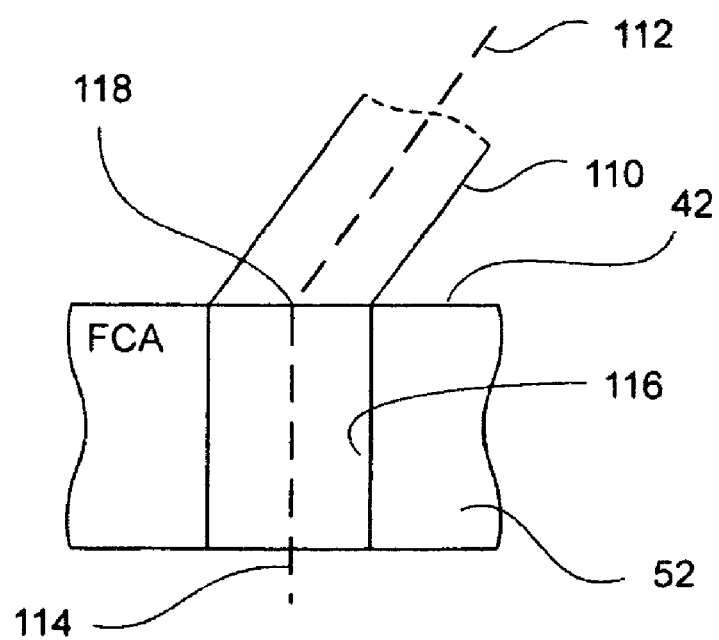

On the other hand, angular mismatch occurs when, as illustrated in the cross-sectional view of FIG. 6B, wavelength λn beam 110 is angularly inclined with respect to waveguide 116 even if their central axes 112 and 114 cross at their interface 118. Angular mismatch degrades the coupling because a phase mismatch occurs between the two fields at the interface arising from the axial z-dependence of the two complex fields. In a typical embodiment, coupling is degraded by about 1 dB per degree of angular offset but the angular dependence depends strongly upon the optics. It should be appreciated that a beam can be both positionally and angularly mismatched with a waveguide. It should be yet further appreciated that the mismatch can occur at the transition from free space to fiber (if no concentrator) and its beam field defined by the rest of the optical system.

Figure 7A:
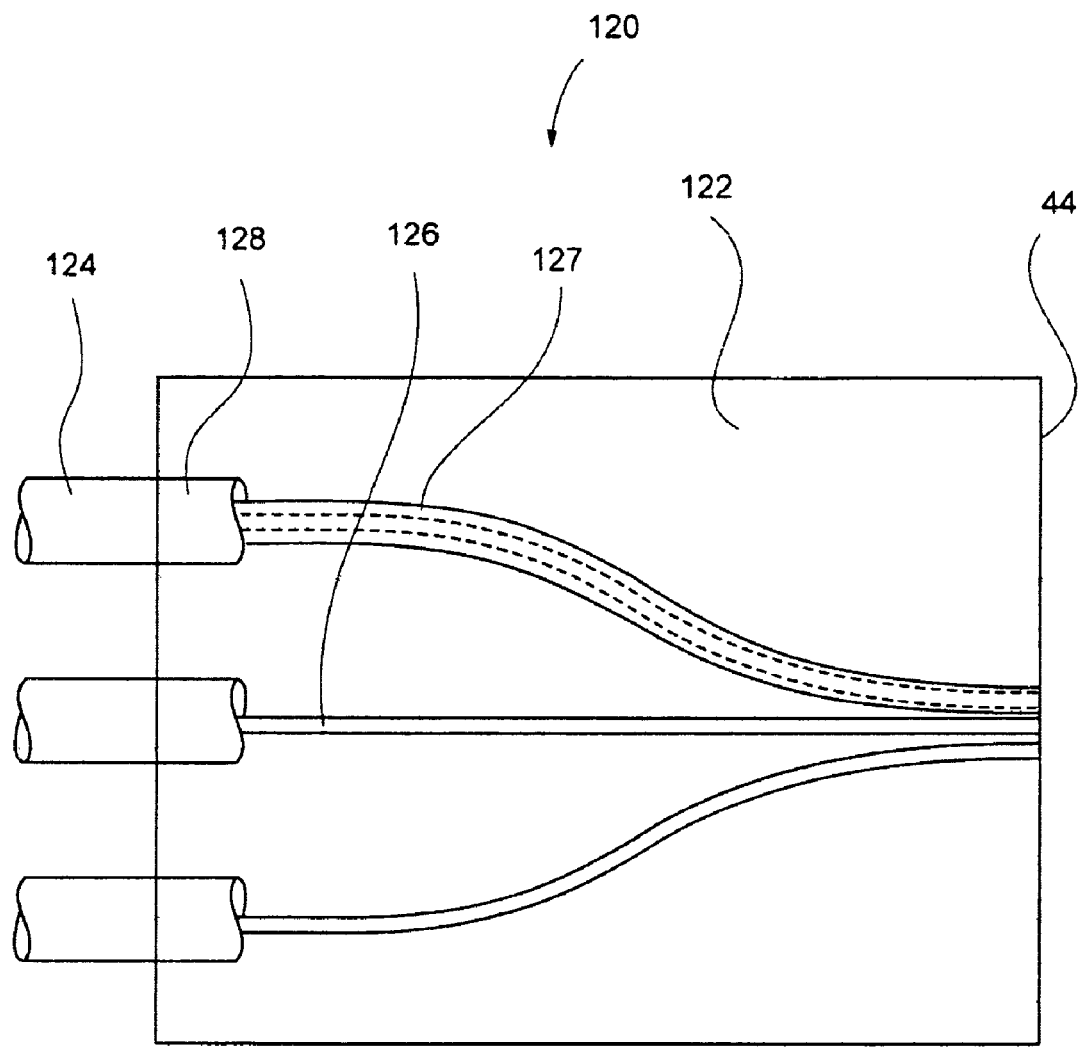
FIG. 7A is a top view of one instance of a fiber holder according to a preferred embodiment of the present invention.
Figure 7B:
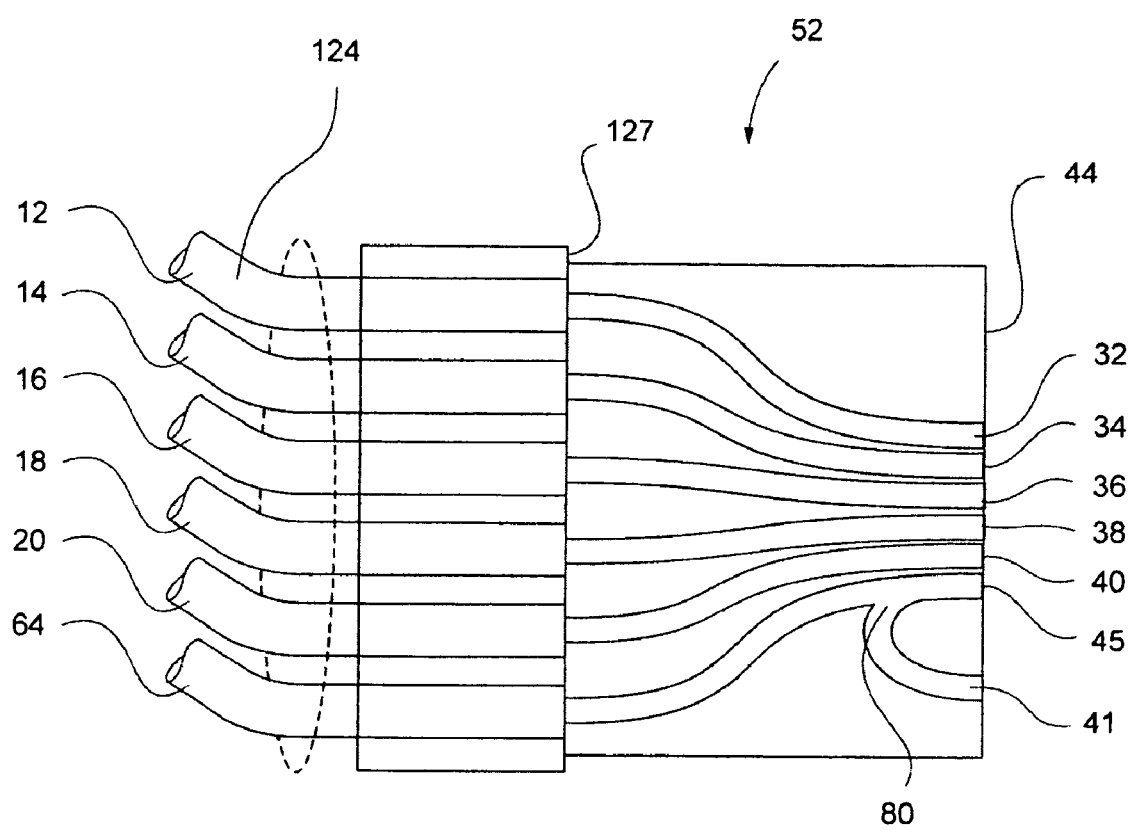
FIG. 7B is schematically illustrated optical concentrator array using planar waveguide included in the N×1 WSS of FIGS. 1, 2 and 5B according to an alternate embodiment of the present invention.
Figure 7C:
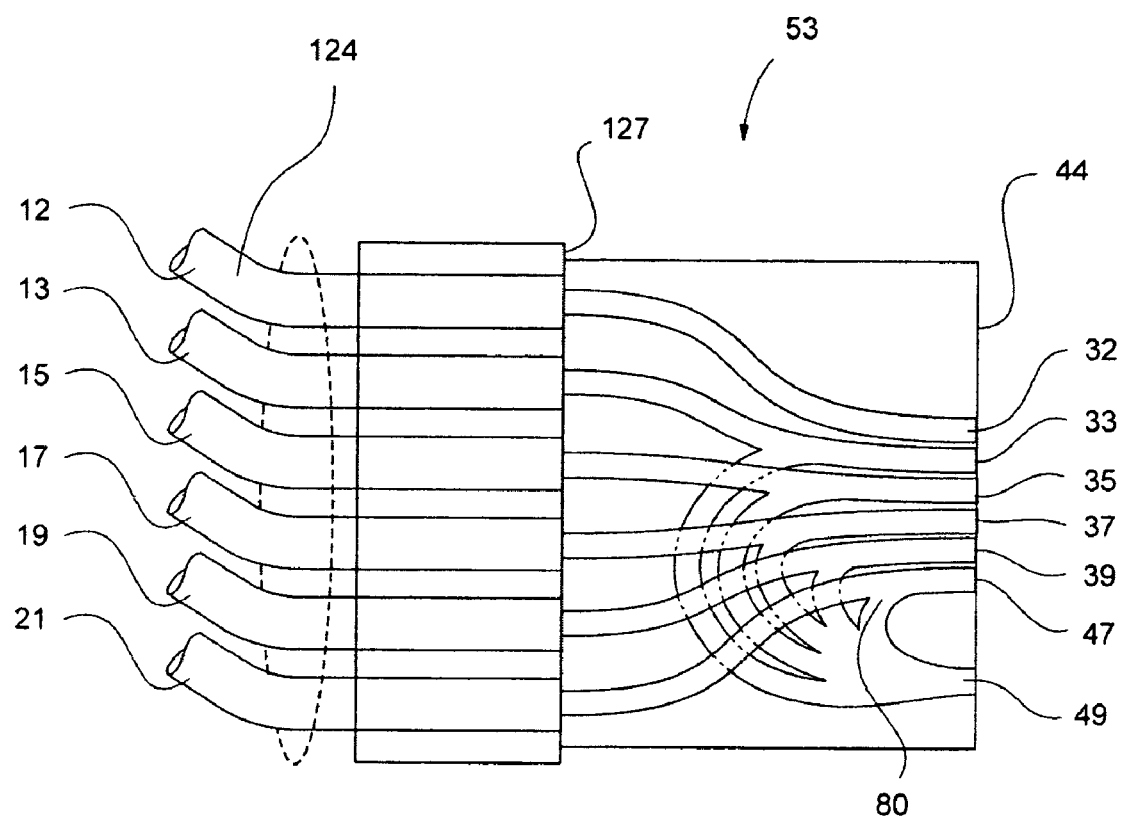
FIG. 7C is schematically illustrated one instance of an optical concentrator array using planar waveguide included in the 1×N WSS of FIG. 5A according to an alternate embodiment of the present invention.

Referring now to FIG. 7A, there is illustrated a fiber concentrator 120 that utilizes the optical fiber included in the switch of FIGS. 1, 2 and 5 to bring optical signals closer together. Fiber holder 122 is patterned by precision photolithographic techniques with a series of preferably V-shaped grooves (or other channel configuration) in the general planar pattern shown in fiber holder 122 of FIG. 7A. Single-mode or multi-mode optical fibers 124 having cores 126 surrounded by claddings 127 and buffer 128. In this application, optical fibers 124 are stripped of their protective buffer 128 and cladding 127, or have their cladding 127 reduced or tapered toward output face 44 of fiber holder 122 to enable close linear placement of cores 126. Typical core and cladding diameters are respectively 8.2 micrometers and 125 micrometers. Among other favorable attributes, the concentrated fiber core spacing reduces the amount of "dead space" between fibers which would otherwise increase the total mirror tilt range. Tapered fibers 124 are preferably placed into the grooves with their tapered ends forming transition to free-space optics 74. The all-fiber design eliminates the tedious alignment and in-path epoxy joint of combination waveguides, as shown in FIGS. 7B and 7C. The design also eliminates polarization-related effects arising in planar waveguides.

Fiber concentrator 120 interfaces widely separated optical fibers 124 with the closely configured free space optics 74 and wavelength switching assembly 75 of WSS of FIGS. 1 and 2. Multiple fibers 124 are typically bundled in a planar ribbon. V-shaped grooves in fiber holder 122 hold the reduced cladding 128 with a spacing of, for example, 40 micrometers. Although a core of each fiber 124 has a relatively small size of about 8 micrometers, its outer glass cladding results in a fiber diameter of approximately 125 micrometers. The large number of fibers, which can be handled by the single set of free-space optics 74 of the invention, arranged along an optical axis make it difficult to process a large number of fiber signals with such a large spacing between them because the outermost fiber signals are so far from the optical axis capabilities of the mirrors. Also, as discussed in more detail below, a significant amount of optical magnification is required between these fibers and the MEMS mirror array, and the MEMS design and function is greatly simplified as a result of concentrating the fiber spacing.

Referring now to FIG. 7B, a schematically illustrated optical fiber concentrator array 52, using planar waveguide included in the 5×1 WSS according to a preferred embodiment of the present invention, and included in the switch of FIGS. 1, 2 and 5B. Single-mode optical fibers 124 having cores 126 surrounded by claddings 127 (shown in FIG. 7A) are butt coupled to fiber concentrator 52. In the 6×1 switch 10 shown in FIG. 1, six input fiber ports 12, 14, 16, 18, 20, 22 and output fiber 64 are preferably optically coupled to fiber concentrator 52 in a linear alignment and are preferably optically coupled to input fiber ports 12-22 and output fiber 64 to bring their signals closer together on output face 44 of fiber concentrator 52 adjacent the optics, and to output the beams in parallel in a linearly spaced grid. Returning to FIG. 7B, fiber concentrator 52 preferably has curved shaped planar waveguides 32, 34, 36, 38, 40 and 45 corresponding to input fiber ports 12, 14, 16, 18, 20, and output fiber 64 within fiber concentrator 52 to preferably concentrate and reduce the spacing between fiber input fiber ports 12, 14, 16, 18, 20, 64 from 125 micrometers, representative of the fiber diameters, to the considerably reduced spacing of, for example 30 or 40, micrometers and preferably no more than 50 micrometers which is more appropriate for the magnifying optics of switch 10 and an optimum tilt range of the mirrors. Each of waveguides 32, 34, 36, 38, 40, and 45 is preferably coupled to respective 12, 14, 16, 18, 20 input port and output fiber 64. Further, waveguides 32, 34, 36, 38, 40, 41 and 45 preferably extend along a common plane directing the wavelengths to output in free space and to propagate in patterns having central axes which are also preferably co-planar.

FIG. 7B further discloses the fabricating of output tap 80 and planar waveguide 41 into fiber concentrator 52, whereby tap 80 preferably couples about 10% of the optical power from output fiber port 64 of planar waveguide 45 into planar waveguide 41, which directs the multi wavelength output beam to output in free space and to propagate in a pattern having a central axis which is preferably co-planar with outputs from waveguides 32, 34, 36, 38, 40, 45 of FIG. 2 in free space and switched by monitoring mirror array 73 (row B) after it has passed through free space optics 74.

Fiber concentrator 52 in FIG. 2, may include auxiliary monitoring fiber port 23, coupled to planar waveguide 43, wherein fiber concentrator 52 preferably outputs its multi-wavelength beam in free space propagating in a pattern having a central axis which is preferably co-planar with outputs from waveguides 32, 34, 36, 38, 40, 41 in free space optics 74, thereby enabling an external multi-wavelength beam to be monitored by optical switching and monitoring system 11. An external signal not found on input port 12, 14, 16, 18, 20, 22 may be input into auxiliary monitoring fiber port 23 and optical switching and monitoring system 11 may be utilized to monitor or read the power of each wavelength of a multi-wavelength beam on auxiliary monitoring fiber port 23 and to output such data to a user interface (User i/f) 77 port shown in FIGS. 5A and 5B. It is contemplated herein that additional auxiliary monitoring fiber port 23 may be added in a similar fashion.

Potential limitations on the free space optics 74 and wavelength switching assembly 75 occur when configuring larger numbers of fibers than the present invention, if arranged along an optical axis of input fiber ports 12, 14, 16, 18, 20 and output fiber 64. Absent a fiber concentrator 52, adding additional fibers makes it difficult to switch such increased number of fiber signals with such a large spacing between such fibers because the outermost beams are so far off the center optical axis capabilities of the mirrors in the preferred embodiment between input fiber ports 16 and 18. Also, as discussed in more detail below, a significant amount of optical magnification is required between these fibers and the MEMS mirror array, and the MEMS design and function are greatly simplified as a result of concentrating the fiber spacing.

Referring now to FIG. 7C, a schematically illustrated optical concentrator array 53 is shown wherein planar waveguides are included in the 1×5 WSS according to an alternate embodiment of the present invention. Single-mode optical fibers 124 having cores 126 surrounded by claddings 127 and buffers 128 (shown in FIG. 7A) are butt coupled to concentrator 53. Illustrated in the 1×5 wavelength selective switch 10.1 shown in FIG. 5A, one input port 12 and five output fiber ports 13, 15, 17, 19, 21 are preferably optically coupled to fiber concentrator 53 in a linear alignment and are preferably optically coupled to fiber input port 12, and output fiber ports 13-21 to bring their beams closer together on output face 44 of fiber concentrator array 53 adjacent the optics, and to output the beams in parallel in a linearly spaced grid. Fiber concentrator 53 preferably has curved shaped planar waveguides 32, 33, 35, 37, 39, 47 and 49 within fiber concentrator 53 to preferably concentrate and reduce the spacing between fiber input fiber ports 12, 13, 15, 17, 19, 21 from 125 micrometers, representative of the fiber diameters, to the considerably reduced spacing of, for example, 30 or 40 micrometers and preferably no more than 50 micrometers which is more appropriate for the magnifying optics of switch 11 and an optimum size and spacing of the mirrors. Each of waveguides 32, 33, 35, 37, 39, 47 is preferably coupled to the respective input fiber port 12, and output fiber ports 13, 15, 17, 19, 21. Further, waveguides 32, 33, 35, 37, 39, 47 preferably extend along a common plane directing the multi wavelength beams to output in free space and to propagate in patterns having central axes which are also preferably co-planar.

FIG. 7C further discloses the fabricating of output taps 80 and planar waveguide 49 into fiber concentrator 53 whereby taps 80 preferably couple about 10% of the optical power from output fiber ports 13, 15, 17, 19, 21 via waveguides 33, 35, 37, 39, 47 into planar waveguide 49, which directs the multi wavelength output beam to output in free space and to propagate in a pattern having a central axis which is preferably co-planar with outputs from waveguides 32, 33, 35, 37, 39, 47 in free space and switched by monitoring mirror array 73 (row B) after it has passed through free space optics 74. The reflected beam preferably passes again through free space optics 74 and into output waveguide 45 (shown in FIG. 2 but not in FIG. 7C) which guides the signal to photodetector 79 wherein fiber concentrator 53 performs the functions of taps 308 and 5:1 combiner 310 in FIG. 5A.

Concentrator 53 may also include auxiliary monitoring fiber port 23, coupled to planar waveguide 43 wherein fiber concentrator 53 preferably outputs its multi-wavelength beam in free space propagating in a pattern having a central axis which is preferably co-planar with outputs from waveguides 32, 33, 35, 37, 39, 47 in free space optics 74, thereby enabling an external multi-wavelength beam to be monitored by optical switching and monitoring system 10.1 or 11. An external signal not found on input(N) may be input into auxiliary monitoring fiber port 23 and optical switching and monitoring system 10.1 or 11 may be utilized to monitor or read the power of each wavelength of a multi-wavelength beam on auxiliary monitoring fiber port 23 and to output such data to a user interface (User i/f) port shown in FIGS. 5A and 5B. It is contemplated herein that additional auxiliary monitoring fiber port 23 may be added in a similar fashion.

Fiber concentrators 52 and 53 can be easily formed by a conventional ion exchange technique, such as is available from fiber array manufactures, such as WaveSplitter Technologies of Fremont, Calif. For example, waveguides 32, 34, 36, 38, 40, 41, 45, 33, 35, 37, 39, 47, 49 are formed by doping such signal path to obtain a higher refractive index than the surrounding undoped glass, and thus, can serve as optical waveguides. However, a half-elliptical shape is optically disadvantageous. Therefore, after completion of ion exchange, a vertical electric field is applied to the substrate to draw the positive ions into the glass substrate to create nearly circular doped regions. These serve as the planar optical waveguides surrounded on all sides by the lower-index glass. Other methods are available for forming planar waveguides.

Fibers 124 of FIGS. 7B and 7C are aligned to fiber concentrators 52 and 53 at input face 127 of fiber concentrators 52 and 53. Preferably, the fiber end faces are inclined by about 8 degrees to the waveguides in order to virtually eliminate back reflections onto fibers 124. Other types of concentrator chips and fiber holder substrates are available and are contemplated herein.

Fiber concentrators 52 and 53 preferably create a relatively narrow spread of parallel free-space beams in a linear arrangement for wavelength selective switch 10 and 11, as Golub et al. has described in U.S. Pat. No. 6,694,073, issued Feb. 17, 2004. Even when multiple fibers are connected to wavelength selective switch 10 and 11, the fibers are concentrated to an overall width of only about 1 millimeter. The design allows shorter focal length lenses and significantly reduces the overall size of the package. It is also more reliable and highly tolerant to environmental stress than previously described systems. Without a concentrator, the number of fibers connected to wavelength selective switch 10 and 11 would be limited for a given package size.

An example of front end optics 56 is illustrated in more detail in the cross-sectional view of FIG. 8, as Golub has described in U.S. Pat. No. 6,694,073, issued Feb. 17, 2004. The free-space beams output by the waveguides, whether planar or fiber, of fiber concentrator 52 or 53 are divergent and form a curved field. This discussion will describe all the beams as if they are input beams, that is, output from the concentrator in to the free-space optics. The beams are in fact optical fields coupled between optical elements. As a result, the very same principles apply to those of the beams that are output beams which eventually reenter fiber concentrator 52 or 53 for transmission onto the network.

The beam output from fiber concentrator 52 or 53 enters into the wavelength selective switch through field-flattening lens 220, in order to flatten what would otherwise be a curved focal plane of the collimator lens. Field-flattening lens 220 accepts a flat focal plane for the multiple parallel beams emitted from the concentrator. In the reverse direction, field-flattening lens 220 produces a flat focal plane and parallel beams compatible with the end of the concentrator 42 to assure good coupling to waveguides in the concentrator.

In many optical systems, an image is formed on a curved, non-planar surface, typically by beams non-parallel to each other. In many applications such as photographic imaging systems, such minor deviations from a flat field are mostly unnoticeable and inconsequential. However, for a wavelength selective switch based on free-space optics, parallel single-mode fibers, small parallel beams, and planar mirror arrays, a curved image can degrade coupling efficiency. Performance is greatly improved if the optics produce a flat focal plane at output face 44, and on the return trip it will be imaged onto fiber concentrator 52 or 53 waveguide ends. Hence, the ends of the input waveguides in fiber concentrator 52 or 53 are imaged onto the ends of the output waveguides in fiber concentrator 52 or 53, and the efficiency of coupling into the single-mode waveguides strongly depends on the quality of the image. Without the field-flattening lens, it would be very difficult to build a WSS with more than a few fiber ports because the error in focus would significantly increase for fibers displaced away from the optical axis. Field-flattening lens 220 preferably is designed as an optical element with negative focal length, and is thicker at its periphery than at its optical axis in the center. The basic function of the thicker glass at the periphery is to delay the focus of the beams passing therein. The delayed focus serves to create a flat plane of focus points for all beams, rather than a curved plane of foci that would occur otherwise. A field-flattening lens may be implemented as a singlet lens, a doublet, aspheric, or other lens configuration.

A field-flattening lens may, in the absence of further constraints, produce an optical field in which the off-axis beams approach the flat focal plane at angles that increasingly deviate from normal away from the optical axis. Such non-perpendicular incidence degrades optical coupling to fibers arranged perpendicular to the flat focal plane. Therefore, performance can be further improved if the beams are made to approach the focal plane in parallel and in a direction normal to the flat focal plane. This effect of producing parallel beams is referred to as telecentricity, which is aided by long focal lengths.

After field-flattening lens 220, the beams pass through a collimating doublet lens 222, preferably consisting of concave lens 224 joined to convex lens 226. Doublet lens 222 may be a standard lens such as Model LAI-003, available from Melles Griot, which offers superior collimating and off-axis performance. The effective focal length of the assembly may be about 14 mm. Collimating lens 222 is illustrated as following the field-flattening lens 220, which is preferred, but their positions can be reversed with little change in performance.

As an aid to reducing the overall insertion loss of the integrated WSS in FIGS. 1, 2, 4, 5 (although not a strict requirement), prism 228, which may be a simple wedge, preferably is placed between collimating lens 222 and dispersive element 62. Prism 228 pre-corrects for the astigmatism introduced by dispersive element 62. The wedge angle of the prism, along with the type of glass from which it is made, allows elliptically shaped (or astigmatic) beams to be created. If prism 228 is composed of common optical glass, the wedge angle is typically on the order of 25 degrees to compensate for the type of dispersive element 62 considered for the invention. The ellipticity counteracts a similar ellipticity that is an undesirable by-product of dispersive elements. The net result of the prism and grating is a distortion-free optical beam that can be efficiently processed by the remaining optical components in the system and ultimately coupled with high efficiency back into the small core of a single-mode fiber. Field-flattening lens 220, collimating doublet lens 222, and prism 228 are collectively and individually referred to as front-end optics 56.

Figure 9A:
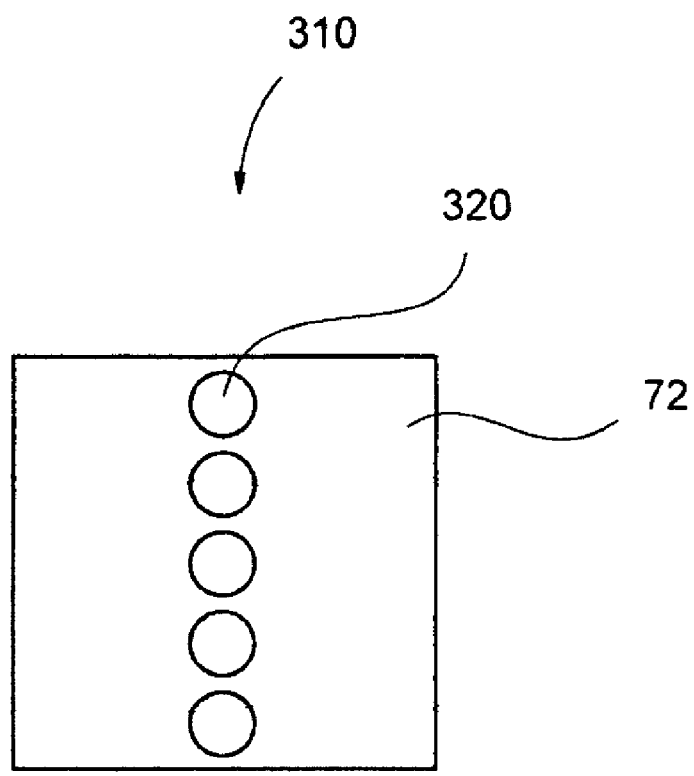
FIG. 9A is a front face view of a first illustrative channel MEMS mirror and five incident beams from the five input fiber ports according to an illustrative embodiment of the present invention.

Referring now to FIG. 9A, a front face view of $\lambda(n)$ channel MEMS mirror (row A) and five incident beams from the five fiber input fiber ports is illustrated, according to an illustrative embodiment of the present invention. Mirrors 72 and 73 (shown in FIG. 9B) of the mirror array are preferably formed within a single substrate 264 (shown in FIG. 4) in a rectangular two-dimensional array, which is arranged in a switching or monitoring dimension and a wavelength dimension. A typical mirror reflective surface 270 (shown in FIG. 4), is illustrated in the plan view of FIGS. 9A, 9B, 9C includes switching mirror array 72 (row A) preferably having dimensions of about 200 micrometers in the x-axis direction and about 250 micrometers in the y-axis direction. The optics are designed to irradiate each mirror of switching mirror array 72, preferably with five elliptically shaped spots 320 representing $\lambda(n)$ from input fiber ports 12-22. As stated earlier, for example, $\lambda 1$ mirror of switching mirror array 72 has $\lambda 1(12)$-$\lambda 1(20)$ from all five input fiber ports 12-20 projected onto $\lambda 1$ mirror surface via beam steering element 68, and by tilting $\lambda 1$ mirror of switching mirror array 72 of switch 10 or 11, switches one selected $\lambda 1$ (12-20) from fiber input fiber ports 12-20 to fiber output port 64 and blocks the remaining unselected $\lambda 1(s)$ from input fiber ports 12-20, and so forth for $\lambda 2$-$\lambda n$. In addition, the five elliptically shaped spots 320 are shown in an overlapping manner (as further shown in FIGS. 9C and 12). $\lambda 1(12)$-$\lambda 1(20)$ represented by spots 320 preferably have a diameter on an x-axis of about 100 micrometers and a diameter on a y-axis of 150 micrometers. The MEMS mirrors of switching mirror array 72 preferably spans about 10 millimeters in the x-axis direction (into the page in FIG. 2). It is contemplated by this invention herein that other dimensions and/or shapes are feasible for switching mirror array 72.

Figure 9B:
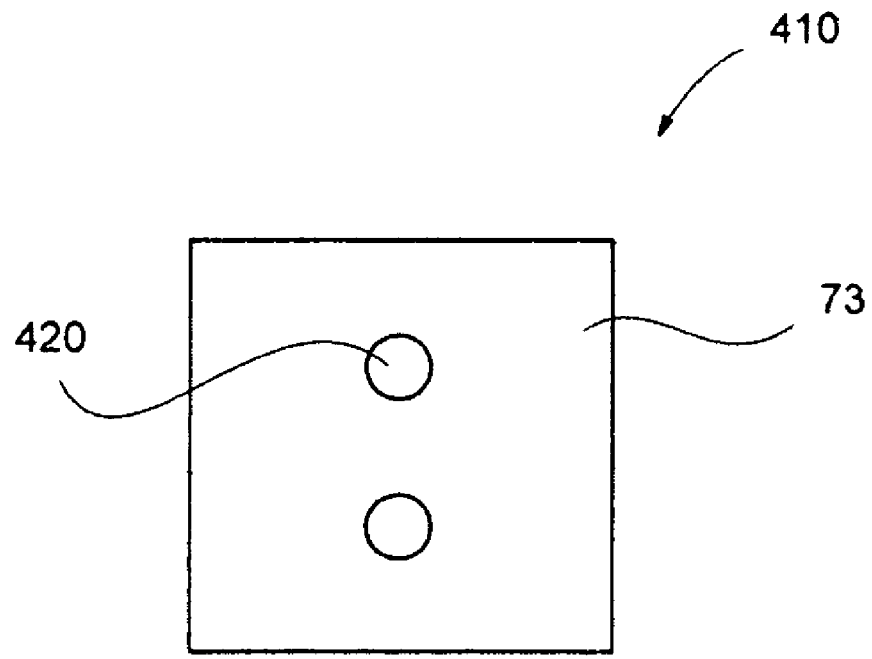
FIG. 9B is a front face view of a second channel MEMS mirror and two incident beams from the two monitoring input fiber ports according to an illustrative embodiment of the present invention.
Figure 9C:
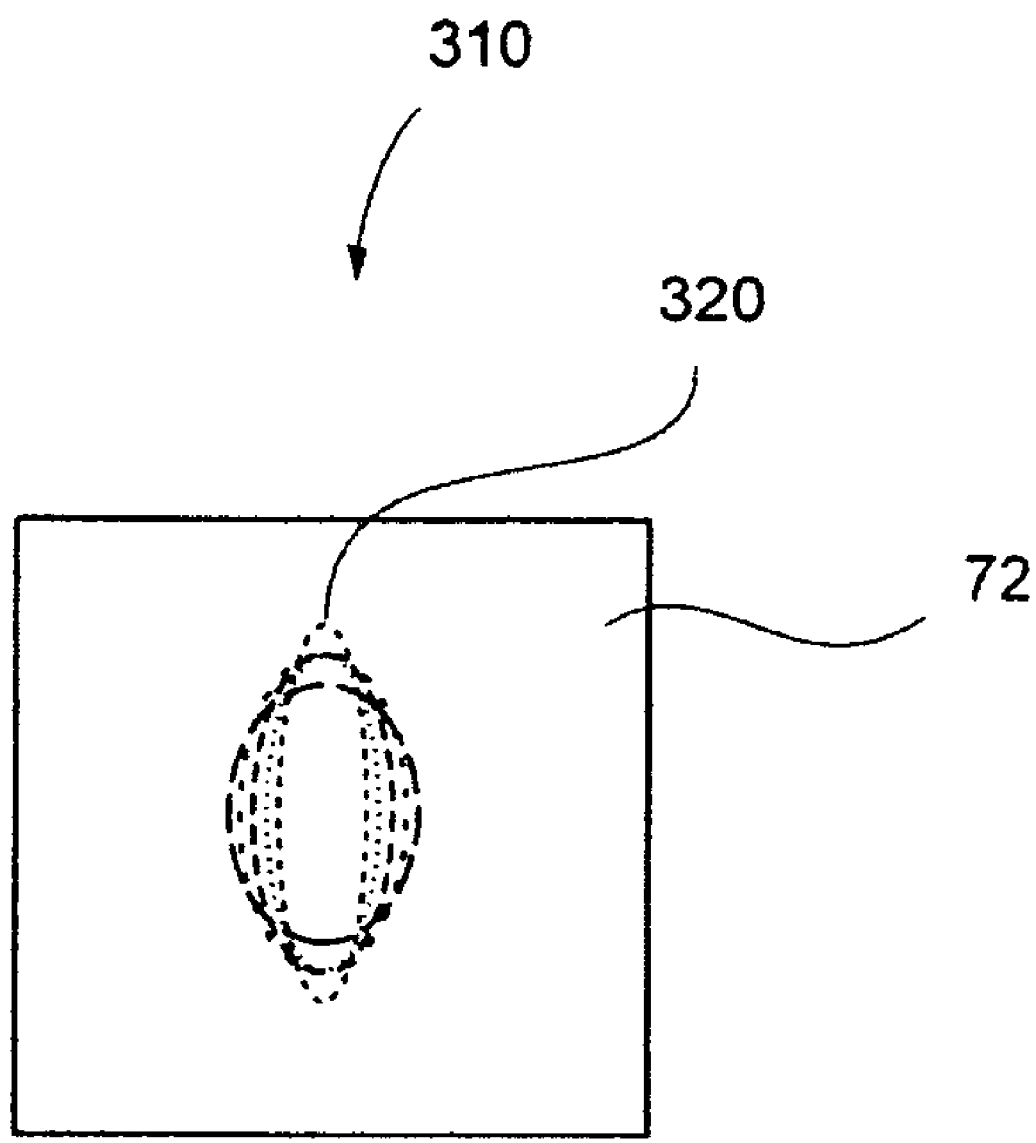
FIG. 9C is a front face view of a third channel MEMS mirror and five incident beams from the five input fiber ports according to a preferred embodiment of the present invention as shown in FIG. 12.

Referring now to FIG. 9B, a front face view of a second channel MEMS mirror (row B) and two incident beams from the two monitoring input fiber ports is illustrated according to an illustrative embodiment of the present invention. A typical mirror reflective surface 270 (shown in FIG. 4), is illustrated in the plan view of FIG. 9B a representative mirror of monitoring mirror array 73 (row B) preferably having dimensions of 200 micrometers in the x-axis direction and 250 micrometers in the y-axis direction. The optics are designed to irradiate each mirror of monitoring mirror array 73, preferably with two elliptically shaped spots 420. As stated earlier, for example $\lambda 1$ mirror of monitoring mirror array 73 has $\lambda 1(21)$ and $\lambda 1(23)$ from two monitoring fiber ports 21 and 23 projected onto $\lambda 1$ mirror surface via beam steering element 68, and by tilting $\lambda 1$ mirror of monitoring mirror array 73 switch 11 switches one selected $\lambda$ from monitoring fiber ports 21 or 23 to output monitoring fiber port 25 and blocks the remaining unselected $\lambda$ from monitoring fiber ports 21 and 23 as well as all other $\lambda$s from monitoring fiber ports 21 and 23. In addition, the two elliptically shaped spots 420 are shown in a non-overlapping manner; however, spots 420 may overlap one another on each mirror of monitoring mirror array 73. $\lambda 1(21)$ and $\lambda 1(23)$, represented by spots 420 preferably have a diameter on an x-axis about 100 micrometers and a diameter on a y-axis of 150 micrometers. The MEMS mirrors of monitoring mirror array 73 span about 10 millimeters in the x-axis direction (into the page in FIG. 2). It is contemplated by this invention herein that other dimensions are feasible for monitoring mirror array 73.

Referring now to FIG. 9C, a front face view of MEMS mirror 72 (row A) shown with five incident beams from the five input fiber ports is illustrated, according to a preferred embodiment of the present invention. As stated earlier, for example, $\lambda 1$ mirror of switching mirror array 72 has $\lambda 1(12)$-$\lambda 1(20)$ from all five input fiber ports 12-20 projected onto $\lambda 1$ mirror surface via segmented prism beam steering element 68, and by tilting λ1 mirror of switching mirror array 72 of switch 10 or 11, switches one selected λ1 (12-20) from fiber input fiber ports 12-20 to fiber output port 64 and drops the remaining unselected λ1(s) from input fiber ports 12-20, and so forth for λ2-λn. The five incident beams λ1 (12-20) are preferably shown in an overlapping manner.

Figure 10:
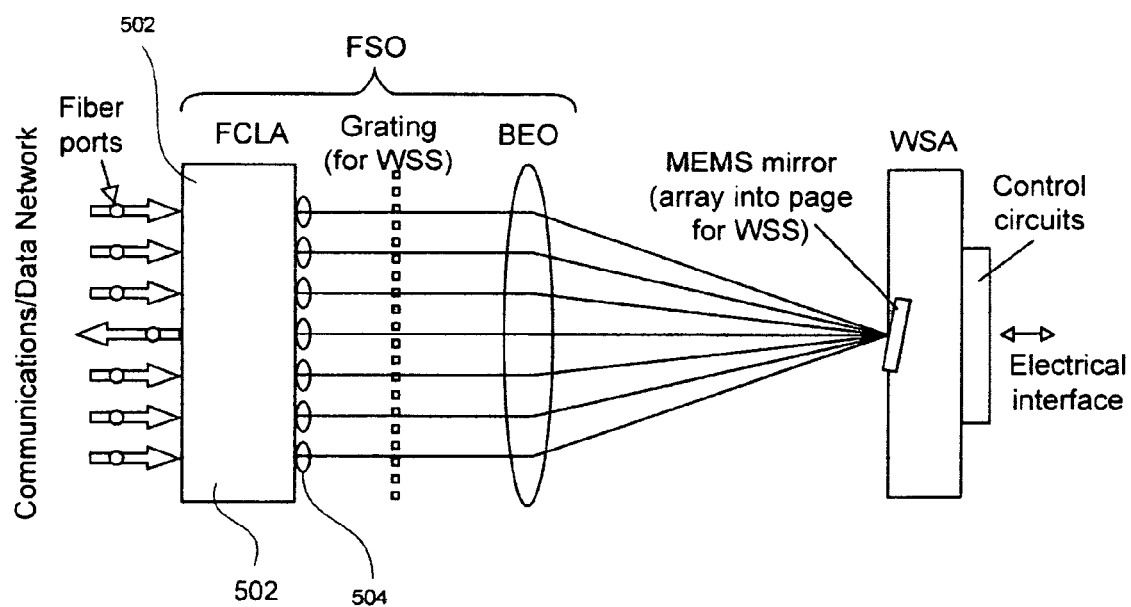
FIG. 10 is a schematic illustration of a six input port by one output fiber port wavelength cross-connect switch according to an alternate embodiment of the present invention.

Referring now to FIG. 10 there is a schematic illustration of a six input port by one output fiber port wavelength selective switch depicting an alternative prior art apparatus for accomplishing an N×1 wavelength selective switch. The wavelength selective switch of FIG. 10 does not include a beam steering element to focus the beams onto the MEMS mirror array. Rather, the wavelength selective switch of FIG. 10 uses a simple lens (or lenses) in its back end optics. Such an embodiment limits the wavelength selective switch of FIG. 10 to a single N×1 or 1×N architecture, and precludes use of multiple N×1 or 1×N switches in a single package, as shown in the other figures. Additionally, wavelength selective switch of FIG. 10 employs a fiber collimating lens array (FCLA) 502 in place of an FCA and FE optics. The FCLA 502 places a small collimating lens 504 at the output of each fiber. This combination of FCLA 502 and collimating lens 504 generally increases the cost and complexity of the system, especially as more fibers are added, since each fiber requires a dedicated collimating lens 504 with varying demanding alignment specifications.

Figure 11:
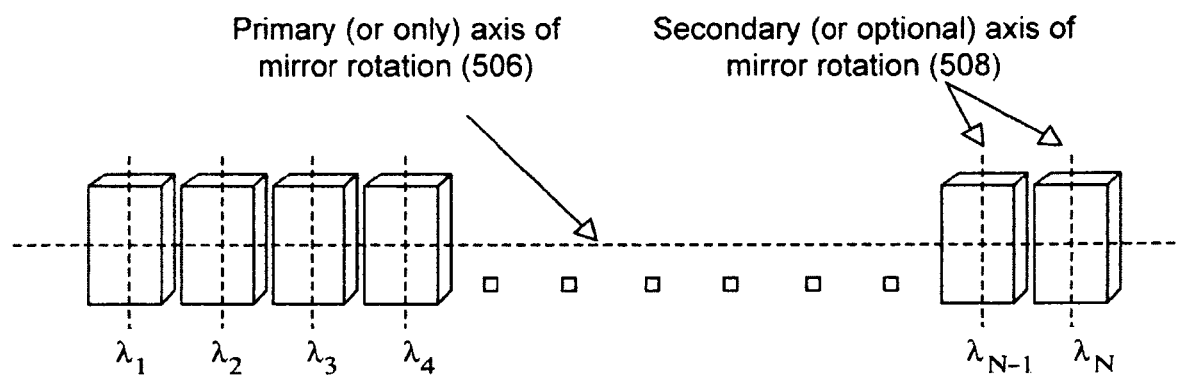
FIG. 11 is an illustration of one instance of a typical single-row MEMS mirror array according to an embodiment of the present invention.

Referring now to FIG. 11 there is an illustration of a typical single-row MEMS mirror array λ1-λn, showing primary axis 506 and optional secondary axis 508 of rotation. Each 1×N or N×1 switch in the preferred embodiment uses one such row. A single MEMS chip may have several such rows.

Figure 12:
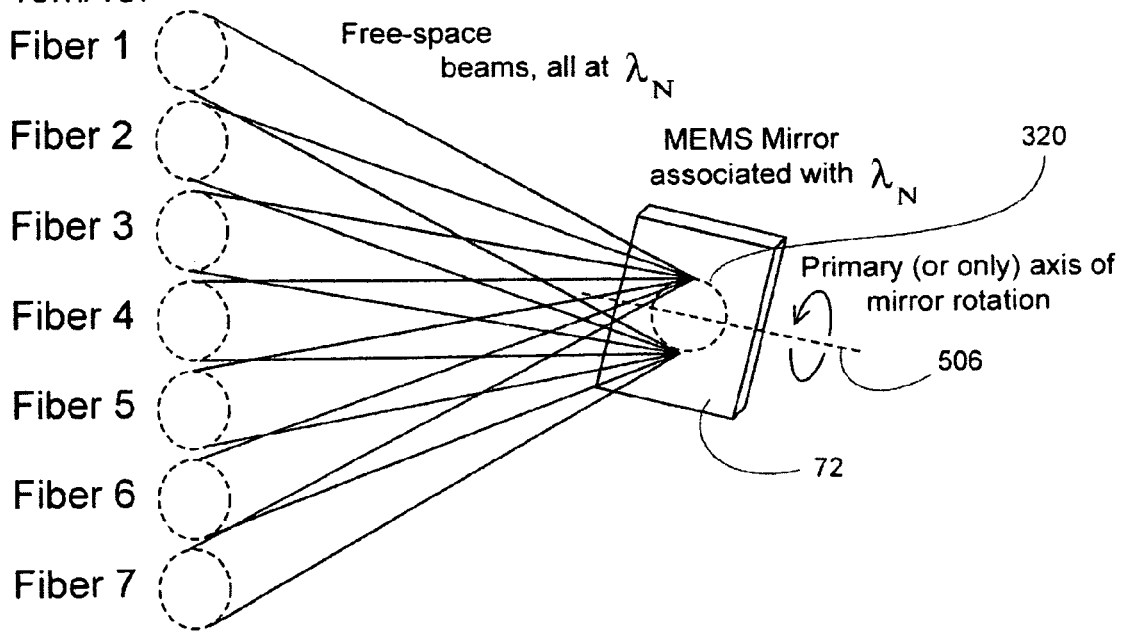
FIG. 12 is a three-dimensional schematic of a MEMS mirror according to an embodiment of the present invention of FIG. 9C.

Referring now to FIG. 12 there is a three-dimensional schematic of a MEMS mirror of FIGS. 9A and 9C. As illustrated in FIG. 12 light beams from/to the input/output fibers 1-7 preferably are all steered onto the switching mirror array 72 by the BSE 68 (as shown in FIGS. 1, 2, and 9C) in an overlapping manner. The seven incident beams to or from the seven input fiber ports are preferably shown in an overlapping manner. It should be recognized that rotation of λn mirror about its primary axis 506 couples a selected λn by reflecting such selected λn to the output fiber 64 (shown in FIGS. 1 and 2), and thus such rotation determines which λn is selected for monitoring or switching. Further, overlapping spots 320 allow more of switching mirror array 72 surface area to be used, allowing for greater tolerance of reflective surface defects of switching mirror array 72.

Figure 13:
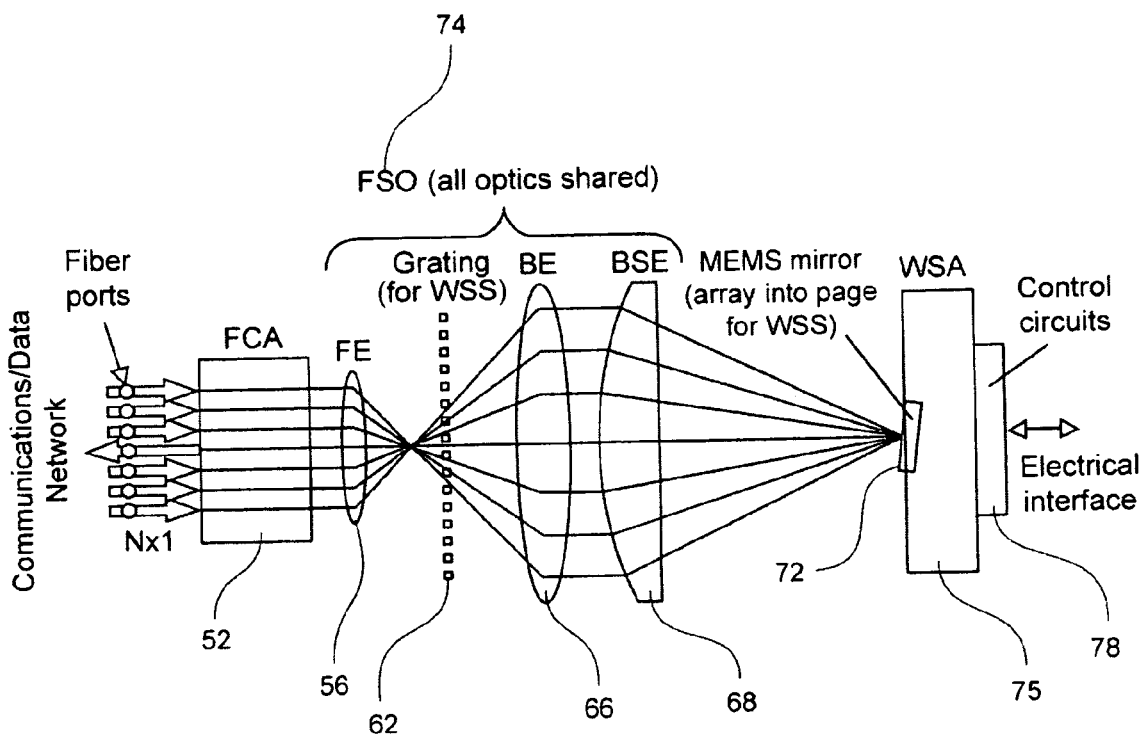
FIG. 13 is a schematic illustration of a six input port by one output fiber port wavelength selective switch according to preferred embodiment of the present invention.

Referring now to FIG. 13 is a schematic illustration of a six input port by one output fiber port wavelength selective switch representing an N×1 switch and is an alternative depiction of the preferred embodiment of the present invention shown in FIG. 1. This depiction emphasizes the present invention's ability to share all free space optics (FSO) 74, including front end optics (FE) 56, dispersive element 62, back end optics (BE) 66, beam steering element (BSE) 68, and the elimination of collimating lenses 504 of FIG. 10.

Referring now to FIG. 14 there is a three-dimensional schematic of a wavelength selective switch according to an embodiment of the present invention. The wavelength selective switch of FIG. 14 may represent an N×1 or 1×N embodiment of the present invention with element numbering as set forth in FIGS. 1 and 2.

Referring now to FIG. 15 there is a schematic illustration of a dual wavelength selective switch 12 with BSE-based architecture for creating manifold or multi-packaged switches within the same package. Terminology of manifold, co-packaged, and multi-packaged is used interchangeably herein as one or more optical switches packaged together and comprising an optical system. FIG. 15 uses the same 'cutaway' view as FIGS. 1 and 13 (1×N switch 10) to illustrate an advantage of the present invention's BSE-based architecture for creating manifold or multi-packaged switches within the same package, while reaping the benefits of re-use and sharing of free space optics (FSO) 74 (including front end optics (FE) 56, dispersive element 62, back end optics (BE) 66, beam steering element (BSE) 68), baseplate, housing, FCA 52, MEMS control circuitry 78, common MEMS array although each mirror is dedicated to one manifold or multi-packaged switch, and input/output fibers (fiber management fixture) although each fiber is dedicated to one manifold or multi-packaged switch. By adding an additional row of mirrors 72.1 to the existing switching mirror array 72, adding additional waveguides to FCA 52, and adding additional facets to BSE 68, a dual or second N×1 switch 10.3 is defined and is shown in the lower-left and upper-right parts of FIG. 15. The wavelength selective switches 10 and 10.3 of FIG. 15 operate independently of one another (that is, their light paths do not interact and such switches are capable of independent switching), while sharing the same housing and common components. It should be recognized that BSE 68 is capable of refracting light beams at arbitrary angles; thus, allowing multiple steering points for λn, on multiple mirror rows, to exist. FIG. 15 illustrates a 'cutaway' view of one wavelength λn, and that each MEMS mirror shown represents a row of mirrors coming out of the page, each mirror corresponding to a different wavelength λn separated out by dispersive element 62 and positioned by BSE 68.

Although this figure depicts two independent switches 10 and 10.3, the concept can easily be extended to three, four, or an arbitrary number of switches by adding more rows of MEMS mirrors 72, more FCA 52 waveguides, and more BSE 68 facets. If desired, each N×1 or 1×N switch in the package can have a different value of 'N', down to N=1. Also, any arbitrary combination of N×1 or 1×N configured switches can be used by altering the external fibering. All of this is possible because of the BSE 68's ability to refract an arbitrary number of rays at arbitrary angles, although at some point of increasing the number of switches BSE 68 may become impractically complex.

Use of common components by multiple internal N×1 or 1×N switches enables advantages in physical size, thermal output, electrical power consumption, ease of manufacture, and materials and labor costs, when compared to a solution involving multiple switches built and packaged independently.

Figure 16:
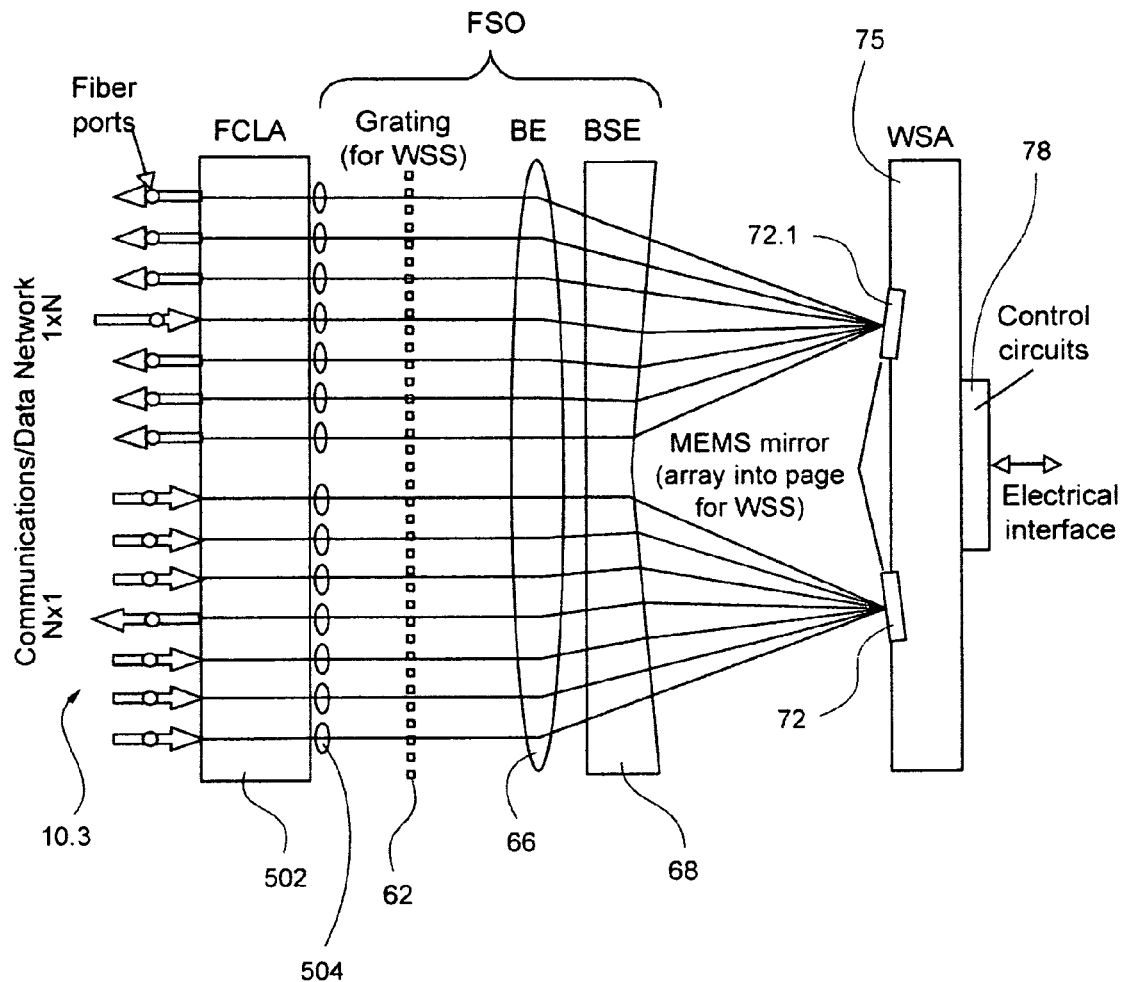
FIG. 16 is a schematic illustration of a wavelength selective switch with BSE-based architecture FCLA-based optics of FIG. 10 according to an alternate embodiment of the present invention.

FIG. 16 illustrates a variation of the BSE-based architecture of the switch in FIG. 15, in combination with FCLA-based optics with lenslets 504 of FIG. 10. The BSE architecture can be used with this type of optical input, as well as the FCA 52 and FE 56 shown in FIGS. 1, 2, and 15. An advantage of this approach is that the complexity of BSE 68 is significantly reduced.

Figure 17A:
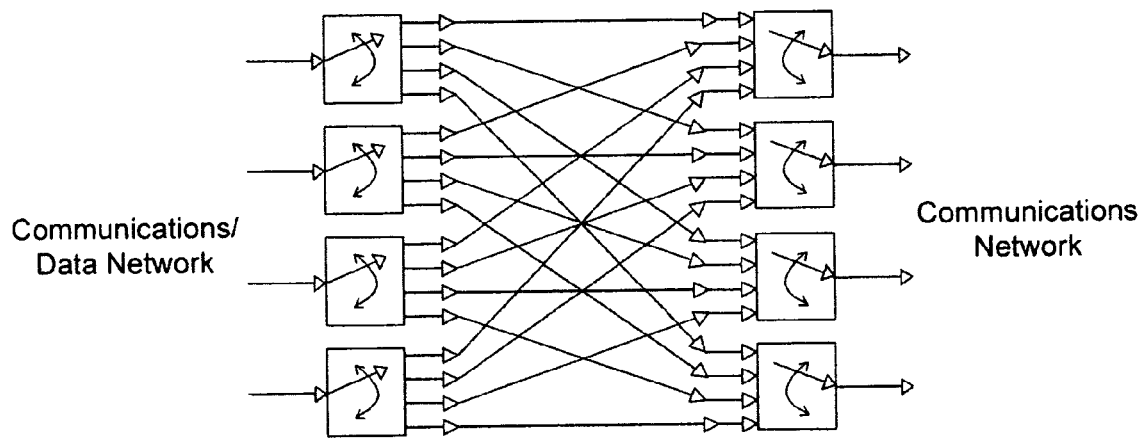
FIGS. 17A and 17B are schematic illustrations of a 4-input-fiber by 4-output-fiber optical switch, made up of four 1×N and four N×1 wavelength selectable switches.
Figure 17B:
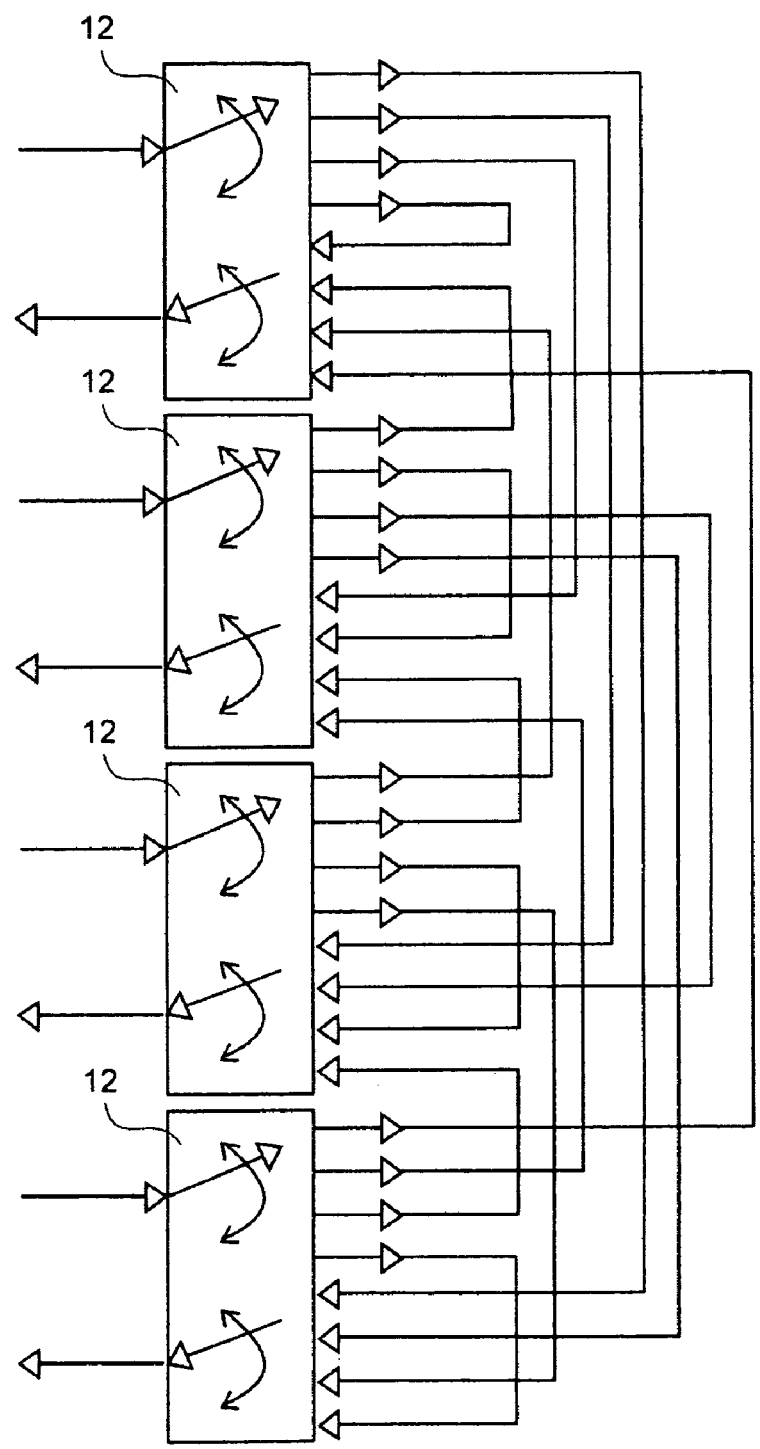

Referring now to FIGS. 17A and 17B there is a schematic illustration of an advantage of the present invention. FIG. 17A is prior art that illustrates schematically a 4-input-fiber by 4-output-fiber optical switch, made up of four 1×N and four N×1 wavelength selectable switches. This is a common switch architecture used in telecom industry. In FIG. 17B, is a schematic illustration of the same 4×4 switch 12, but utilizing an embodiment of the present invention of FIG. 15, wherein two switches are co-packaged in the same device. It should be recognized that the switch shown in FIG. 17B utilizes the advantages listed above in the description of FIG. 15, compared to the "one-switch-per-device" architecture of FIG. 17A. Although both figures show a 4×4 switch, the concept can easily be extended to any value of M×N. Likewise, although FIG. 17B illustrates two switches in each device, any number of switches can be combined using the concept of the present invention. Other telecom architectures that employ multiple optical switches, such as East-West dual rings, can also benefit from the embodiments of this invention.

Figure 18A:
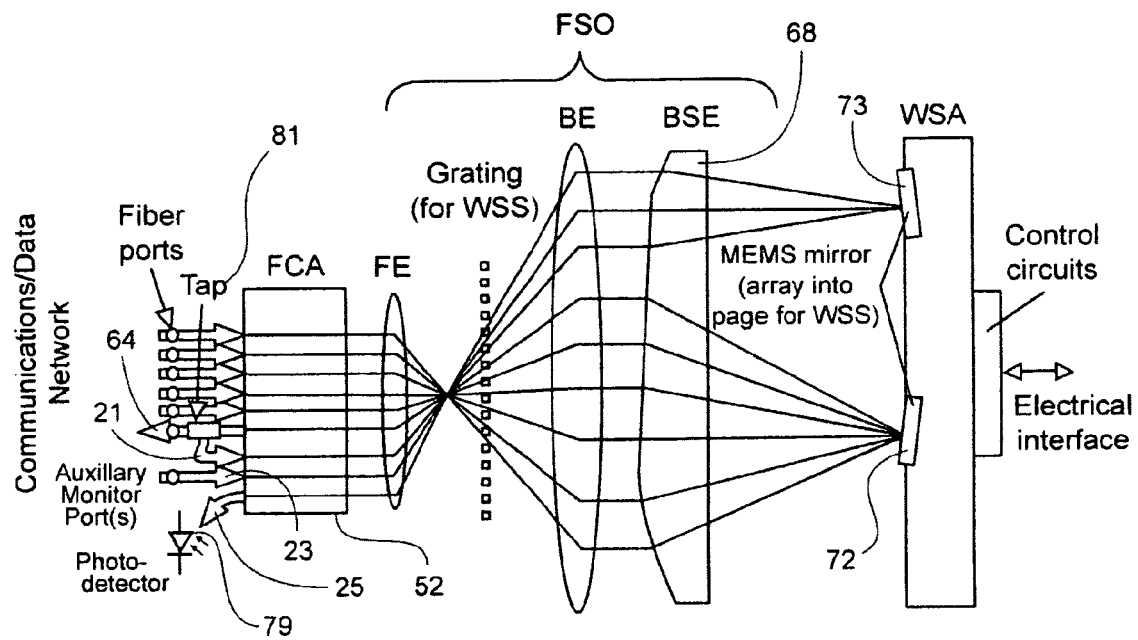
FIG. 18A is a schematic illustration of a five input port by one output fiber port wavelength cross-connect switch according to an alternate embodiment of the present invention.

FIG. 18A is a schematic illustration of additional aspects and advantages of the present invention. In this embodiment, BSE 68 is constructed with prisms that direct beams to two rows of mirrors. The lower row switching mirror array 72 is used to switch 5×1 signals as shown in FIG. 15. The upper row monitoring mirror array 73 is used to switch 2×1 monitoring beams as a separate switch. The output of the 2×1 monitoring switch is directed to a photodetector 79 serving as an integrated optical power monitor (OPM). By sequentially switching each mirror 73 in the array to send selected beam to photodetector 79, while dropping all other wavelengths, such switch obtains, in a short period of time, the optical power of all wavelengths of monitoring fiber port 21. It is contemplated that optical switching and monitoring system is capable of monitoring two fiber ports 21 and 23 sequentially, and this concept is expandable to an arbitrary number of monitoring ports and/or wavelengths. Each wavelength of monitoring fiber port 21 is monitored one at a time, by tilting monitoring mirror array 73 to the correct angle to couple its light into output monitoring fiber port 25 from tap 81, wherein the tapped signal from output fiber port 64 is coupled to monitoring fiber port 21. It should be recognized that a key advantage of using one WSS as a fiber switch, and the other as a channel selector for an OPM, is that the 'sensor' and 'actuator' of the optical power feedback loop are both contained in the same module, and benefit from re-use of internal components as described above.

Figure 18B:
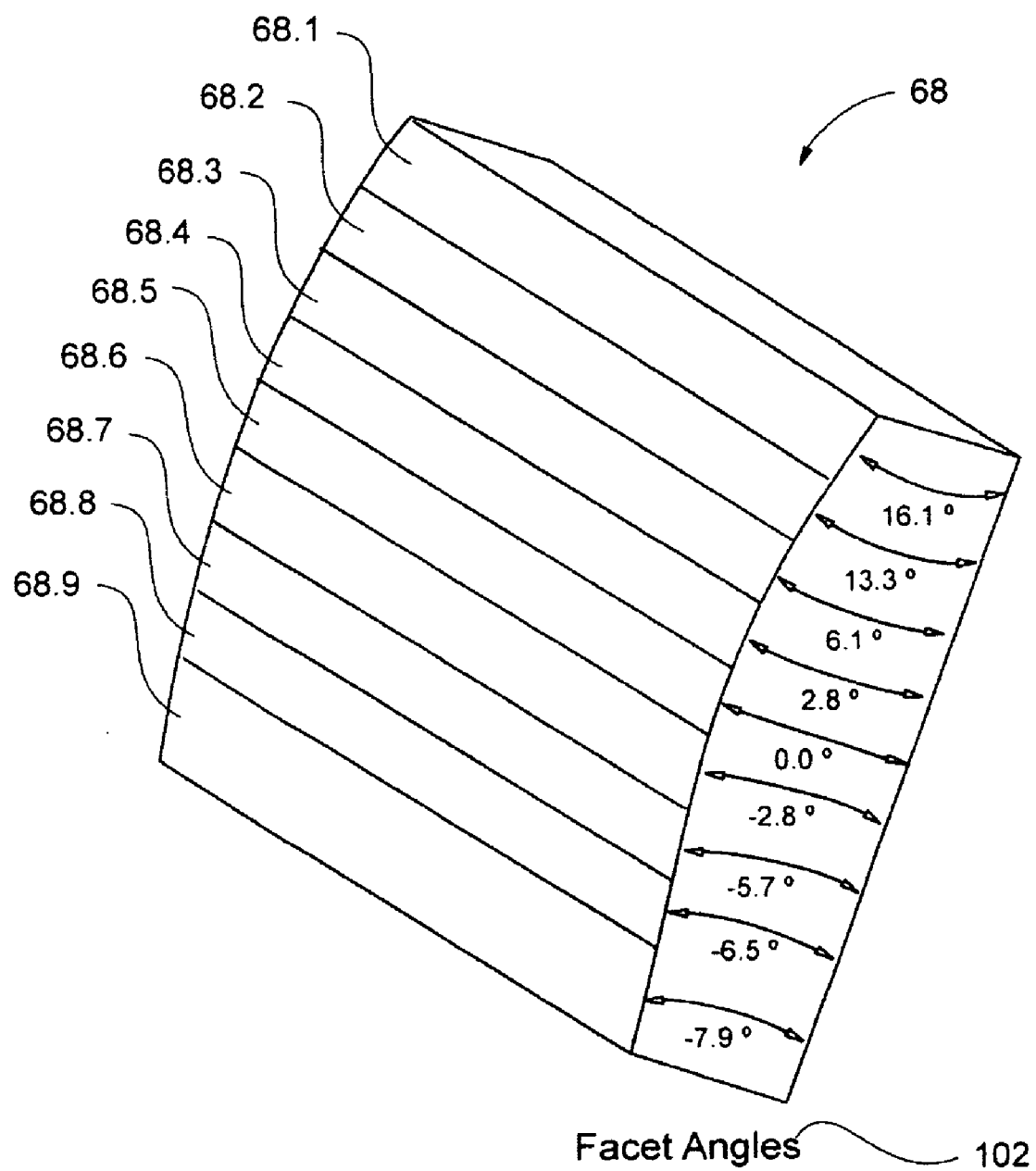
FIG. 18B is a schematic illustration of on instance of an optical beam steering element included in the WSS of FIG. 18A.

Referring now to FIG. 18B there is a physical illustration of a preferred embodiment of FIG. 3A, illustrating the design flexibility afforded by BSE 68, wherein such BSE 68 is fabricated to have varying refraction angles (facet angles). Facet angles of deflection for the five input fiber wavelengths, two input monitor fiber wavelengths, one output monitoring fiber wavelength, and one output fiber wavelength model preferably are 16.1, 13.3, 6.1, 2.8, 0.00, −2.8, −5.7, −6.5, −7.9 degrees. The angles shown in this example correspond to the 5×1 plus 2×1 embodiment shown in FIG. 18A. Beam steering element 68 preferably refracts wavelength-separated beams from back end optics 66 and steers such beams onto switching mirror array 72 and monitoring mirror array 73 based on the refractive indices of each segment 68.1-68.9, whether focusing all λn beams on a λn mirror of switching mirror array 72, monitoring mirror array 73, or focusing some λn beams onto one mirror and other λn beams on another mirror or a mirror in a different row. Beam steering element 68 preferably refracts λn from each input port 12, 14, 16, 18, 20, 22 onto λn mirror of switching mirror array 72 (as shown in FIG. 9C) of switching mirror array 72 assigned to λn and each λn from each input port 21, and 23 onto λn mirror of monitoring mirror array 73. For example, preferably λ1 mirror of switching mirror array 72 has λ1(12)-λ1(22) from all input fiber ports 12-22 projected onto λ1 mirror surface via beam steering element 68, and by tilting λ1 mirror of MEMS switching mirror array 72, wavelength selective switch 10 preferably switches one selected λ1 (12-22) from input fiber ports 12-22 to output fiber port 64 and blocks the remaining unselected λ1(s) from input fiber ports 12-22, and so forth for λ2-λn. Each λn mirror of switching mirror array 72, in this example, preferably has five input beams projected simultaneously onto the surface of such mirror, all at wavelength λn, wherein those five beams are preferably demultiplexed and focused by free space optics 74 from input fiber ports 12, 14, 16, 18, 20 respectively. In addition, preferably λ1 mirror of monitoring mirror array 73 has λ1(21) and λ1(23) from input monitoring fiber ports 21 and 23 projected onto λ1 mirror surface via beam steering element 68, and by tilting λ1 mirror of MEMS monitoring mirror array 73, wavelength selective switch 10 preferably switches one selected λ1 (21-23) from input monitoring fiber ports 21 and 23 to output monitoring fiber port 25 and blocks the remaining unselected λ1(s) from input monitoring fiber ports 21 and 23, and so forth for λ2-λn.

Figure 19A:
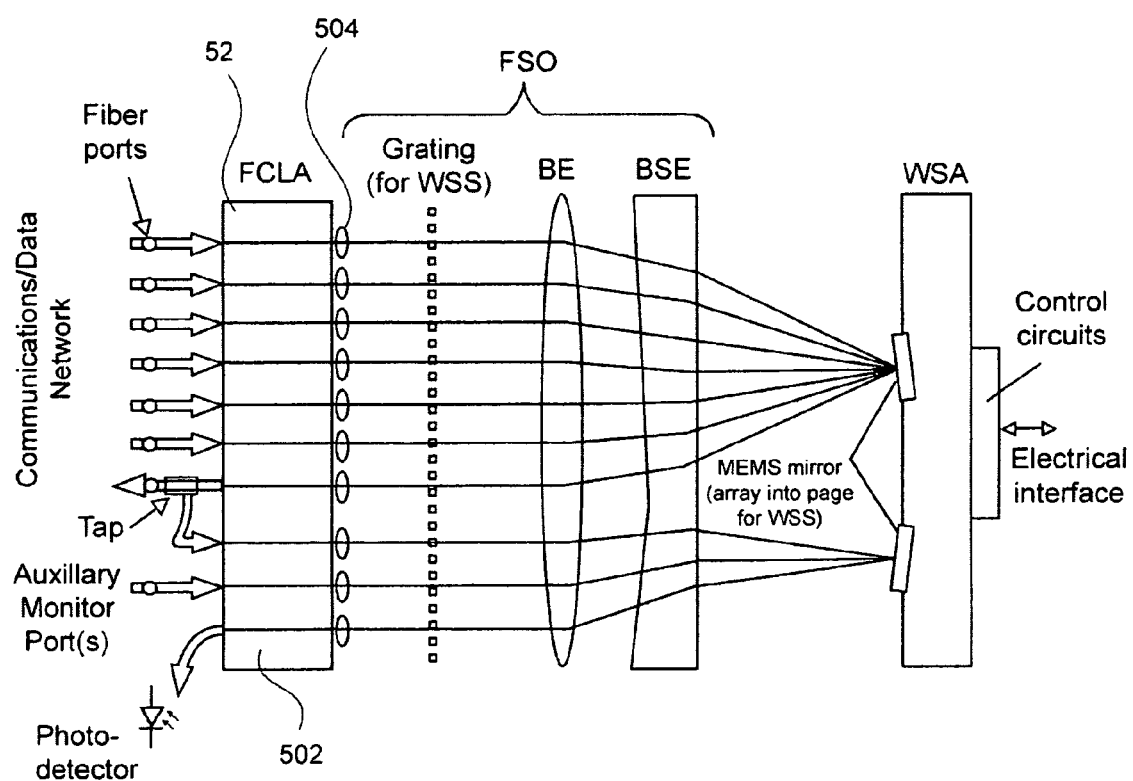
FIG. 19A is a schematic illustration of a six input port by one output fiber port wavelength selective switch according to an alternate embodiment of the present invention.

Referring now to FIG. 19A, which illustrates the combination switch plus OPM of FIG. 18A, this time with the FCLA 502 and lenslet 504 as illustrated in FIG. 10.

Figure 19B:
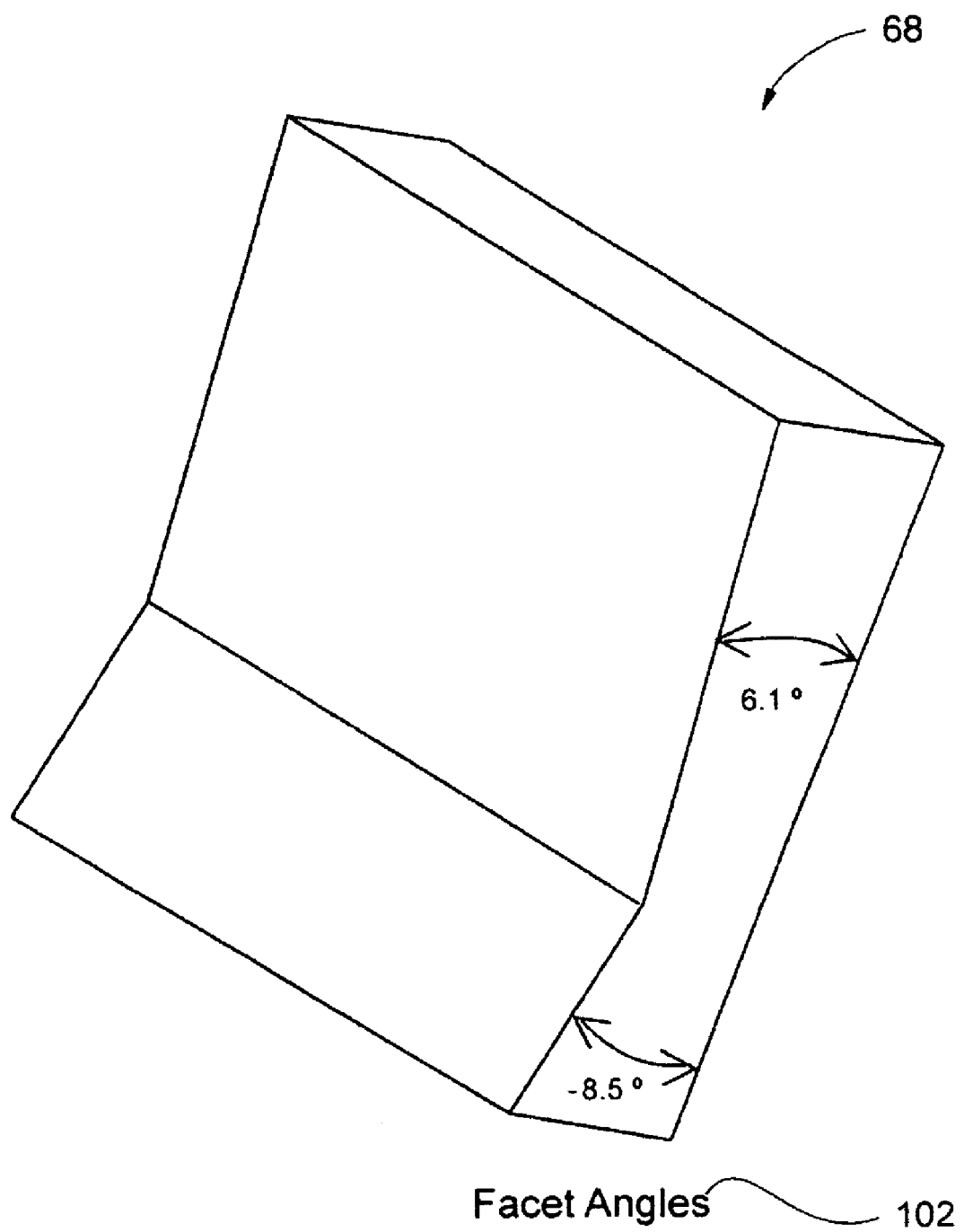
FIG. 19B is a schematic illustration of one instance of an optical beam steering element included in the WSS of FIGS. 1 and 2, 19A.

Referring now to FIG. 19B there is illustrated a variation of FIGS. 3A and 18B, illustrating the design flexibility afforded by BSE 68, by fabricating the BSE with arbitrary refraction angles. The angles shown in this example correspond to the 5×1 plus 2×1 embodiment shown in FIG. 19A. It should be recognized from FIGS. 3A, 18B, and 19B that BSE 68 is a versatile element that can be designed with an arbitrary set of prisms to accomplish refraction for a variety of embodiments and variations of the present invention. Both "FCA" plus "FE" type optical architectures can also be accommodated; and arbitrary combinations of N×1 or 1×N switches can also be accommodated by changing the number of facets and/or their refraction angles of BSE 68.

Figure 20:
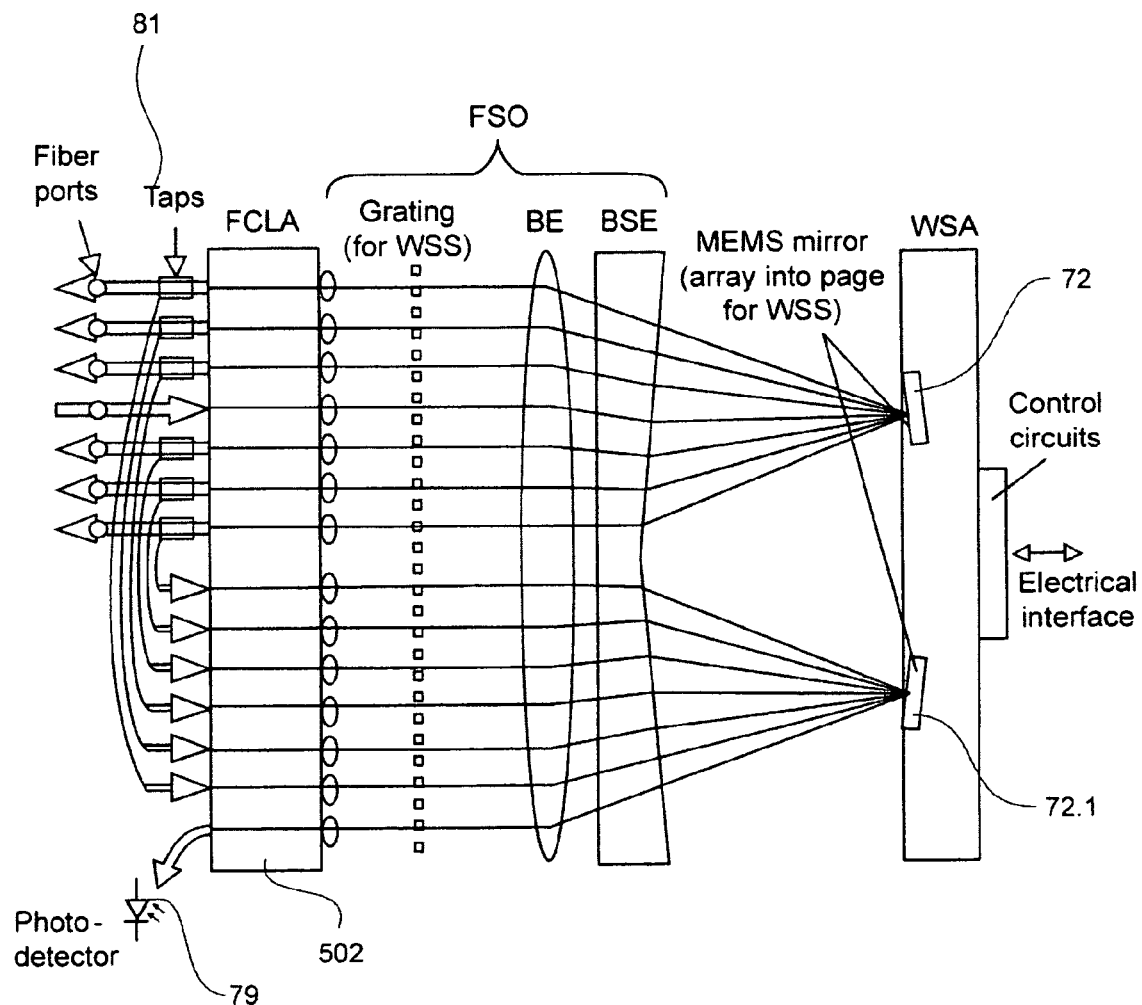
FIG. 20 is a schematic illustration of an input port by six output fiber port wavelength selective switch according to an alternate embodiment of the present invention.

Referring now to FIG. 20 there is an illustration of a variation of the switch in FIG. 16, in which switching mirror array 72 operates a 1-input and 6-output optical switch having taps 81 for each of the six output fiber ports of the top switch. In order to monitor power on all output fibers for control loop purposes, each output fiber port is tapped using taps 81 and fed to a 6-in and 1-out bottom switch co-packaged with the first top switch. The 6-in and 1-out switch selects and sends its output to photodetector 79 for monitoring. Although it is not shown, the same concept could be applied to a WSS using "FCA" plus "FE" type optical architecture, and to arbitrary numbers of fibers.

Figure 21:
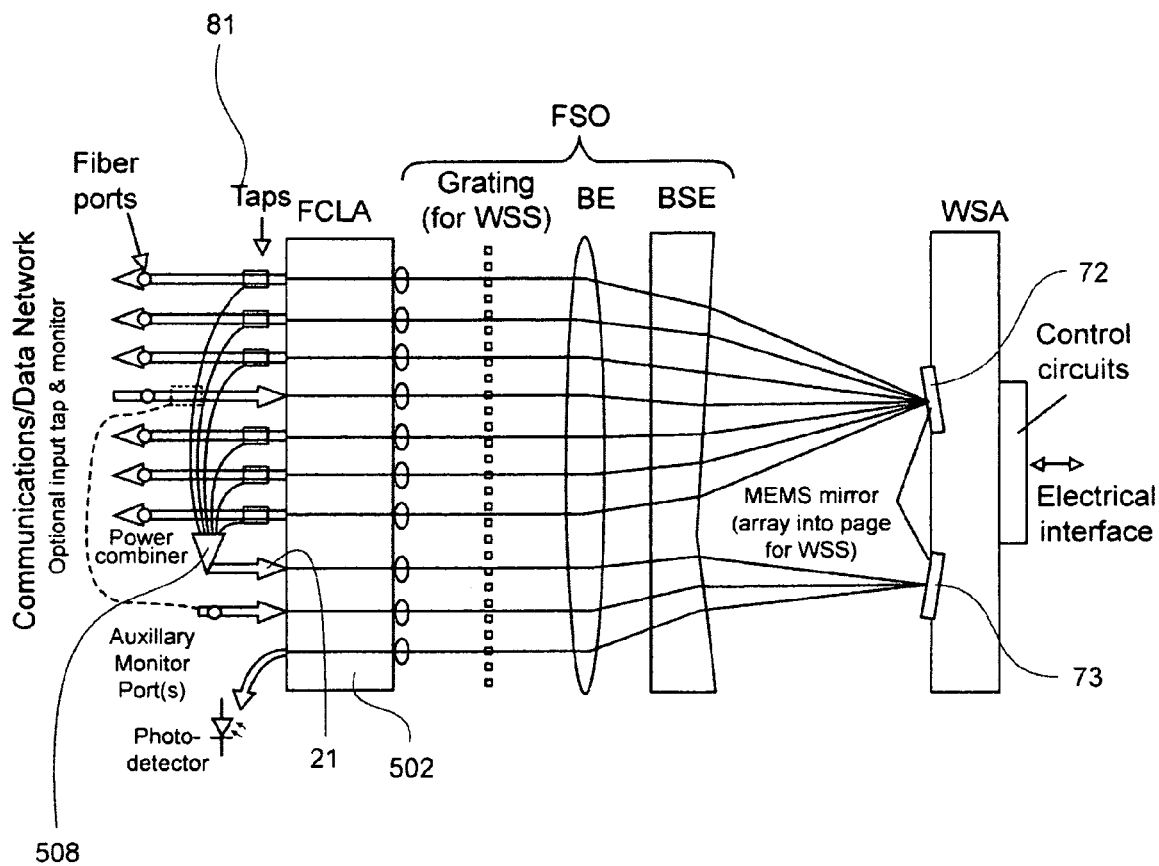
FIG. 21 is a schematic illustration of an input port by six output fiber port wavelength selective switch according to an alternate embodiment of the present invention.

Referring now to FIG. 21 there is a variation of the switch in FIG. 19A, in which power combiner 508 is used to combine all wavelengths from the six output fiber ports, which are each tapped using taps 81, fed to power combiner 508 and selectively coupled, using power combiner 508, to monitoring fiber port 21. In this embodiment, the optical switching and monitoring system has fewer ports than in the example of FIG. 20, possibly reducing the number of components simplifying the design. Although it is not shown, the same concept could be applied to a WSS using "FCA" plus "FE" type optical architecture, and to arbitrary numbers of fibers.

Figure 22A:
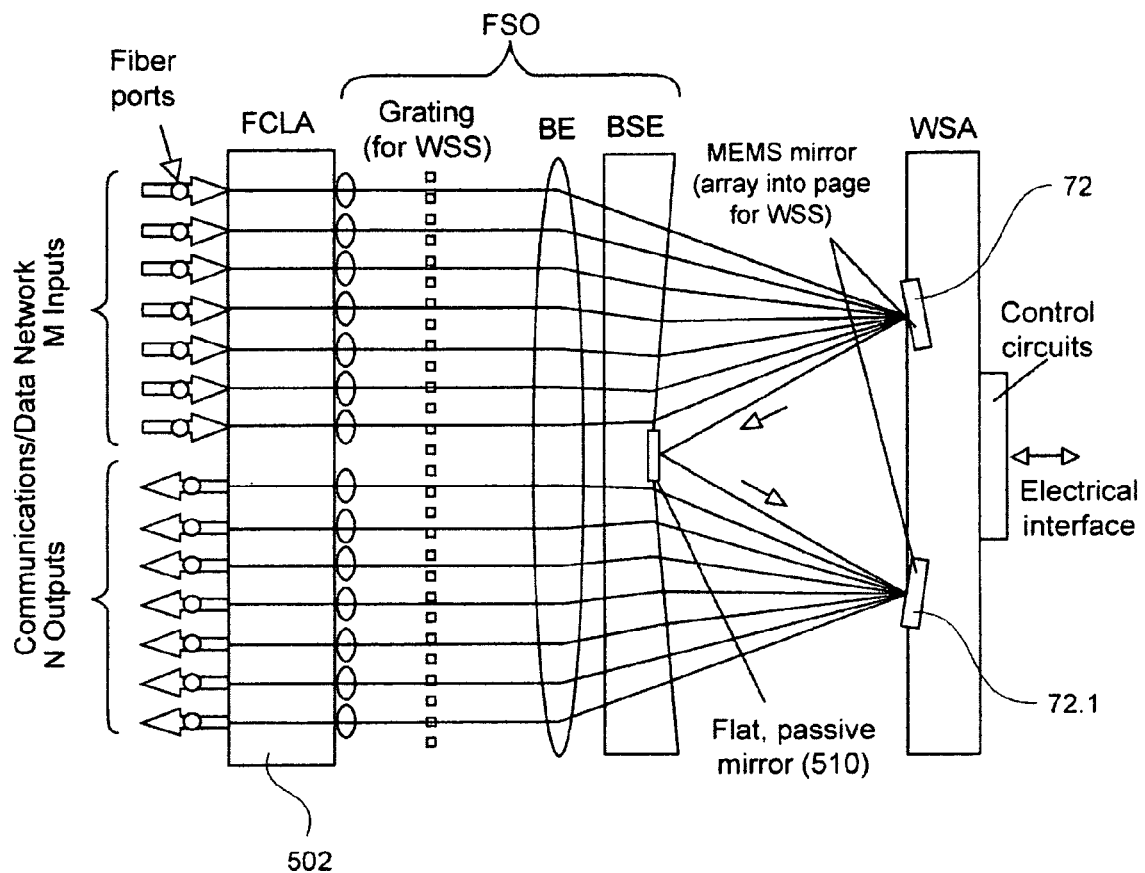
FIG. 22A is a schematic illustration of a six input port by six output fiber port wavelength selective switch according to an alternate embodiment of the present invention.

Referring now to FIG. 22A there is illustrated an alternative embodiment of the present invention. In FIG. 22A, one of the independent switches is configured to accept M inputs and focus them onto one row of a first switching mirror array 72. Each mirror in switching mirror array 72 (one mirror per wavelength) tilts to select one of the inputs for reflection onto a fixed (stationary) mirror 510, which can be patterned directly onto BSE 68 or placed elsewhere in the system. Fixed mirror 510 reflects the beam onto one row of a second switching mirror array 72.1. Each mirror in second switching mirror array 72.1 tilts to the angle necessary to project its beam to the selected one of N outputs. The system thus operates as an M-input by N-output switch, since any input can be coupled to any output. Although it is not shown, the same concept could be applied to a WSS using "FCA" plus "FE" type optical architecture, and to arbitrary numbers of fibers. This alternative embodiment of the present invention is different from the M×N optical switches described in U.S. Pat. No. 6,097,859 (Solgaard et al) because each wavelength in the present invention can only exit the unit on one output fiber at a time. In the referenced Solgaard patent, the M×N establishes multiple in-to-out paths on the same wavelength; however, the present invention teaches a simpler design, using fewer mirror rows, for example.

Also, in this and other inventions which incorporate two mirrors in the light path, an additional advantage can be gained when using Pulse Width Modulated (PWM) signals to drive the mirrors, as described in U.S. Pat. Nos. 6,543,286 (Garverick, et al), 6,705,165 (Garverick, et al), and 6,961,257 (Garverick, et al). By operating each of the two mirrors in the path with complementary pulse trains, any insertion loss (IL) ripple caused by mechanical vibration of the mirrors can be reduced by operating each mirror with a complementary pulse train. This causes any mechanical vibration in one mirror to occur 180 degrees out of phase with the other mirror, thus canceling IL ripple in the optical signal.

Figure 22B:
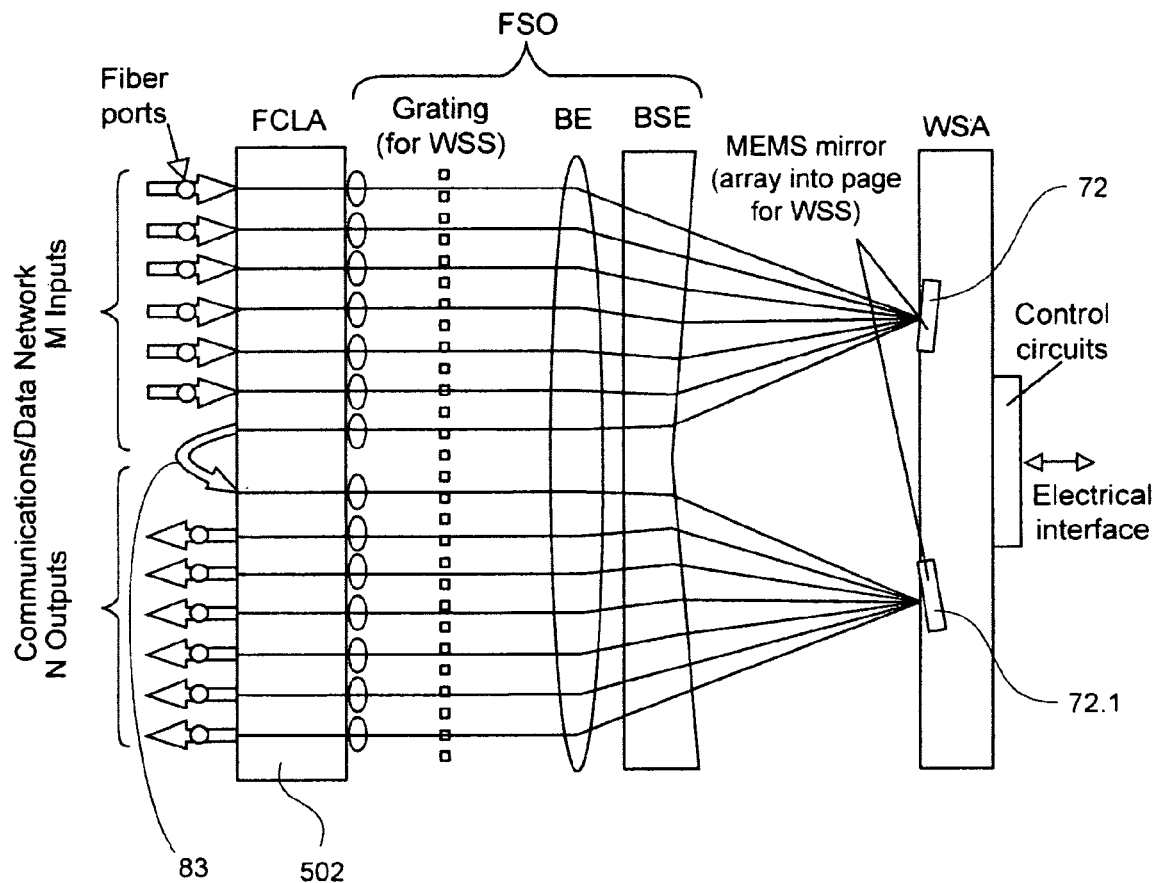
FIG. 22B is a schematic illustration of a six input port by six output fiber port wavelength selective switch according to an alternate embodiment of the present invention.

Referring now to FIG. 22B there is illustrated an alternative embodiment of the present invention which accomplishes the same M×N switching functionality of FIG. 22A. In this embodiment, there is no stationary mirror. Instead the input-side switch is configured as an N×1, and the output side as a 1×N. The output of the first switch is coupled to the input of the second, either by fiber splicing, jumpering via fiber connectors 83, on-chip patterning of waveguides, or the like. Although it is not shown, the same concept could be applied to a WSS using "FCA" plus "FE" type optical architecture, and to arbitrary numbers of fibers. This alternative embodiment of the present invention is different from the M×N optical switches described in U.S. Pat. No. 6,097,859 (Solgaard et al) because each wavelength in the present invention can only exit the unit on one output fiber at a time. In the referenced Solgaard patent, the M×N establishes multiple in-to-out paths on the same wavelength; however, the present invention teaches a simpler design, using fewer mirror rows, for example.

Figure 23:
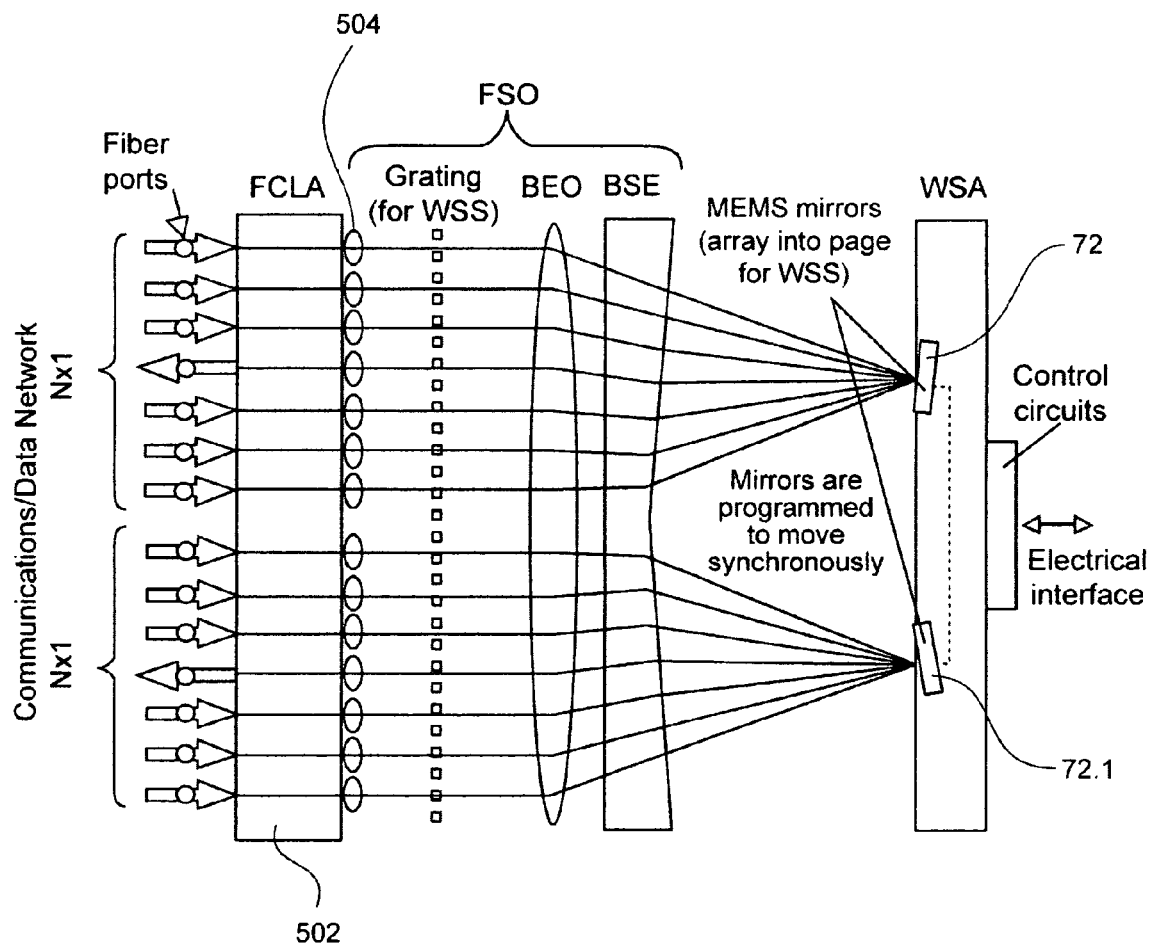
FIG. 23 is a schematic illustration of a six input port by six output fiber port wavelength selective switch according to an alternate embodiment of the present invention.

Referring now to FIG. 23 there is illustrated an alternative embodiment of the present invention. In FIG. 23 the switch is configured as two identical, independent switches. In this embodiment first and second switching mirror arrays 72 and 72.1 are operated such that they move synchronously. Although it is not shown, the same concept could be applied to a WSS using "FCA" plus "FE" type optical architecture, and to arbitrary numbers of fibers, numbers of co-packaged switches, and arbitrary port designations (input versus output).

With respect to the above description then, it is to be realized that the optimum dimensional relationships for the parts of the invention, to include variations in size, materials, shape, form, position, function and manner of operation, assembly and use, are intended to be encompassed by the present invention. Moreover, where the references are made to a 1×5 or 5×1 optical wavelength selective switch, the concepts are also applicable to other fiber counts such as 1×N, N×1 or N×N.

Figure 24A:
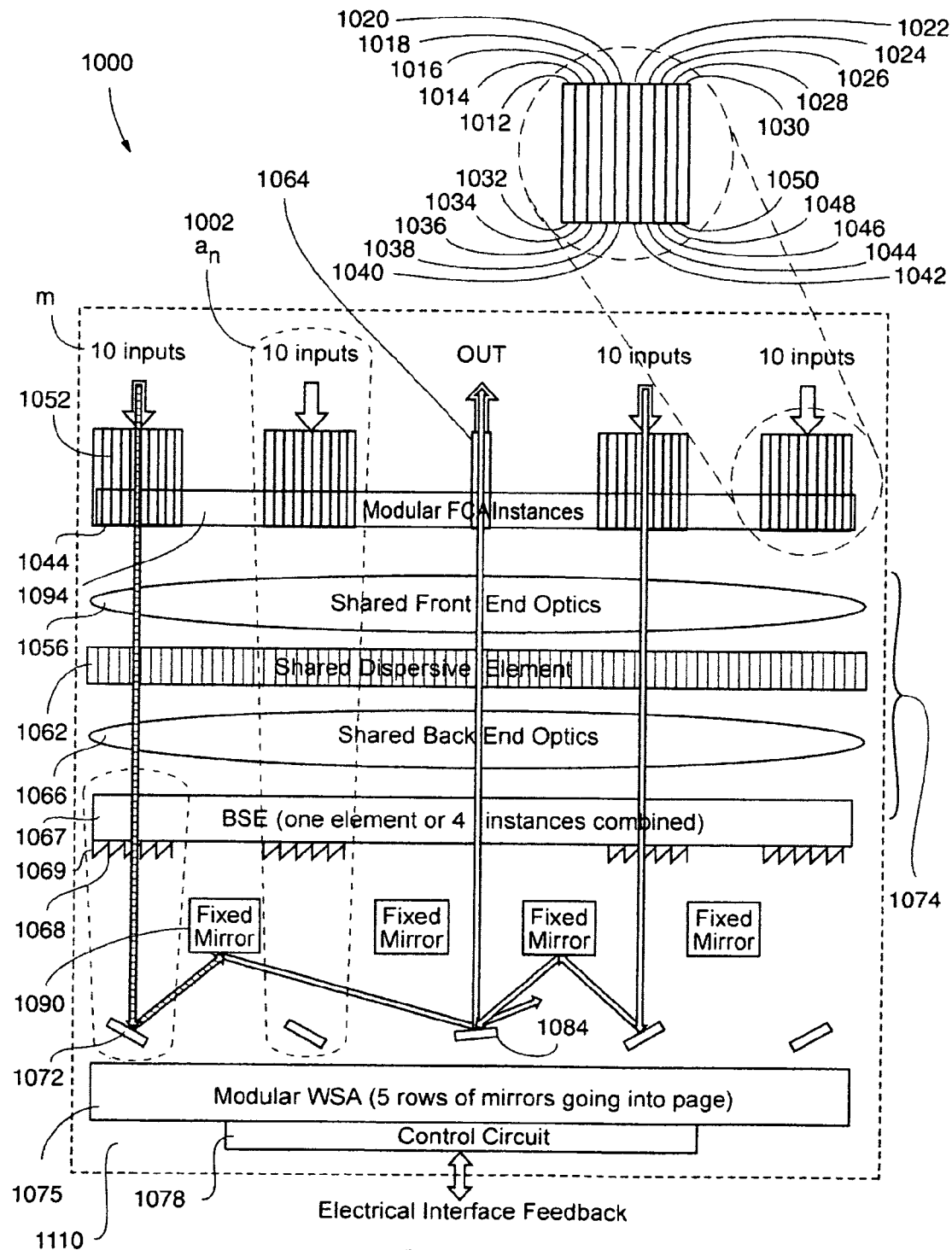
FIG. 24A is a top view schematic illustration of a forty input port by one output port wavelength selective switch, comprised of four instances of ten input ports each, according to an alternate embodiment.

Referring now to FIG. 24A, there is illustrated a schematic illustration of a 4× instantiated ($a_4$) ten input port (m), resulting in forty input port (a×m) by one output port wavelength selective switch 1000. However, it is emphasized that this 10×1 instantiated embodiment or instance 1002 is illustrated only for simplicity, and that by increasing the number of input fiber ports m and/or the number of instances a, a high port count instantiated wavelength selective N×1 switch 1000 is contemplated herein, wherein N represents the number of total input fiber ports (a×m=N), a represents the number of instances 1002 co-packaged together and m represents the number of ports in each instance 1002. Wavelength selective switch 1000 can be operated in either direction, wherein N of N×1 represents N input fiber ports and one output fiber port, or one input port and N output fiber ports shown in FIG. 24B. In the (4×10)×1 wavelength selective switch 1000 shown in FIG. 24, each instance 1002 is shown having ten input fiber ports (m) 1012, 1014, 1016, 1018, 1020, 1022, 1024, 1026, 1028, 1030, grouped as instance 1002, which are optically coupled to fiber concentrator array (FCA) 1052 (fiber port concentrator), preferably in a linear alignment, wherein each instance 1002 of waveguides 1032, 1034, 1036, 1038, 1040, 1042, 1044, 1046, 1048, and 1050, grouped as instance 1002, are used to bring the respective signals of fiber ports (m) 1012, 1014, 1016, 1018, 1020, 1022, 1024, 1026, 1028, and 1030 closer together on output face 1044 (as shown in FIG. 7) for each instance 1002 of concentrator 1052. It is contemplated herein that m representing the number of ports in each instance 1002 may be constant as in ten input fiber ports for each instance 1002 or m may vary for each instance 1002 and various combinations thereof.

In a preferred alternate embodiment, each instance 1002 of switch 1000 shares common optical elements of the shared free space optics 1074 including, but not limited to, front end optics 1056, dispersive element 1062, and back end optics 1066. Moreover, switch 1000 preferably maps instances of arrays (rows) of micro electromechanical system (MEMS) mirror instances 1072 of WSA 1075 onto instances of FCA 1052. It is contemplated herein that switch 1000 may be configured with each optical component set forth herein as an instance 1002 co-packaged together with other like instances, or as a single element shared by other elements in the system, or as combinations of shared and instantiated alike.

The beams output from each instance 1002 of fiber concentrator 1052 into the free space of wavelength selective switch 1000 preferably pass through shared front end optics (FEO) 1056. Outputs of (m) waveguides 1032, 1034, 1036, 1038, 1040, 1042, 1044, 1046, 1048, and 1050 grouped as instance 1002 preferably are placed at or near the focal point of shared front end optics 1056. Shared front end optics 1056 preferably accepts the beams coming from or going to all fibers via input ports fiber ports (m) 1012, 1014, 1016, 1018, 1020, 1022, 1024, 1026, 1028, 1030 grouped as instance 1002. For beams emerging from a fiber or input port, shared front end optics 1056 preferably captures, focuses, conditions, projects and/or collimates the light in preparation for spectral dispersion by shared dispersive element 1062. The reverse of this happens for beams converging toward a fiber; that is, the principles of operation are identical in either case, and independent of the direction of the light. Although a single lens is illustrated in FIG. 24, shared front end optics 1056 may generally consist of two or more shared lenses and/or mirrors or a combination of the same, and may become progressively more sophisticated as the demands on wavelength selective switch 1000 increase (e.g., the number of fibers, the range of wavelengths, the number of input and output fiber ports, the spacing of the MEMS mirrors, etc.).

The collimated beams exiting shared front end optics 1056 propagate substantially within a common plane, and are incident upon shared dispersive element 1062, a wavelength dispersive element, wherein shared dispersive element 1062 preferably comprises grating lines extending perpendicular to the principal plane of wavelength selective switch 1000. The beams may overlap when they strike shared dispersive element 1062, wherein shared dispersive element 1062 preferably separates the (m) input port beams into corresponding sets of wavelength-separated beams, λ1 through $\lambda_{(k)}$ (wavelengths) for each input port m, where k is the number of wavelengths in each input port m. Shared dispersive element 1062 angularly separates the multi-wavelength input beams into wavelength-specific sub-beams propagating in different directions parallel to the principal optical plane, or alternatively serves to recombine single-wavelength sub-beams into a multi-wavelength beam. Shared dispersive element 1062 is preferably uniform in the fiber direction, wherein the preferred uniformity allows use of shared dispersive element 1062 for beams to and from multiple input and output fibers. In FIG. 24, the principal optical plane, or 'fiber plane', is in the plane of the page, and the wavelength dispersion and MEMS arrays extend out of the plane of the page, perpendicular to the principal plane.

Shared back end optics (BE) 1066 projects the wavelength-separated beams onto instantiated beam steering elements (BSE) 1067. Shared back end optics 1066 creates the "light bridge" between dispersive element 1062 and instantiated beam steering element 1067. Considering the case of light diffracting from shared dispersive element 1062 and traveling toward shared back end optics 1066, such shared back end optics 1066 preferably capture the angularly (versus wavelength) separated beams of light in the fiber plane, which are made plural by the number of fibers (m), and wherein shared back end optics 1066 create parallel beams of light for projection onto instantiated BSE 1067. The parallel beams are obtained via a preferred telecentric functionality of shared back end optics 1066. In addition, because all beams are preferably at focus simultaneously on the flat MEMS plane of mirror array instance 1072; shared back end optics 1066 preferably perform with a field-flattening functionality. After light reflects off of MEMS mirror mirrors and back into shared back end optics 1066, the reverse of the above occurs; the principles of operation are identical in either case and are independent of the direction of the light. Shared back end optics 1066 preferably captures, focuses, conditions, projects and/or collimates the light in preparation for switching by mirror array instance 1072. The reverse of this happens for light beams converging toward a fiber; that is, the principles of operation are identical in either case, and independent of the direction of the light.

Figure 24B:
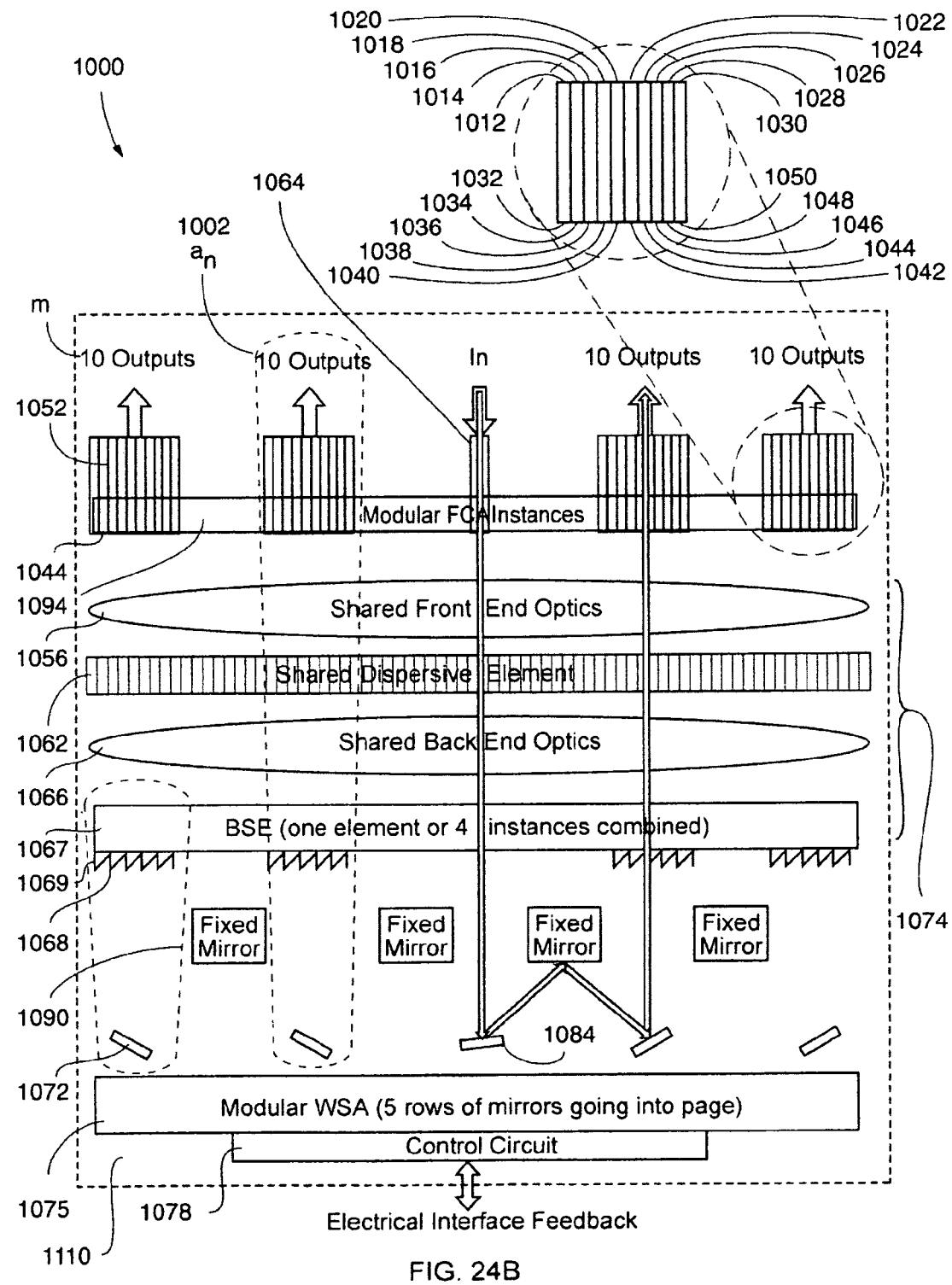
FIG. 24B is a top view schematic illustration of a one input port by forty output port wavelength selective switch, comprised of four instances of ten input ports each, according to an alternate embodiment of FIG. 24A.

Although a single lens is illustrated in FIGS. 24A and 24B, shared back end optics 1066 may generally consist of two or more lenses and/or mirrors or combinations of the same, and may become progressively more sophisticated as the demands on wavelength selective switch 1000 increase (e.g., the number of fibers, the range of wavelengths, the number of input and output fiber ports, the spacing of the MEMS mirrors, etc.). The focal length of shared back end optics 1066 (or the effective focal length in the case of multiple lenses) is preferably determined from the rate of angular dispersion versus wavelength of shared dispersive element 1062 and the desired mirror spacing of arrayed switching element, mirror array instance 1072.

Next, instantiated beam steering elements (BSE) 1067 (or one or more segmented prism elements or modules, one possible type of beam steering element) and its instance beam steering element 1068 for each instance 1002 preferably refracts $\lambda_{(k)}$ from each input fiber port (m) 1012, 1014, 1016, 1018, 1020, 1022, 1024, 1026, 1028, 1030, for each instance 1002 onto the $\lambda_{(k)}$ mirror located in mirror array instance 1072 of wavelength switching assembly (WSA) 1075 (as shown in FIG. 9C) assigned to $\lambda_{(k)}$ of instances $a_n$. For example in each instance 1002, preferably λ1 mirror array instance 1072 of WSA 1075 has λ1(1012)-λ1(1030) from all input fiber ports (m) 1012-1030 projected onto λ1 mirror array instance 1072 surface (as shown in FIG. 9) via beam steering element 1068 grouped as instance 1002, where λ1 mirror of mirror array instance 1072 preferably is dedicated to a specific BSE 1068 grouped as instance 1002, which is dedicated to a specific FCA 1002 grouped as instance 1002. By moving, rotating or tilting λ1 mirror array instance 1072 of WSA 1075 using control circuit 1078, wavelength selective switch 1000 preferably switches one selected λ1 (1012-1030) from input fiber ports 1012-1030 to fixed mirror 1090 grouped as instance 1002. Moreover, each of the input fiber ports (m) 1012 maps to a single facet 1069 of beam steering element 1068 grouped as instance 1002, and facet 1069 of instance beam steering element 1068 projects each wavelength of input fiber port (m) 1012 to a designated $\lambda_{(k)}$ mirror of mirror array instance 1072 (shown coming out of the page in FIG. 24A-C or as a row of mirror array instance 1072 of WSA 1075.

Instantiated BSE 1067 may comprise a single, monolithic large steering element that would contain all the facets 1069 needed for switch 10 or 1000 or comprise one or more smaller beam steering elements 1068 grouped as instances 1002 and/or modules of facets 1069 fabricated and attached separately for better yield characteristics for each instance 1002, versus yield characteristics for a single, monolithic large steering element. Utilizing smaller instances 1002 and/or modules of facets 1069 of instance BSE 1068 improves manufacturability yield (yield decreases with increased size, performance characteristics, and complexity of instance BSE 1068 resulting in rejection of expensive optical components not meeting full specifications) of instances of common elements and reduces the cost of switch 10 and 1000 verses a comparable non-instantiated large N×1 wavelength selective switch. Such yield characteristics, improved manufacturability, and reduced cost associated with instantiated BSE 1067 and instance BSE 1068 is applicable to wavelength switching assembly (WSA) 1075 and fiber concentrator 1052.

An 'instance 1002' herein is a group of fiber ports (m), each fiber port m maps to facet 1069 of instance beam steering element 1068, each group of facets of beam steering element 1068 grouped as instances 1002 maps to a row of mirrors instance 1072 (coming out of the page in FIG. 24A-B,D) of WSA 1075. Each such instance 1002 share front end optics 1056, dispersive element 1062, back end optics 1066; and base plate 1110, which enables precise positioning of both shared and instance elements on base plate 1110.

Figure 26A:
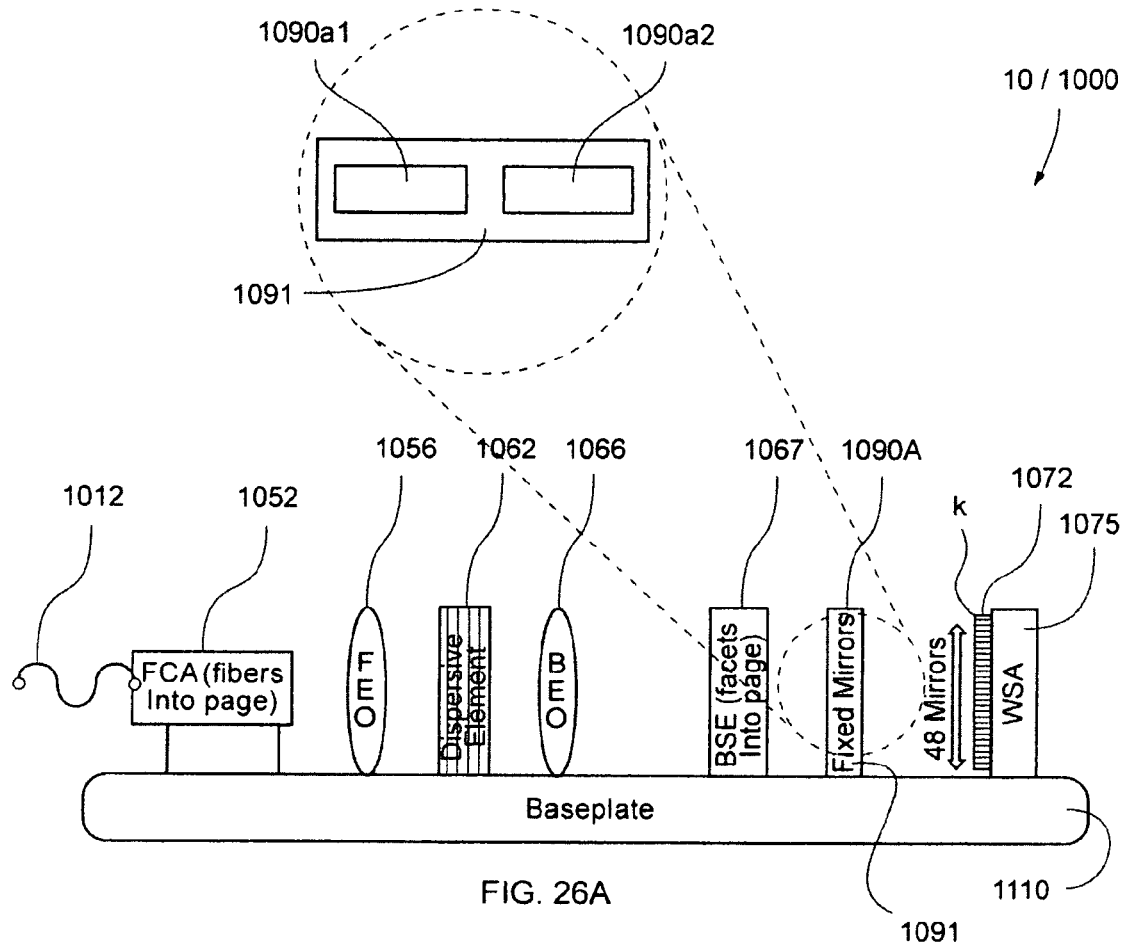
FIG. 26A is a side view of wavelength selective switch with optical components on a baseplate according an embodiment of the switch shown to FIG. 24 or 25.

Preferably, fixed mirror 1090 comprises individual mirrors (instances) affixed to baseplate 1110, however, in an alternate embodiment fixed mirror 1090 may comprise glass plate 1091 housing one or more fixed mirrors 1090 as reflective coatings affixed to glass plate 1091 as shown in FIG. 26A.

Preferably, fixed mirror 1090 dedicated to instance 1002 reflects the one selected λ1 (1012-1030) from λ1 mirror of mirror array instance 1072 of WSA 1075 to λ1 output mirror 1084 of WSA 1075. λ1 output mirror 1084 of WSA 1075 receives one selected λ1 (1012-1030) from each fixed mirror 1090 grouped as instance 1002. Wavelength selective switch 1000 preferably switches one selected λ1 from any input fiber ports 1012-1030 of any instances $a_1$-$a_n$ to output fiber port 1064 and blocks the remaining unselected λ1(s) from all other input fiber ports input fiber ports 1012-1030 of any instances $a_1$-$a_n$, and so forth for λ2-$\lambda_{(k)}$. Each $\lambda_{(k)}$ mirror of mirror array instance 1072, in this example, preferably has ten (m) input beams projected simultaneously onto the surface of such $\lambda_{(k)}$ mirror, all at wavelength $\lambda_{(k)}$, wherein those ten (m) beams are preferably demultiplexed and focused by free space optics 1074 from each input fiber ports (m) 1012, 1014, 1016, 1018, 1020, 1022, 1024, 1026, 1028, 1030, for each instance ($a_n$) respectively. It should be recognized that utilizing instance beam steering element 1068 enables refracting and/or steering of multiple beams of the same wavelength onto a single dedicated $\lambda_{(k)}$ mirror from one or more input fiber ports 1012-1030 or refracting light to any arbitrary point rather than prior art switches, which use lenses or mirrors to focus signals of the same wavelength onto a single dedicated mirror based on one focal point. Further, it should be recognized that utilizing instantiated beam steering element 1067 enables multiple N×1 switches to be packaged as a single unit as shown in FIGS. 14 and 15. Still further, it should be recognized that utilizing instantiated beam steering element 1067 enables the potential elimination of lenslets for each optical fiber port, thereby reducing the number of elements and the overall cost of the switch. Each $\lambda_{(k)}$ output mirror 1084, in this example, preferably has four instances($a_n$) input beams projected simultaneously onto the surface of such mirror, all at wavelength $\lambda_{(k)}$, wherein those four instances ($a_n$) beams are preferably conditioned and focused by free space optics 1074 from any input fiber ports (m) 1012, 1014, 1016, 1018, 1020, 1022, 1024, 1026, 1028, 1030, for each instance ($a_n$) respectively. Preferably, a single WSA 1075 having mirror rows as instances 1072 and output mirror 1084, each mirror in the mirror array instance 1072 dedicated to wavelength $\lambda_{(k)}$, is utilized for selecting at least one wavelength component from any of the discrete sets of m fibers of instance 1002 for each wavelength of the multi-wavelength WDM signal, and wherein such switch directs the selected wavelength component from mirror array instance 1072 to fixed mirror 1090, which redirects the selected wavelength component to output mirror 1084, which redirects the selected wavelength component to output fiber port 1064 of wavelength selective switch 1000 in the same physical housing. In this example, the unfilled line representing $\lambda_{(k)}$ from instance $a_3$ is being switched to output fiber port 1064 and the solid line representing $\lambda_{(k)}$ from instance $a_1$ is being blocked along with all other $\lambda_{(k)}$ of wavelength selective switch 1000.

Figure 24C:
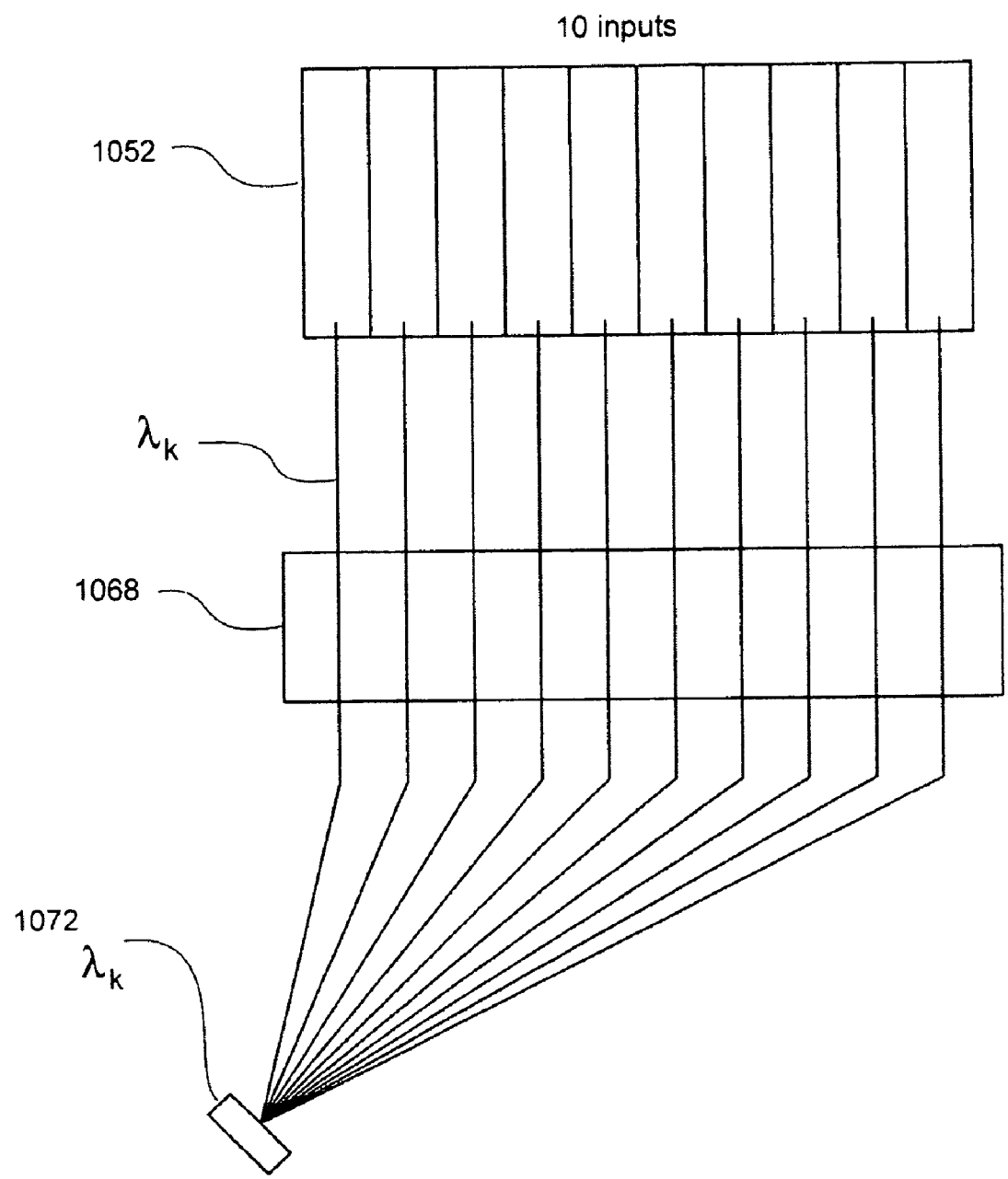
FIG. 24C is a side view schematic illustration of a ten input port instance showing one instance mirror receiving a designated wavelength from each input port, according to an alternate embodiment.
Figure 24D:
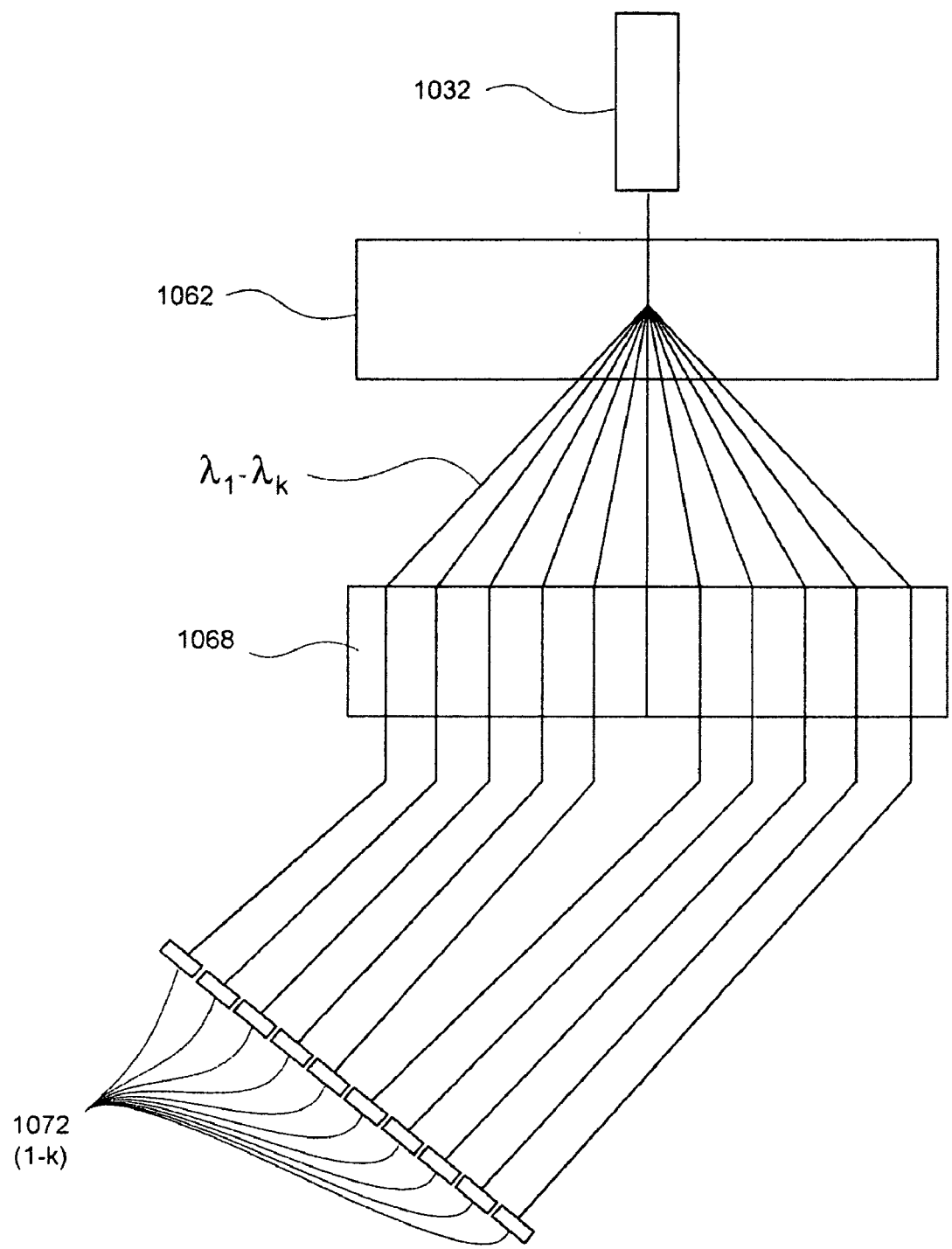
FIG. 24D is a top view schematic illustration of one input port of an instance showing each wavelength of the optical signal being positioned on a different mirror in a row of MEMS mirrors, according to an alternate embodiment.

FIG. 24A-B illustrates a 'cutaway' view of one wavelength $\lambda_{(k)}$, and each $\lambda_{(k)}$ mirror of mirror array instance 1072 shown represents a row of mirrors as shown in FIG. 24D (but coming out of the page in FIG. 24A-B versus in the plane of the page in FIG. 24D), each mirror corresponding to a different wavelength $\lambda_{(k)}$ separated out by dispersive element 1062 and positioned by instance BSE 1068. FIG. 24D illustrates one representative waveguide 1032 of fiber concentrator array (FCA) 1052 instance showing for example input fiber port 1020 and row of $\lambda_{(k)}$ mirrors of instance mirror array 1072 $\lambda 1$-$\lambda_{(k)}$. Preferably, instance beam steering element 1068 positions each wavelength $\lambda 1$-$\lambda_{(k)}$ of the optical signal from for example input fiber port 1020 onto separate $\lambda_{(k)}$ mirrors of mirror array instance 1072 grouped as an instance.

FIG. 24C illustrates a fiber concentrator array (FCA) 1052 instance showing input fiber ports (m) 1012, 1014, 1016, 1018, 1020, 1022, 1024, 1026, 1028, 1030 (as shown in FIG. 24A) of FCA 1052 and $\lambda_{(k)}$ mirror of mirror array instance 1072. Preferably, beam steering element 1068, grouped as instance 1002, positions wavelength $\lambda_{(k)}$ from each input fiber ports (m) 1012, 1014, 1016, 1018, 1020, 1022, 1024, 1026, 1028, 1030 onto $\lambda_{(k)}$ mirror of mirror array instance 1072.

In this example, the two selective switching mirrors, $\lambda_{(k)}$ mirror of mirror array instance 1072 (essentially a 10:1 selective switch (m)) and $\lambda_{(k)}$ output mirror 1084 (essentially a 4:1 instance 1002 selective switch ($a_n$)), present in each optical path of the wavelength selective switch 1000 preferably enable a (m)×($a_n$), 4×10:1, forty input by one output, or 40×1, large N×1 wavelength selective switch with k wavelengths. In FIGS. 24A & C, $\lambda_{(k)}$ mirror of mirror array instance 1072 and $\lambda_{(k)}$ output mirror 1084 represent one lambda layer of switch 1000 and depending on the number of wavelengths $\lambda_{(k)}$ per input fiber port, k mirrors comprise each mirror array instance 1072, as well as the row of output mirror mirrors 1084, going into the page in FIGS. 24A & C. It is contemplated herein that (m) the number of input fiber ports in each instance 1002 and/or instances ($a_n$) the number of instances 1002 and k the number of wavelengths in each input fiber port may be increased to make a large N×1 wavelength selective switch 1000 capable of switching any $\lambda_{(k)}$ instance 1002 from any input fiber port to the one output fiber port in the N×1, and vice versa in a 1×N, while reducing requirements of system components by utilizing smaller discrete sets of instance 1002 replicated an times to form a larger m×$a_n$=N, N×1 wavelength selective switch 1000 having higher yield system components. Moreover, two selective switching mirrors, $\lambda_{(k)}$ mirror of mirror array instance 1072 and $\lambda_{(k)}$ output mirror 1084, present in each optical path of the wavelength selective switch 1000 preferably provide hitless switching due to two mirrors in the light path, wherein for example output mirror 1084 may block outputting $\lambda_{(k)}$ until $\lambda_{(k)}$ mirror of mirror array instance 1072 is in position to route $\lambda_{(k)}$ from the selected instance 1002. The use of one mirror in the path to block a beam or signal while the other moves into position, preferably also reduces or eliminates the introduction of static and dynamic back reflection and static and dynamic in-to-in crosstalk into an optical input fiber by an optical switch.

'Instantiated' is a term borrowed from integrated circuit and software engineering wherein a block, cell or 'instance' of a circuit or of software code is copied, repeated, or re-used one or more times and is co-packaged together to make a larger circuit or application. Here, a large N×1 wavelength selective switch 1000 is preferably derived from instances ($a_n$) of (m) input fiber ports sharing common elements or dedicated modules of common elements such as fiber concentrator array (FCA) 1052, shared free space optics 1074 including, but not limited to, front end optics 1056, dispersive element 1062, back end optics 1066, instances of beam steering element 1068 and mirror array instance 1072 of WSA 1075. By co-packaging one or more instances 1002 and sharing common elements or dedicated modules of common elements a large N×1 wavelength selective switch 1000 is achieved, wherein smaller instances 1002 and/or modularity improves manufacturability yield of instances of common elements and reduces the cost of switch 1000 verses a comparable non-instantiated large N×1 wavelength selective switch. Moreover, by reusing (sharing) the same shared free space optics 1074 including, but not limited to, front end optics 1056, dispersive element 1062, back end optics 1066, mirror array instance 1072 of WSA 1075 and housing, mounts, and control electronics all existing in the same physical housing, the cost of manufacture, complexity of manufacturing, and size of a large N×1 wavelength selective switch 1000 is reduced. Still further, dedicated modules of common elements for each instance 1002 may be positioned on fixed or adjustable precision mounts, and lithographic alignment keys may be added to common mount 1094 for positioning, aligning, and adjusting shared common elements and/or dedicated modules of common elements or instances 1002 of common elements.

Typical specifications for such an N×1 wavelength selective switch 1000 based on four instances 1002 of a 10 fiber ports each are set forth in Table 1.

TABLE 1

| Number of Channel | | 40-100 |
|---|---|---|
| Insertion Loss | | <7 dB |
| Channel Passband | | 50 GHz |
| Channel Passband flatness | | <0.1 dB |
| Polarization Dependent Loss | | <0.3 dB |
| Polarization Mode Dispersion | | <0.5 ps |
| Chromatic Dispersion | | <+/−10 |
| Return Loss | | >25 dB |
| Cross Talk | (in to in) | <25 dB |
| | (in to ou) | <35 dB |
| Center Frequency | Accuracy | +/−5 GHz |
| Blocked Channel | Rejection | >35 dB |
| Attenuation | Range | 10 dB |
| | Accuracy | <0.04 dB |
| Maximum input | Power | 24 dB/port |

It is contemplated herein that there are a multitude of possible permutations of shared elements and/or instantiated elements, and/or non-instantiated elements, and/or groupings of dedicated instances, and combinations thereof to comprise N×1 wavelength selective switch 1000. Furthermore, to increase the size of N×1 wavelength selective switch 1000, each time a port is added to switch 1000 both fiber concentrator array (FCA) 1052 and instance beam steering element 1068 require a new waveguide and facet, respectively, but for mirror rows, a row is added to WSA 1075 each time an instance 1002 of m ports is added to switch 1000.

Figure 25A:
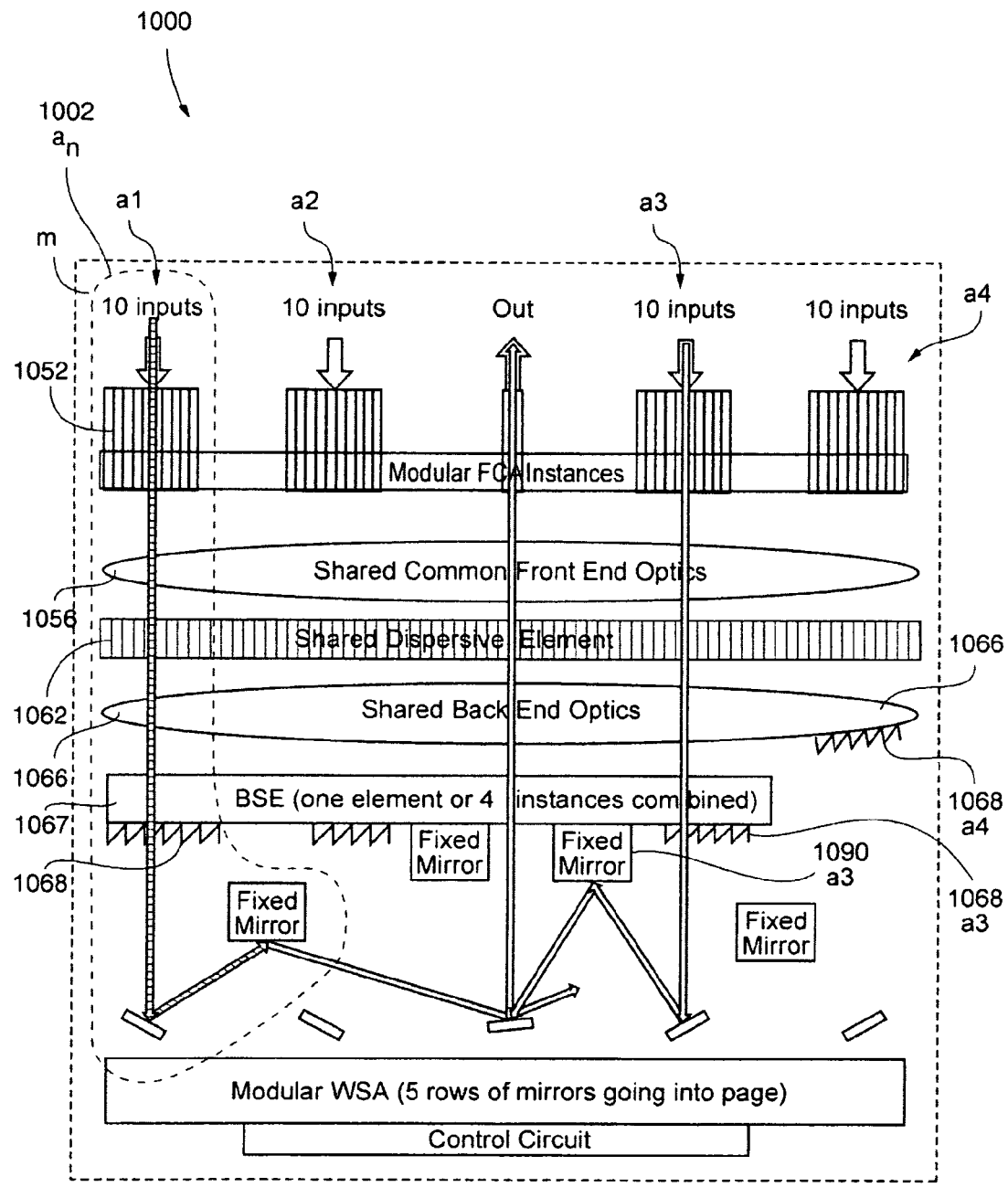
FIG. 25A is a schematic illustration of a forty input port by one output port wavelength selective switch, comprised of four instances of ten input ports each, according to an alternate embodiment of the switch shown in FIG. 24A.

Referring to FIG. 25A, there is illustrated a schematic illustration of a revised 4× instantiated ($a_4$) ten input port (m), resulting in forty input port (a×m) by one output port wavelength selective switch 1000 of FIG. 24A. In this alternate embodiment, fixed mirrors 1090 for instances $a_2$ and $a_3$ are positioned on instantiated beam steering element 1067 between beam steering elements 1068, instances $a_2$ and $a_3$ creating a combination element.

Referring again to FIG. 25A, in still another alternate embodiment, beam steering element 1068, grouped as instance $a_4$ is positioned on back end optics 1066 for instance $a_4$ creating a combination element, back end optics 1066 and beam steering element 1068.

Figure 25B:
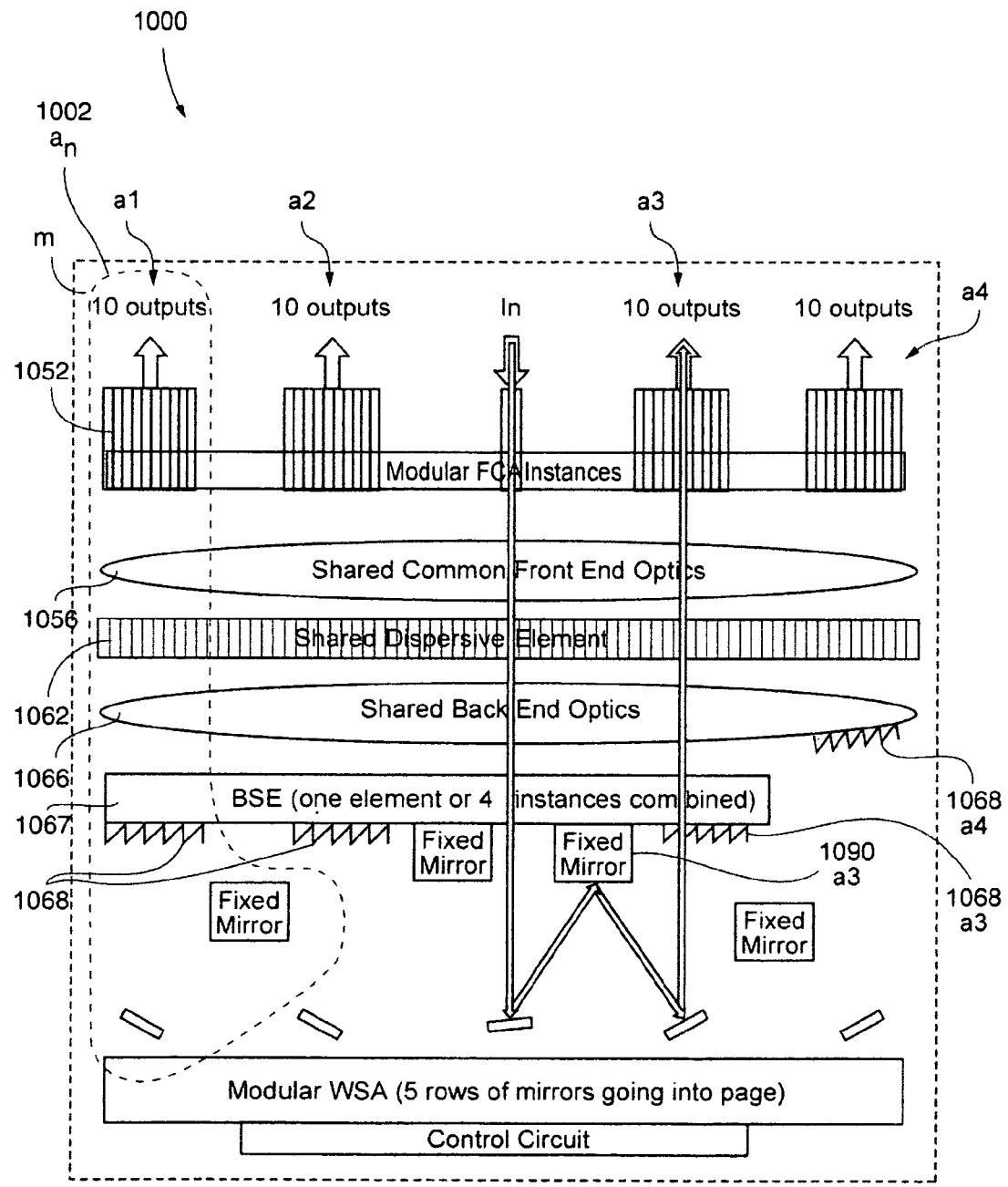
FIG. 25B is a top view schematic illustration of a one input port by forty output port wavelength selective switch, comprised of four instances of ten input ports each, according to an alternate embodiment of the switch shown in FIG. 25A.

Referring to FIG. 25B, there is illustrated a schematic illustration of a revised 4× instantiated ($a_4$) ten output port (m), resulting in forty output port (a×m) by one input port wavelength selective switch 1000 (1×N) of FIG. 24B. Moreover, it is contemplated herein as shown in FIG. 25A that fixed mirror 1090 for instance $a_3$ is positioned on instantiated beam steering element 1067 between beam steering elements 1068, instances $a_2$ and $a_4$, creating a combination element; and beam steering element 1068, grouped as instance $a_4$ is positioned on back end optics 1066 for instance $a_4$ creating another combination element.

Figure 25C:
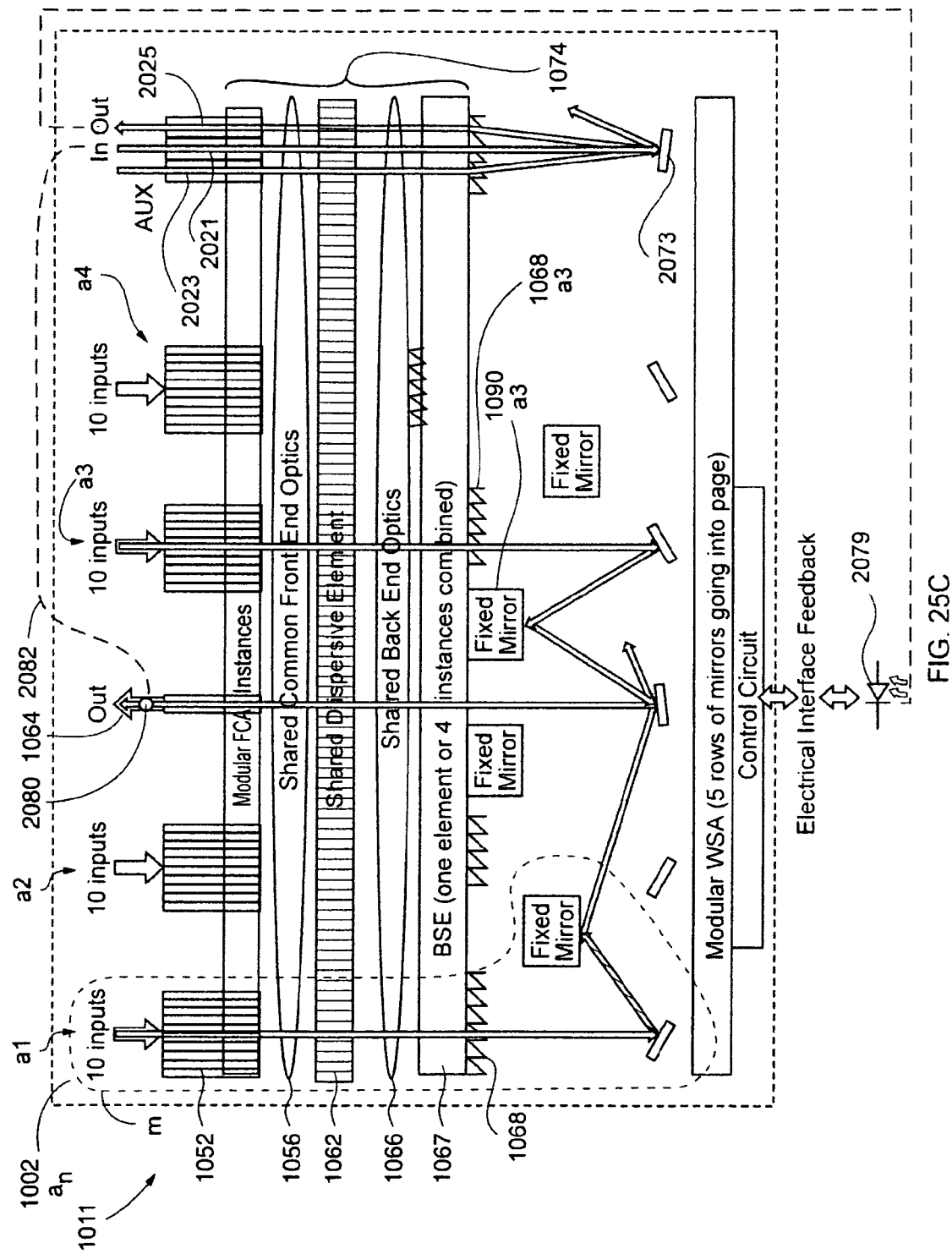
FIG. 25C is a top view schematic illustration of a 4× instantiated ten input port, resulting forty by one output port wavelength selective switch with measurement device according to an alternate embodiment of the switch shown in FIG. 24A or FIG. 25A or B.

Referring to FIG. 25C, an optical switching and monitoring system with feedback monitoring of the output fiber may be implemented externally (off-board of the optical switching and monitoring system 1011) by tapping the output fiber with a monitoring fiber or via use of face plate connector and a splitter or jumper 2080 to couple about 10% of the optical power from output fiber port 1064 into monitoring fiber port 2082, which may be coupled to optical power monitor 2079.

Referring again to FIG. 25C (similar to FIG. 2), there is preferably illustrated an optical switching and monitoring system 1011, wherein feedback monitoring of the output fiber 1064 may be implemented internally (on-board of the optical switching and monitoring system 1011) or externally (off-board of the optical switching and monitoring system 1011) by tapping the output fiber with a monitoring fiber 2082 or via use of face plate connector and a splitter or jumper 2080 to couple about 10% of the optical power from output fiber port 1064 fiber into input monitoring fiber port 2021. Moreover, optical switching and monitoring system 1011 preferably includes auxiliary monitoring fiber port 2023 enabling an auxiliary multi-wavelength beam to be monitored by optical switching and monitoring system 1011. An external signal, originating from outside the system 1011 and not found on output fiber port 1064, may be input into auxiliary monitoring fiber port 2023 and optical switching and monitoring system 1011 may be utilized to monitor or read the power of each wavelength of a multi-wavelength beam input on auxiliary monitoring fiber port 2023, and to output data from these readings to an electrical interface feedback into control circuit 1078 shown in FIGS. 24A and 24B. It is contemplated herein that more than one auxiliary monitoring fiber port 2023 and/or input monitoring fiber port 2021 may be provided in a similar fashion.

Monitoring mirror array 2073 tilts its mirror, which has projected on it $\lambda_{(k)}$ (2021) and $\lambda_{(k)}$ (2023) from the two monitoring fiber ports 2021 and 2023 and selects $\lambda_{(k)}$ either from monitoring fiber ports 2021 or 2023 (the other $\lambda_{(k)}$ being not selected is reflected away from the output fiber port 2025) and the selected $\lambda_{(k)}$ is preferably reflected to output monitoring fiber port 2025 after retracing its path through free space optics 1074. Output monitoring fiber port 2025 preferably is coupled to optical power monitor 2079.

Power monitor (optical measurement device) 2079 preferably is a photodiode, measuring the power level of wavelength $\lambda_{(k)}$ switched by monitoring mirror array 2073, measuring one wavelength at a time. As monitoring mirror array 2073 selects wavelength $\lambda_{(k)}$ and routes it to output monitoring output fiber port 2025, power monitor 2079 preferably measures the power of such wavelength $\lambda_{(k)}$. Alternatively, power monitor 2079 may be any device capable of measuring power of one or more wavelengths by scanning the multi-wavelength components, as well as analyzing signal to noise ratios by spectrum analyzing the wavelength bandwidth, polarization-dependent properties and the like. The optical intensities for all wavelength-separated signals are preferably converted to analog or digital form by power monitor 2079 and supplied to control circuit 1078, which preferably adjusts switching mirror array instance 1072 as set forth herein to adjust the power of wavelength $\lambda_{(k)}$ in output fiber port 1064 to conform to one or more predetermined criteria.

It is contemplated herein that monitoring system 1011, as set forth in FIG. 25C, may be implemented internally (on-board of the optical switching and monitoring system 1011) or externally (off-board of the optical switching and monitoring system 1011) with optical switching 1000 of FIG. 24C.

Referring now to FIG. 26A there is illustrated a schematic illustration of a wavelength selective switch 10 or wavelength selective switch 1000 with optical elements positioned on baseplate 1110. The optical switch is shown with fibers going into the page in FIG. 26, including input fiber port ports 1012 thru 1030, fiber concentrator array (FCA) instances 1052, front end optics (FEO) 1056, dispersive element 1062, back end optics 1066, instantiated beam steering element 1067, fixed mirror instances 1090A, and WSA 1075 having $\lambda_{(k)}$ instances (rows) of mirror array instance 1072 positioned vertical relative to baseplate 1110. Alternatively, fixed mirror instances 1090A may be positioned on baseplate 1091, preferably a clear substrate such as glass 1091 or the like. Moreover, mirror instances 1091$a_1$ and 1091$a_2$ through 1091$a_n$ reflective material may be coated on glass 1091 or reflective material may be affixed to glass 1091 with an adhesive or the like. Preferably, instances 1002, shared elements and modular portions of shared elements are affixed to baseplate 1110 with marked positioning and utilizing precision optical mounts of baseplate 1110 greatly improving the alignability of instances 1002, shared elements and modular portions of shared elements of switch 1000.

However, this results in a constrained dimension and limitation on WSA 1075 by limiting the maximum number of mirrors in a row of mirrors since telecommunications switches must fit as a blade insert into a backplane configured rack equipment, rack-mount, rack mount chassis, etc. Such blade inserts have width limitations based on the number of slots in the rack allocated to such switches and have height limitations based on a rack unit, where "U" is a unit of measure used to describe the height of equipment intended for mounting in a 19-inch rack or a 23-inch rack (the dimension referring to the width of rack). One rack unit is 1.75 in (44.45 mm) high. One rack unit is commonly written as "1U"; similarly, 2 rack units are "2U" and so on.

Figure 26B:
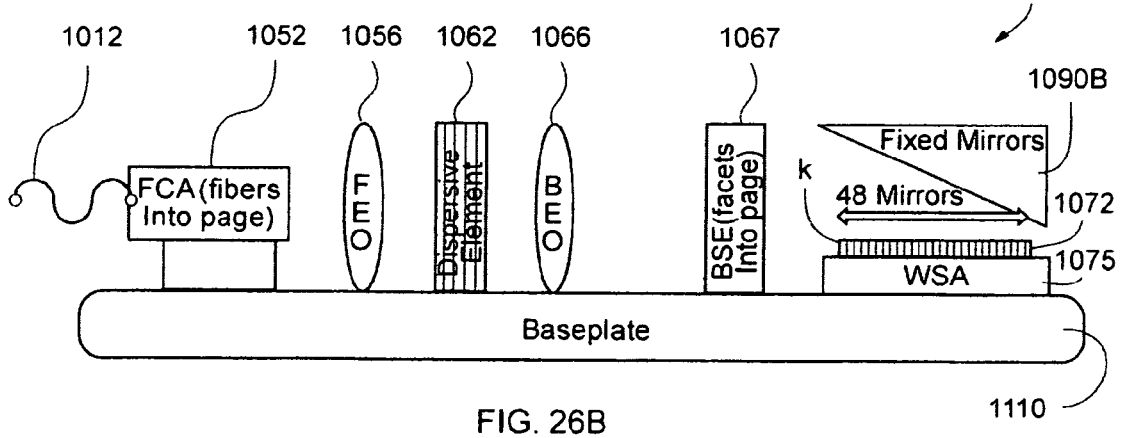
FIG. 26B is a side view of a wavelength selective switch according to an alternate embodiment of the switch shown in FIG. 26A.

Referring now to FIG. 26B, there is illustrated an alternate embodiment schematic illustration of a wavelength selective switch 10 or wavelength selective switch 1000 with optical elements positioned on baseplate 1110 to accommodate the case in which WSA 1075 is prohibitively wide. The optical switch is shown with fibers going into the page in FIG. 26B, including input fiber port ports 1012 thru 1030, fiber concentrator array (FCA) instances 1052, front end optics (FEO) 1056, dispersive element 1062, back end optics 1066, instantiated beam steering element 1067, folding mirror mirrors configured as fixed mirror instances 1090B, and WSA 1075 having each instance of k mirrors of mirror array instance 1072 positioned horizontally on baseplate 1110. In this example, wavelengths $\lambda 1$-$\lambda_{(k)}$ reflect off folding mirror mirrors configured as fixed mirror instances 1090B twice travelling from input fiber port to output fiber port. By introducing the folding mirrors configured as fixed mirror instances 1090B, WSA 1075 may be positioned horizontal on baseplate 1110 removing dimension restrictions in the dimension perpendicular to the baseplate, due to telecommunication equipment specifications of blade, rack equipment, rack-mount, and/or rack mount chassis implementations. Fixed mirror instances 1090B can be individual fixed-position mirrors mounted onto a frame at different angles, or a solid optical element fabricated with multiple mirror facets at the different required angles.

Figures 27A, 27B:
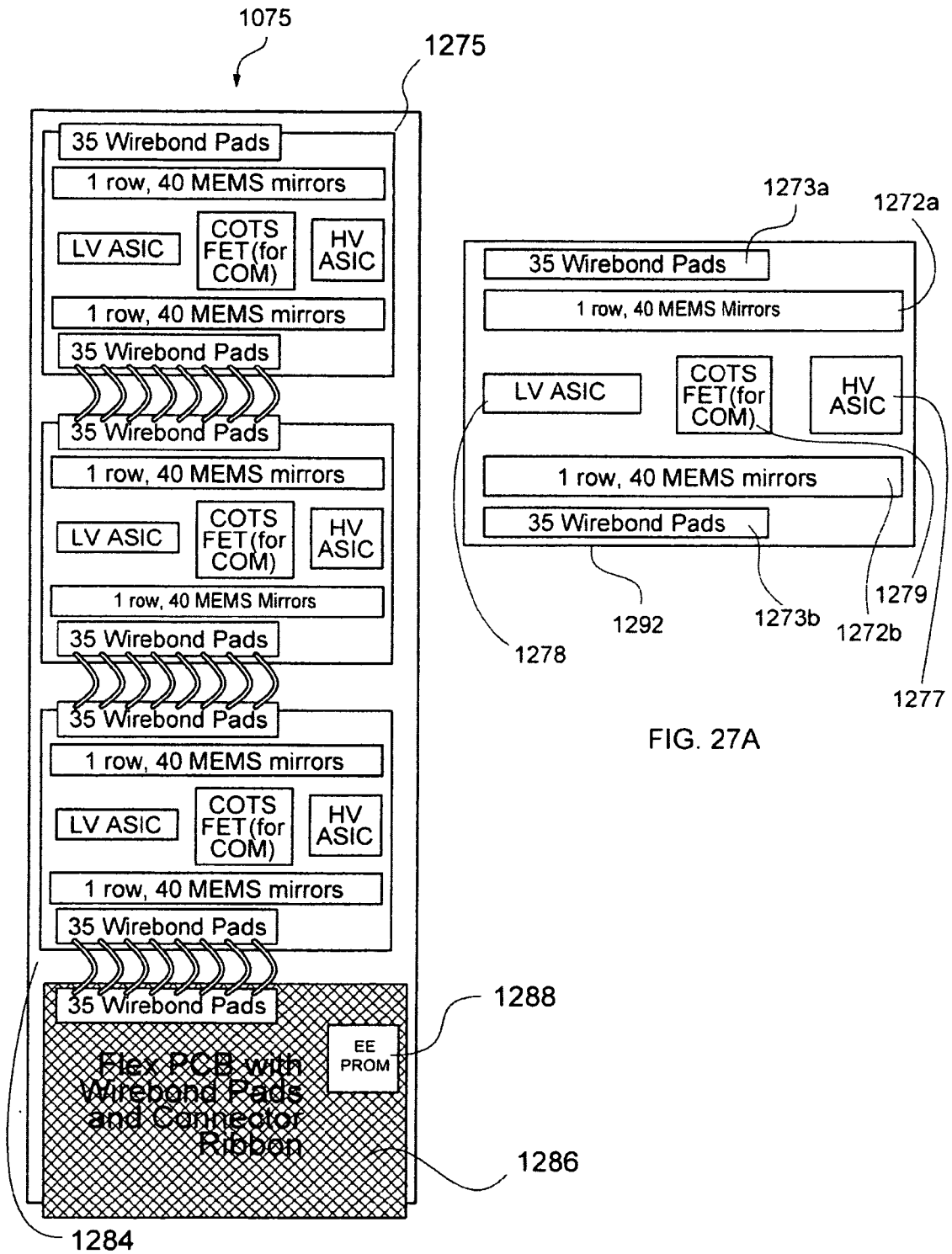
FIG. 27A is a top view of a block diagram of a wavelength switching assembly module according to an alternate embodiment.
FIG. 27B is a top view of a block diagram of multiple wavelength switching assembly modules of FIG. 27A mounted and co-packaged on a substrate according to an alternate embodiment.

Referring now to FIG. 27A, there is illustrated a preferred embodiment block diagram of one instance of a wavelength switching assembly 1275 of a wavelength selective switch 10 or wavelength selective switch 1000. Modular mirror assembly 1275 is preferably an instance or a combination of instances which comprise WSA 1075. The preferred embodiment wavelength switching assembly instance 1275 is shown in FIG. 27A, and wavelength switching assembly instance 1275 maps and switches two instances 1002 shown in FIG. 24. Modular mirror assembly instance 1275 comprises two parallel rows of mirrors 1272A & 1272B for switching one or two instances ($a_n$) of input ports fiber ports (m) (shown in FIG. 24), two rows of wire bond pads 1273a & 1273b for connecting two or more modular mirror assembly instances 1275 to each other as shown in FIG. 27B, to form WSA 1075, high voltage application specific integrated circuit (ASIC) 1277, low voltage application specific integrated circuit (ASIC) 1278, and Commercial Off The Shelf Field Effect Transistor (COTS FET) 1279, all of which are drive electronics providing the actuation signals for the modular switching mirror assembly 1275. Low voltage ASIC 1278 provides the interface to the "outside world" via a ribbon cable (not shown in FIG. 27B) that connects to flex PCB 1286. As such, low voltage ASIC 1278 accepts digital signals via wire bond pads 1273a or 1273b that indicate how mirror (k) (such as mirror 1072 and 1084 in FIG. 24), of mirror array instance 1272a or 1272b, is to be moved, and the amount of movement required. Low voltage ASIC 1278 converts this per-mirror tilt information into a phase shifted square wave for each mirror, the amount of phase shift proportional to the desired tilt angle. All phase shifts are relative to a Common "COM" signal, also output by the LV ASIC. The phase-shifted square wave outputs from the LV ASIC are sent to the HV ASIC 1277 for level shifting to the high voltage needed to tilt the MEMS mirrors, mirror (k) (such as mirror 1072 and 1084 in FIG. 24), of mirror array instance 1272a or 1272b, and the COM signal is sent to the COTS FET 1279 for level shifting to a high-voltage version of the COM signal. The HV COM signal from the COTS FET 1279 and phase shifted HV square waves from HV ASIC 1277 are applied to the MEMS mirrors, mirror (k) (such as mirror 1072 and 1084 in FIG. 24), of mirror array instance 1272a or 1272b, and their electrodes in MEMS mirror arrays 1272a and 1272b, to create Pulse Width Modulated (PWM) tilt drive for the mirrors. This functionality is detailed in U.S. Pat. Nos. 6,543,286 and 6,705,165 issued to Garverick et al. set forth above and incorporated herein by reference in its entirety. In alternative embodiments, other drive strategies, such as simple DC drive, can be implemented. All of the components discussed are preferably mounted by a flip-chip process to an interconnecting substrate 1292, preferably of silicon, ceramic, or glass.

Since the 'lambda' direction (the left-right direction in FIGS. 27A and 27B) corresponds to the shortest dimension of switch 10 or 1000, it is preferred to be minimized. This dimension is defined by the length of the mirror rows 1272a and 1272b. Thus modular switching mirror assembly instance 1275 components are preferably repositioned as shown to give a total outer dimension of approximately 22 mm×32 mm. One high voltage application specific integrated circuit (ASIC) 1277, one low voltage application specific integrated circuit (ASIC) 1278, and one off the shelf field-effect transistor (FET) Common Signal (COM) Driver 1279 can drive two parallel rows of 48 mirrors 1272a & 1272b. Rows of mirrors 1272a & 1272b are fabricated and attached separately for better yield characteristics for each instance 1002 verses yield characteristics for a single, monolithic large switching mirror assembly that would contain all the rows needed for switch 10 or 1000.

Referring now to FIG. 27B, there is illustrated an alternate embodiment block diagram of multiple re-positioned modular wavelength switching assembly instances 1275 daisy-chained together, and mounted and co-packaged on mounting plate 1284 to form a combination of instances of wavelength switching assembly (WSA) 1075 as shown having dimensions of approximately 100 mm×36 mm. Preferably, one or more re-positioned modular wavelength switching assembly instances 1275 are connected (daisy-chained together) and each re-positioned modular switching mirror assembly 1275 is mounted to a mounting plate 1284 of glass or metal, using fiducial marks for alignment of substrate 1292 to the mounting plate 1284. Moreover, since re-positioned modular wavelength switching mirror assembly instances 1275 are 'daisy-chained' together via two rows of wire bond pads 1273a & 1273b and interfaced to outside the system by a ribbon cable (not shown) extending from Flex PCB 1286, and low voltage application specific integrated circuit (ASIC) 1278 having features 'Chip Select' and 'Sync' input functionality, only one flex printed circuit board (PCB) 1286 having electrically erasable programmable read-only memory (EEPROM) 1288 is needed to interface with one or more re-positioned modular wavelength switching mirror assembly instances 1275. Since re-positioned modular wavelength switching mirror assembly instance 1275 is a modular design (instance), then more or fewer re-positioned modular wavelength switching mirror assembly instance 1275 can be attached to mounting plate 1284 for different configurations and specifications for WSA 1075 of wavelength selective switch 1000.

Referring now to FIG. 28A, there is illustrated an alternate embodiment block diagram of re-positioned modular wavelength switching mirror assembly instance 1275 of a wavelength selective switch 10 or wavelength selective switch 1000, wherein the critical wavelength dimension may be shortened still further compared to the embodiment in FIG. 27A. Mirror assembly instance 1275 of FIG. 28A comprises the same elements, with the same functionality as that of FIG. 27A. However, the MEMS mirror row 1272a & 1272b has been shortened preferably by re-designing each mirror to be narrower in the wavelength direction. This can be done via a number of MEMS design techniques for reducing the lateral spacing between individual MEMS mirrors 1072 and 1084, or by re-designing the WSS's optical system to create wavelength beams that are narrower, and/or more closely spaced in the wavelength direction (the left-right dimension in FIG. 28A.) The other change in FIG. 28A from FIG. 27A is the deletion of COTS FET 1279, which can be performed by allowing HV ASIC 1277 to create the Common Drive signal required by MEMS mirrors 1072 and 1084 in MEMS mirror row 1272a & 1272b. By connecting a number of HV ASIC's high voltage outputs in parallel, a sufficiently high current drive strength can be obtained to provide the COM signal in the face of parasitic capacitances brought about by substrate 1292.

Alternatively, FET (COM driver) 1280 can be implemented as shown in FIG. 28B, which depicts a combination of three mirror assembly instances 1275 mounted on a common mounting plate 1284, analogous to the arrangement shown in FIG. 27B. Here, a single shared FET (COM driver) to drive COM 1280 is mounted on Flex PCB 1288 and shared by all three wavelength switching mirror assemblies 1275, through substrates 1292 interconnects and wirebonds 1273a and 1273b.

With these changes, the critical wavelength-direction dimension of mirror assembly 1275, and the larger WSA 1075 can be reduced from typical values of 32 mm to 22 mm, in a preferred embodiment.

Figure 29A:
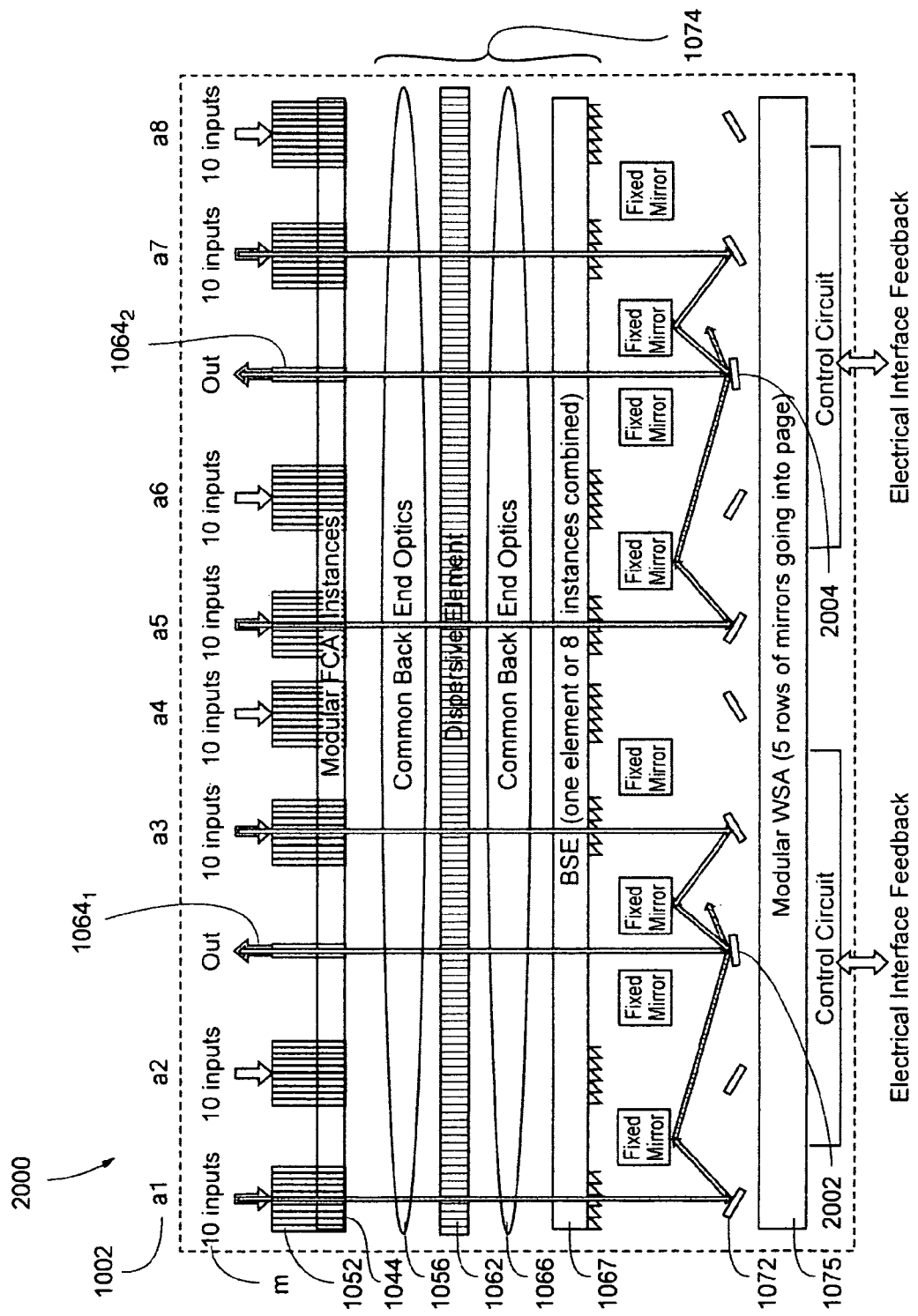
FIG. 29A is a top view schematic illustration of two co-packaged 4× instantiated forty input port by one output port wavelength selective switches of FIG. 24 or 25, each switch comprised of four instances of ten input ports each, according to an alternate embodiment.

Referring now to FIG. 29A, there is illustrated a schematic illustration of an optical switching system of two 4×instantiated ($a_4$) ten input port (m), resulting in two forty input port by one output port co-packaged wavelength selective switch switches 2000, ($a_8$×m). Each wavelength selective switch of co-packaged wavelength selective switch switches 2000 can be operated in either direction, wherein N of N×1 represents N input fiber ports and one output fiber port, or one input port and N output fiber ports shown in FIG. 29A. In the shown co-packaged 2×[(4×10)×1] wavelength selective switch system 2000, each instance 1002 of ($a_8$×m) has ten input fiber ports (m) 1012, 1014, 1016, 1018, 1020, 1022, 1024, 1026, 1028, 1030 (as labeled in FIGS. 24A&B), grouped as instance 1002, which are optically coupled to fiber concentrator array instance (FCA) 1052 (fiber port concentrator), preferably in a linear alignment, wherein each instance 1002 waveguides 1032, 1034, 1036, 1038, 1040, 1042, 1044, 1046, 1048, and 1050, grouped as instance 1002, are used to bring the respective signals of fiber ports (m) 1012, 1014, 1016, 1018, 1020, 1022, 1024, 1026, 1028, and 1030 closer together on output face 1044 (as shown in FIG. 7) for each instance 1002 of concentrator 1052. In a preferred embodiment, each instance 1002 $a_{1-4}$ and $a_{5-8}$ of co-packaged wavelength selective switches 2000 shares common optical elements of the shared free space optics 1074 including, but not limited to, front end optics 1056, dispersive element 1062, back end optics 1066, and instantiated beam steering element 1067 with both switches. Moreover, system 2000 preferably shares instances of arrays (rows) of micro electromechanical system (MEMS) mirrors of mirror array instance 1072 on the WSA 1075, and fixed mirror 1090. Each instance 1002 $a_{1-4}$ and $a_{5-8}$ shares similar configurations, specifications, and contemplations with wavelength selective switch 1000 of FIG. 24. Moreover, a system of two or more co-packaged 2×[(4×10)×1] wavelength selective system 2000 may be configured as parallel operating wavelength selective switches 1000, as redundant wavelength selective switches 1000 of FIG. 24, or as synchronized wavelength selective switches 1000, wherein WSA 1075 for $a_{1-4}$ and WSA 1075 for $a_{5-8}$ are operated such that they move synchronously. Still further, co-packaged switches may be configured independently for any combination of N×1 or 1×N functionality.

Referring again to FIG. 29A, there is a schematic illustration of a dual wavelength selective system 2000 with BSE-based architecture for creating manifold or multi-packaged switches within the same package. Terminology of manifold, co-packaged, and multi-packaged is used interchangeably herein as one or more independent optical switches packaged together and comprising an optical system. It is contemplated herein that FIG. 29A discloses the same 'cutaway' view as FIGS. 24A&B to illustrate an advantage of the present invention's shown in FIG. 15, the BSE-based architecture for creating manifold or multi-packaged switches within the same package, while reaping the benefits of re-use and sharing of free space optics (FSO) 1074 (including front end optics (FE) 1056, dispersive element 1062, back end optics (BE) 1066, instantiated beam steering element (BSE) 1067), baseplate, housing, FCA 1052, MEMS control circuit 1078, and common MEMS array although each mirror is dedicated to one manifold or multi-packaged switch, and input/output fibers (fiber management fixture), although each fiber is dedicated to one manifold or multi-packaged switch. By adding an additional row of mirrors of mirror array instance 1072 to the existing WSA 1075, adding additional waveguides to FCA 1052, and adding additional facets to instantiated BSE 1067, a dual or second N×1 switch instance 1002 $a_{5-8}$ is defined. The wavelength selective switch system 2000 instances 1002 $a_{1-4}$ and $a_{5-8}$ operate independently of one another (that is, their light paths do not interact and such switches are capable of independent switching), while sharing the same housing and common components. It should be recognized that instantiated BSE 1067 is capable of refracting light beams at arbitrary angles; thus, allowing multiple steering points for $\lambda_{(k)}$, on multiple mirror rows, to exist. FIG. 29A illustrates a 'cutaway' view of one wavelength $\lambda_{(k)}$, and each MEMS mirror shown represents a row of mirrors coming out of the page, each mirror corresponding to a different wavelength $\lambda_{(k)}$ separated out by dispersive element 62 and positioned by instantiated BSE 1067.

It is contemplated herein that manifold wavelength selective switches of wavelength selective switch system 2000 may have similar alternate embodiment configurations and/or positioning for instantiated beam steering element 1067 and fixed mirror 1090 as shown in FIGS. 24A and 25A.

Figure 29B:
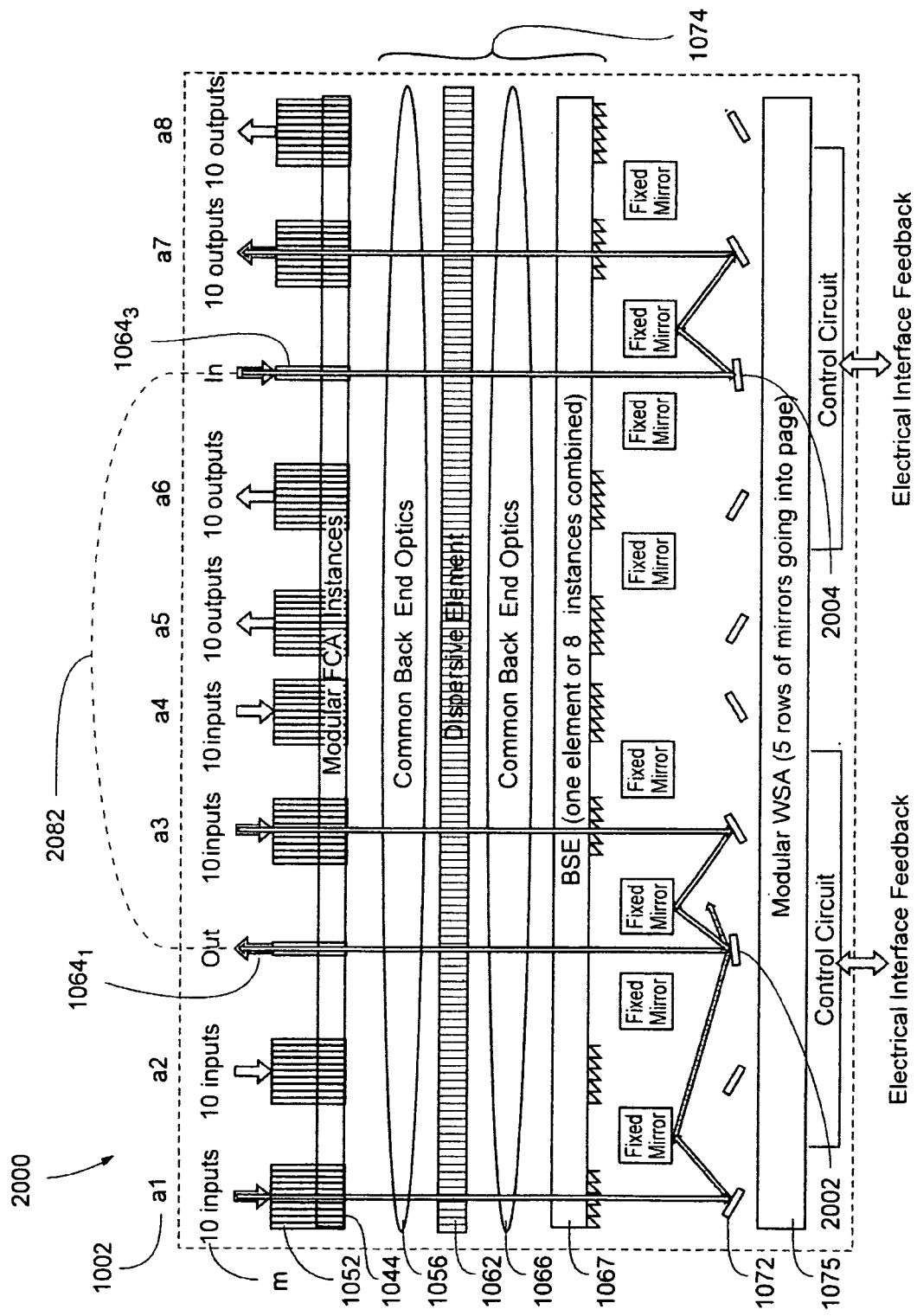
FIG. 29B is a top view schematic illustration of two co-packaged mixed switches, the first a 4× instantiated forty input port by one output port and the second a 4× instantiated one input port by forty output port wavelength selective switches, each switch comprised of four instances of ten ports each, according to an alternate embodiment.

Referring now to FIG. 29B there is illustrated wavelength selective switch system 2000 shown as a co-packaged N×M optical (40×40) switches as an alternative embodiment of the present invention, which accomplishes the same M×N switching functionality of FIG. 22A or 22B. For co-packaged switches of wavelength selective switch system 2000, the input-side switch instances $a_{1-4}$ of the first co-packaged switch is configured as an N×1, and the output side instances $a_{5-8}$ of the second co-packaged switch as a 1×N. Preferably, output fiber port 1064₁ of the first co-packaged switch is coupled to the input fiber port 1064₃ of the second co-packaged switch, either by fiber splicing, jumpering via fiber connectors 2082, on-chip patterning of waveguides, or the like. With such configured co-packaged switches of wavelength selective switch system 2000, any wavelength $\lambda_{(k)}$ introduced into any of the ten input fiber ports (m) of input-side switch of instances $a_{1-4}$ of first co-packaged switch may be switched to any of the ten output fiber ports (m) of output-side switch instances $a_{5-8}$ of second co-packaged switch, resulting in M×N switching functionality.

It is still further contemplated herein that co-packaged switches of wavelength selective switch system 2000 may be configured for m×m switching functionality as shown in FIG. 17A (m=4 in this figure), but utilizing an embodiment of the present invention of FIG. 24 (m=40 in this figure), wherein two switches are co-packaged in the same device each having 40×1 or even possibly N×1.

It is still further contemplated herein that co-packaged switches of wavelength selective system 2000 may be a mixed N×1 and 1×N and may be configured for m×m switching functionality as shown in FIG. 17B (m=4 in this figure), but utilizing an embodiment of the present invention of FIGS. 24A and 24B (m=40 in these figures), wherein two switches are co-packaged in the same device and if the first switch output is coupled to the second switch input a N×M configured co-packaged optical switch is contemplated.

Figure 30A:
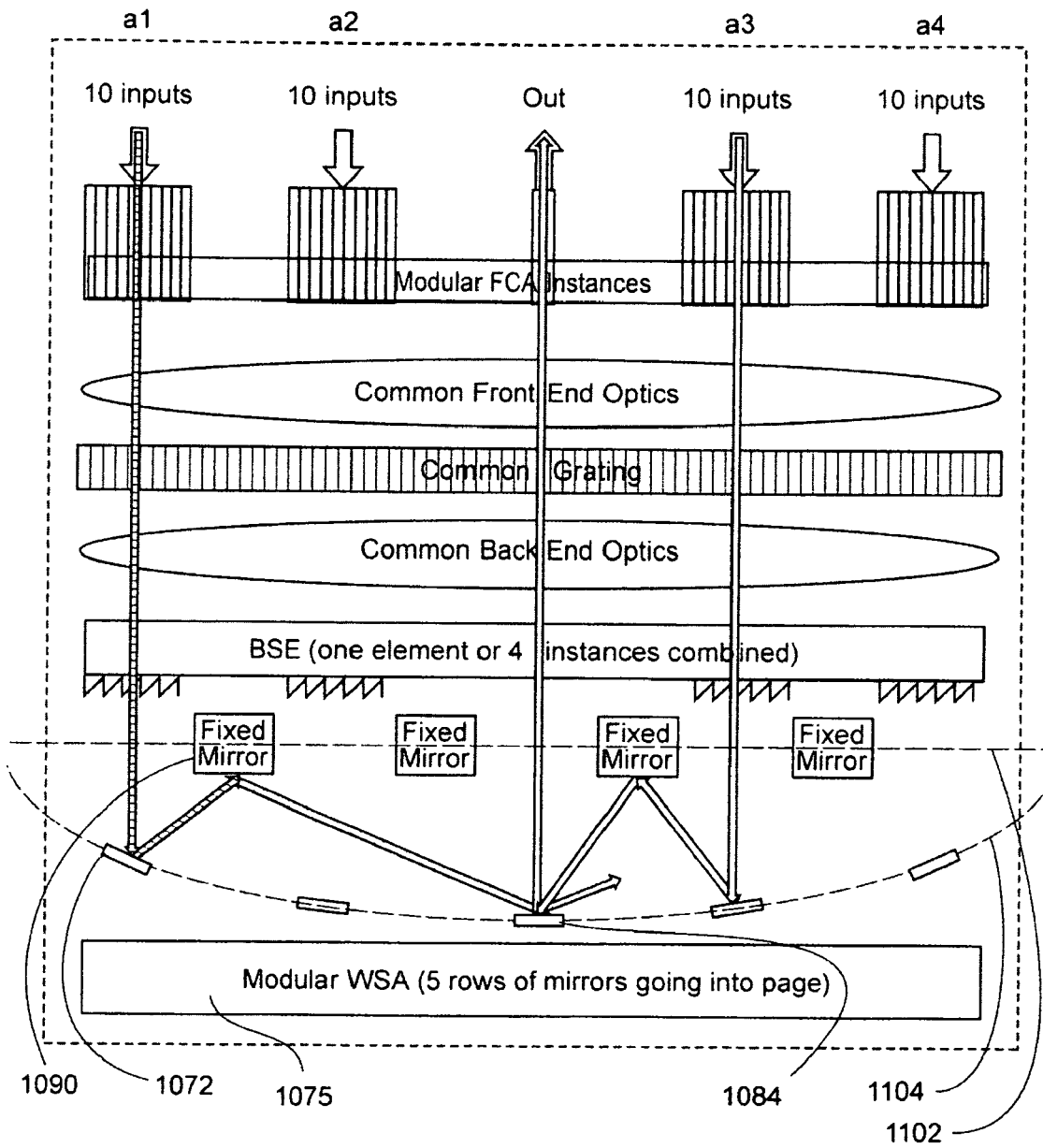
FIG. 30A is a top view schematic illustration of a forty input port by one output port wavelength selective switch, comprised of four instances of ten input ports each shown in FIG. 24 or 25, having arc configured switching mirrors according to an alternate embodiment.

Referring now to FIG. 30A, there is illustrated an alternate embodiment block diagram of modular wavelength switching assembly (WSA) 1075 of a wavelength selective switch 10 or wavelength selective switch 1000, or co-packaged switches of wavelength selective system 2000, wherein individual mirrors of mirror array instance 1072 of the WSA 1075 may be pre-set or positioned at pre-set angles facing towards output mirror 1084 of WSA 1075. Moreover, instances (rows) of MEMS mirrors of mirror array instance 1072 of the WSA 1075 may be aligned or positioned along an arc or parabolic curve 1104 having output mirror 1084 of WSA 1075 at a center point of the arc. Such pre-angles provided by an arced MEMS mirror array design of WSA 1075 reduce +/−MEMS mirror tilt range requirements enabling finer tilt angle resolution and smaller controlled loss increments or power equalization for the required tilt range.

Figure 30B:
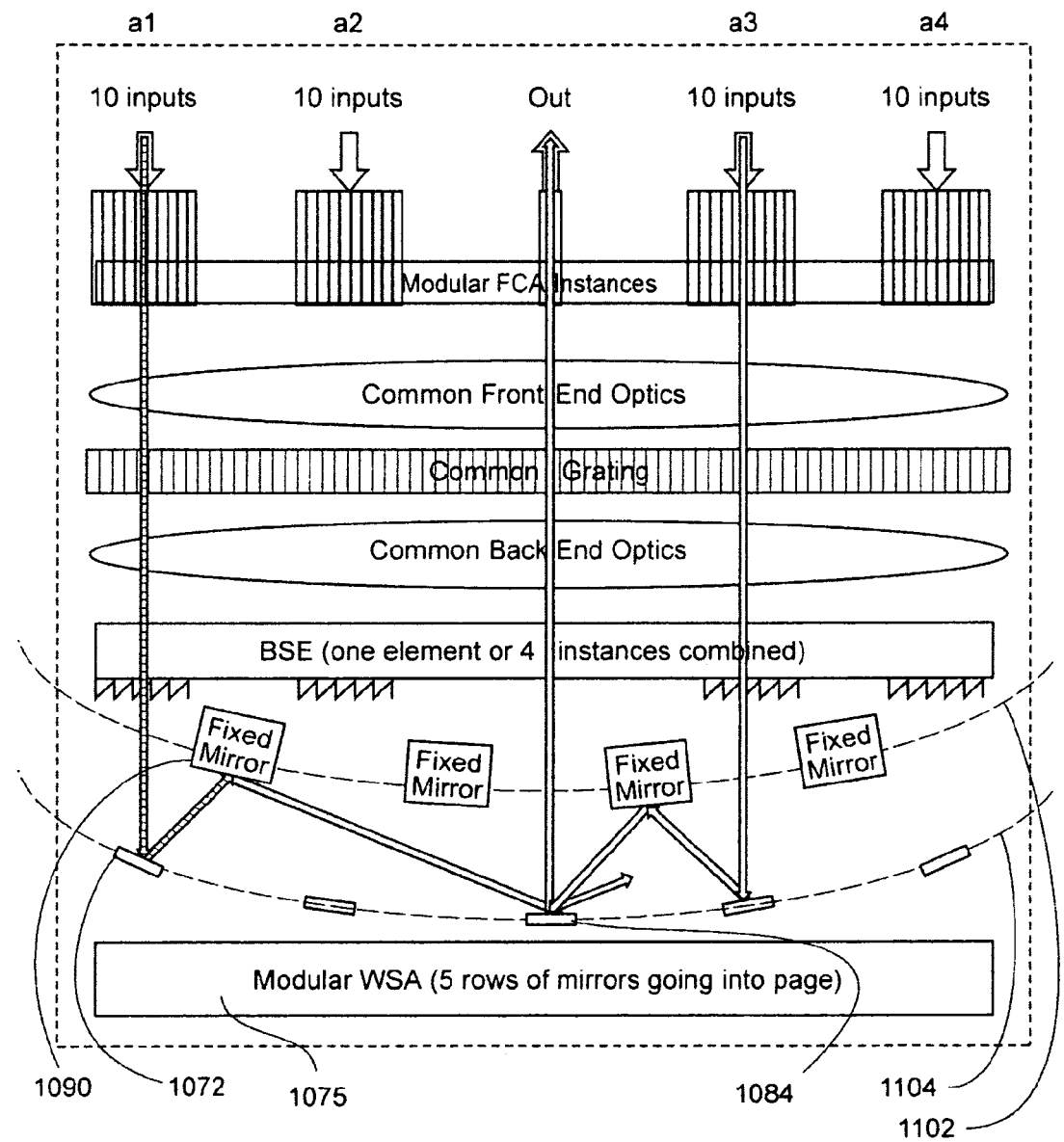
FIG. 30B is a top view schematic illustration of a forty input port by one output port wavelength selective switch, comprised of four instances of ten input ports each shown in FIG. 24 or 25, having arc configured switching mirrors and fixed mirrors according to an alternate embodiment.

Referring now to FIG. 30B, there is illustrated an alternate embodiment block diagram of modular wavelength switching assembly (WSA) 1075 of a wavelength selective switch 10 or wavelength selective switch 1000, or co-packaged switches of wavelength selective system 2000 shown in FIG. 30A, wherein fixed mirrors 1090 may be pre-set or positioned at pre-set angles similar to mirror array instance 1072 of the WSA 1075 of FIG. 30A. Moreover, fixed mirrors 1090 may be aligned or positioned along an arc or parabolic curve 1102 similar to mirror array instance 1072 of the WSA 1075 of FIG. 30A. Such pre-angles provide by fixed mirrors 1090 reduces +/−MEMS mirror tilt range requirements on mirror array instance 1072 of the WSA 107 enabling finer tilt angle resolution and smaller controlled loss increments or power equalization for the required tilt range.

A preferred pre-set angle for individual mirror instances $a_1$-$a_4$ of mirror array instance 1072 of the WSA 1075 is obtained by drawing a line between a mirror 1072k and its associated fixed mirror 1090 center to center points, and wherein the pre-set angle of mirror 1072k is pre-set or pre-angled perpendicular to the center to center points between mirror 1072k and its associated fixed mirror 1090. Other designs are possible, and must take into account beam steering element 1068 grouped as instances 1002 position as well.

The invention disclosed and claimed relates to the various modifications of assemblies herein disclosed and their reasonable equivalents and not to any particular fiber count or wavelength count wavelength selective optical switch. Although the invention has been described with respect to a wavelength selective switch, many of the inventive optics can be applied to white-light optical switches that do not include wavelength dispersive elements. Although moveable micromirrors are particularly advantageous for the invention, there are other types of MEMS mirrors than can be actuated to different positions and/or orientations to affect the beam switching of the invention.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

We claim:

1. An optical switch comprising two or more instances for switching one or more optical signals, the signals comprising one or more optical wavelengths, each optical wavelength constituting a work piece, said optical switch further comprising:

one or more input fiber ports grouped as a first input fiber port instance of a plurality of instances, each said input fiber port serving as an external interface for introducing the one or more input optical signals into said optical switch;

one output fiber port, said output fiber port serving as an external interface for extracting the output optical signal from said optical switch;

one or more shared optical elements, wherein each said optical element focuses the optical signals of said one or more input fiber ports and said one output fiber port;

at least one shared wavelength dispersive element for spatially separating at least one first wavelength from one input optical signal of the one or more input optical signals from at least one other wavelength of the one input optical signal of the one or more input optical signals and for recombining at least one first wavelength of a selected input optical signal of the one or more input optical signals with at least one other wavelength of at least one other input optical signal of the one or more input optical signals to form the output optical signal;

one or more fixed mirrors, a first fixed mirror of said one or more fixed mirrors grouped as a first fixed mirror instance of said plurality of instances;

one or more arrayed input switching elements, a first arrayed input switching element of said one or more arrayed input switching elements grouped as a first input switching element instance of said plurality of instances for receiving one wavelength from each of said one or more input fiber ports grouped as a first input fiber port instance of said plurality of instances and for switching one selected wavelength from one of said one or more input fiber ports grouped as a first input fiber port instance of said plurality of instances to said first fixed mirror grouped as a first fixed mirror instance of said plurality of instances;

one or more beam steering elements, a first beam steering element of said one or more beam steering elements grouped as a first beam steering element instance of said plurality of instances configured to position each wavelength from each of said one or more input fiber ports grouped as a first input fiber port instance of said plurality of instances onto a designated input switching element of said first arrayed input switching element grouped as a first input switching element instance of said plurality of instances;

wherein said designated input switching element grouped as a first input switching element instance of said plurality of instances positions one selected wavelength from one of said one or more input fiber ports grouped as a first input fiber port instance of said plurality of instances onto a designated output switching element of an array of output switching elements, via said first fixed mirror;

wherein at least one other said designated input switching element grouped as a second input switching element instance of said plurality of instances positions another one selected wavelength from one of said one or more input fiber ports grouped as a second input fiber port instance of said plurality of instances onto said designated output switching element of an array of output switching elements, via a second fixed mirror of said one or more fixed mirrors grouped as a second fixed mirror instance of said plurality of instances; and wherein said designated output switching element of an array of output switching elements switches one wavelength from one of said one or more input fiber ports grouped as said first input fiber port instance or said second input fiber port instance of said plurality of instances to said one output fiber port.

2. The optical switch of claim 1, wherein one input fiber port of said one or more input fiber ports grouped as said first input fiber port instance of said plurality of instances maps to a single beam steering element of said first beam steering element of said one or more beam steering elements grouped as a first beam steering instance of said plurality of instances.

3. The optical switch of claim 1, wherein based on a position of said designated input switching element grouped as a first input switching element instance of said plurality of instances and said designated output switching element of an array of output switching elements, said one output fiber port receives at least one wavelength from one of said one or more input fiber ports grouped as said first input fiber port instance or said second input fiber port instance of said plurality of instances.

4. The optical switch of claim 1, wherein said first beam steering element of said one or more beam steering elements grouped as a first beam steering element instance of said plurality of instances is configured to position each wavelength of said optical signal from one input fiber port of said one or more input fiber ports grouped as a first input fiber port instance onto separate switching elements of said first arrayed input switching elements grouped as a first input arrayed input switching element instance of said plurality of instances.

5. The optical switch of claim 1, wherein based on a position of one input switching element of said first arrayed input switching element of said one or more arrayed input switching elements grouped as a first input switching element instance of said plurality of instances and a position of one output switching element of said array of output switching elements, the selected wavelength is coupled from one of said one or more input fiber ports grouped as a first input fiber port instance of said plurality of instances to said one output fiber port.

6. The optical switch of claim 1, wherein based on a position of said designated input switching element grouped as a first input switching element instance and said at least one other said designated input switching element grouped as a second input switching element instance of said plurality of instances, said designated output switching element of an array of output switching elements receives at least one wavelength from both said one or more input fiber ports grouped as said first input fiber port instance and said second input fiber port instance of said plurality of instances.

7. The optical switch of claim 6, wherein based on a position of said designated output switching element of an array of output switching elements selects one wavelength from said one or more input fiber ports grouped as said first input fiber port instance or said second input fiber port instance of said plurality of instances and reflects said one wavelength to said one output fiber port.

8. The optical switch of claim 1, wherein said shared elements are adapted to be utilized by each of said plurality of instances.

9. The optical switch of claim 1, wherein said one or more shared optical elements further comprising front end optics, wherein:

said front end optics are positioned between said one or more input fiber ports and said one output fiber port, and said at least one shared wavelength dispersive element, and wherein said front end optics condition the input optical signals of said one or more input fiber ports with desirable properties for free-space propagating beams and condition the output optical signal for coupling into said output fiber port.

10. The optical switch of claim 1, wherein said one or more shared optical elements further comprising back end optics, wherein:

said back end optics are positioned between said at least one shared wavelength dispersive element and said one or more beam steering elements, and wherein said back end optics condition the input optical signals of said one or more input fiber ports with desirable properties for free-space propagating beams and condition the output optical signal for coupling into said output fiber port.

11. The optical switch of claim 1, wherein said one or more input fiber ports grouped as a first input fiber port instance of a plurality of instances utilizes said one or more shared optical elements and said at least one shared wavelength dispersive element to focus and disperse the optical signals of said one or more input fiber ports grouped as a first input fiber port instance of said plurality of instances.

12. The optical switch of claim 1, wherein said one output fiber port utilizes said one or more shared optical elements and at least one shared wavelength dispersive element to focus and recombine the output optical signal.

13. The optical switch of claim 1, wherein said plurality of instances of said one or more input fiber ports, said one or more beam steering elements, and said one or more arrayed input switching elements are configured based on manufacturing yield by optimizing the size of each said instance to enhance manufacturability.

14. The optical switch of claim 1, wherein said one or more beam steering elements are assembled for steering at least one wavelength from said one or more input fiber ports to one of said one or more arrayed input switching elements.

15. The optical switch of claim 1, wherein said one or more fixed mirrors are positioned between said one or more arrayed input switching elements and said array of output switching elements.

16. The optical switch of claim 1, wherein at least one fixed mirror of said one or more fixed mirrors is positioned in line with said one or more beam steering elements, wherein said at least one fixed mirror is further positioned between said first beam steering element instance and a second beam steering element instance of said plurality of instances.

17. The optical switch of claim 1, wherein a plurality of said one or more arrayed input switching element instances are positioned along an arc having said array of output switching elements at a center point of said arc.

18. The optical switch of claim 17, wherein said plurality of said one or more arrayed input switching element instances are positioned at pre-set angles facing towards said array of output switching elements.

19. The optical switch of claim 18, wherein said plurality of said one or more arrayed input switching element instances are further positioned along an arc having said array of output switching elements at a center point of said arc.

20. The optical switch of claim 1, further comprising at least one optical measurement device, coupled to said output fiber port for measuring at least one optical property of the output optical signal of said output fiber port.

21. The optical switch of claim 20, further comprising a tap for coupling a portion of said output fiber port optical signal to a first monitoring input fiber port.

22. The optical switch of claim 21, further comprising at least one monitoring switching element of an array of monitoring switching elements for receiving and selectively reflecting at least one selected monitoring wavelength from said first monitoring input fiber port to a monitoring output fiber port according to a position of said at least one monitoring switching element of an array of monitoring switching elements.

23. The optical switch of claim 22, wherein said monitoring output fiber port is coupled to said optical measurement device.

24. The optical switch of claim 23, wherein said optical measurement device measures at least one optical property of said at least one selected monitoring wavelength from said monitoring output fiber port.

25. The optical switch of claim 20, further comprising a controller for receiving an output from said optical measurement device and responsively adjusting at least one output switching element of said array of output switching elements to effect control of the optical signal of said one output fiber port.

26. The optical switch of claim 25, wherein said optical measurement device sequentially receives a plurality of at least one selected monitoring wavelength and sequentially measures at least one optical property of said plurality of at least one selected monitoring wavelength, and wherein said controller adjusts said position of said at least one output switching element of said array of output switching elements to effect control of the optical signal of said one output fiber port.

27. An optical system comprising two or more optical switches for switching one or more optical signals, the signals comprising one or more optical wavelengths, each optical wavelength constituting a work piece, each optical switch further comprising:
  one or more shared optical elements, wherein each said optical element focuses the optical signals of one or more input fiber ports and one output fiber port for each optical switch of said two or more optical switches;
  at least one shared wavelength dispersive element for spatially separating at least one first wavelength from one input optical signal of the one or more input optical signals from at least one other wavelength of the one input optical signal of the one or more input optical signals and for recombining at least one first wavelength of a selected input optical signal of the one or more input optical signals with at least one other wavelength of at least one other input optical signal of the one or more input optical signals to form the output optical signal, wherein said at least one shared wavelength dispersive element is utilized by each said optical switch of said two or more optical switches;
  each said optical switch comprising a plurality of instances for switching one or more optical signals, each said optical switch of said two or more optical switches further comprising:
  one or more input fiber ports grouped as a first fiber port instance of a plurality of instances, each said input fiber port serving as an external interface for introducing the one or more input optical signals into said optical switch;
  one output fiber port, said output fiber port serving as an external interface for extracting the output optical signal from said optical switch;
  one or more fixed mirrors, a first fixed mirror of said one or more fixed mirrors grouped as a first fixed mirror instance of said plurality of instances;
  one or more arrayed input switching elements, a first arrayed input switching element of said one or more arrayed input switching elements grouped as a first input switching element instance of said plurality of instances for receiving at least one wavelength from each of said one or more input fiber ports grouped as a first input fiber port instance of said plurality of instances and for switching the at least one selected wavelength from one of said one or more input fiber ports grouped as a first input fiber port instance of said plurality of instances to said first fixed mirror grouped as a first fixed mirror instance of said plurality of instances;
  one or more beam steering elements, a first beam steering element of said one or more beam steering elements grouped as a first beam steering element instance of said plurality of instances configured to position each wavelength from each of said one or more input fiber ports grouped as a first input fiber port instance of said plurality of instances onto a designated input switching element of said first arrayed input switching element grouped as a first input switching element instance of said plurality of instances;
  wherein said designated input switching element grouped as a first input switching element instance of said plurality of instances positions the at least one selected wavelength from one of said one or more input fiber ports grouped as a first input fiber port instance of said plurality of instances onto a designated output switching element of an array of output switching elements, via said first fixed mirror;

wherein at least one other said designated input switching element grouped as a second input switching element instance of said plurality of instances positions another at least one selected wavelength from one of said one or more input fiber ports grouped as a second input fiber port instance of said plurality of instances onto said designated output switching element of an array of output switching elements, via a second fixed mirror of said one or more fixed mirrors grouped as a second fixed mirror instance of said plurality of instances; and wherein said designated output switching element of an array of output switching elements switches at least one wavelength from one of said one or more input fiber ports grouped as said first input fiber port instance or said second input fiber port instance of said plurality of instances to said one output fiber port.

28. The optical switch of claim 27, wherein one input fiber port of said one or more input fiber ports grouped as said first input fiber port instance of said plurality of instances maps to a single beam steering element of said first beam steering element of said one or more beam steering elements grouped as a first beam steering instance of said plurality of instances for each of said two or more optical switches.

29. The optical system of claim 27, wherein based on a position of said designated input switching element grouped as a first input switching element instance of said plurality of instances and said designated switching element of an array of output switching elements, said one output fiber port receives the at least one wavelength from one of said one or more input fiber ports grouped as said first input fiber port instance or said second input fiber port instance of said plurality of instances for each of said two or more optical switches.

30. The optical system of claim 27, wherein said first beam steering element of said one or more beam steering elements grouped as a first beam steering element instance of said plurality of instances is configured to position each wavelength of said optical signal from one input fiber port of said one or more input fiber ports grouped as a first input fiber port instance onto separate switching elements of said first arrayed input switching element of said one or more arrayed input switching elements grouped as a first input switching element instance of said plurality of instances for each of said two or more optical switches.

31. The optical system of claim 27, wherein based on a position of one input switching element of said first arrayed input switching element of said one or more arrayed input switching elements grouped as a first input switching element instance of said plurality of instances and a position of one switching element of said array of output switching elements, the at least one selected wavelength is coupled from one of said one or more input fiber ports grouped as a first input fiber port instance of said plurality of instances to said one output fiber port for each of said two or more optical switches.

32. The optical system of claim 27, wherein based on a position of said designated input switching element grouped as a first input switching element instance and said at least one other said designated input switching element grouped as a second switching element instance of said plurality of instances, said designated switching element of an array of output switching elements receives the at least one wavelength from both said one or more input fiber ports grouped as said first input fiber port instance and said second input fiber port instance of said plurality of instances for each of said two or more optical switches.

33. The optical system of claim 32, wherein based on a position of said designated switching element of an array of output switching elements selects at least one wavelength from said one or more input fiber ports grouped as said first input fiber port instance or said second input fiber port instance of said plurality of instances and reflects said the at least one wavelength to said one output fiber port for each of said two or more optical switches.

34. The optical system of claim 27, wherein said shared elements are adapted to be utilized by each of said plurality of instances for each of said two or more optical switches.

35. The optical system of claim 27, wherein said one or more shared optical elements further comprising front end optics, wherein:

said front end optics are positioned between said one or more input fiber ports and said one output fiber port, and said at least one shared wavelength dispersive element, and wherein said front end optics condition the input optical signals of said one or more input fiber ports with desirable properties for free-space propagating beams and condition the output optical signal for coupling into said output fiber port for each of said two or more optical switches.

36. The optical system of claim 27, wherein said one or more shared optical elements further comprising back end optics, wherein:

said back end optics are positioned between said at least one shared wavelength dispersive element and said one or more beam steering elements, and wherein said back end optics condition the input optical signals of said one or more input fiber ports with desirable properties for free-space propagating beams and condition the output optical signal for coupling into said output fiber port for each of said two or more optical switches.

37. The optical system of claim 27, wherein said one or more input fiber ports grouped as a first input fiber port instance of a plurality of instances utilizes said one or more shared optical elements and said at least one shared wavelength dispersive element to focus and disperse the optical signals of said one or more input fiber ports grouped as a first input fiber port instance of said plurality of instances for each of said two or more optical switches.

38. The optical system claim 27, wherein said one output fiber port utilizes said one or more shared optical elements and at least one shared wavelength dispersive element to focus and recombine the output optical signal for each of said two or more optical switches.

39. The optical system claim 27, wherein said plurality of instances of said one or more input fiber ports, said one or more beam steering elements, and said one or more arrayed input switching elements are configured based on manufacturing yield by optimizing the size of each said instance to enhance manufacturability for each of said two or more optical switches.

40. The optical system claim 27, wherein said one or more beam steering elements are assembled for steering at least one wavelength from said one or more input fiber ports to one of said one or more arrayed input switching elements for each of said two or more optical switches.

41. The optical system claim 27, wherein said one or more fixed mirrors are positioned between said one or more arrayed input switching elements and said array of output switching elements for each of said two or more optical switches.

42. The optical system claim 27, wherein at least one fixed mirror of said one or more fixed mirrors is positioned in line with said one or more beam steering elements, wherein said at least one fixed mirror is further positioned between said first beam steering element instance and a second beam steering element instance of said plurality of instances for each of said two or more optical switches.

43. The optical system of claim 27, wherein a plurality of said one or more arrayed input switching element instances are positioned along an arc having said array of output switching elements at a center point of said arc for each of said two or more optical switches.

44. The optical system of claim 43, wherein said plurality of said one or more arrayed input switching element instances are positioned at pre-set angles facing towards said array of output switching elements for each of said two or more optical switches.

45. The optical system of claim 44, wherein said plurality of said one or more arrayed input switching element instances are further positioned along an arc having said array of output switching elements at a center point of said arc for each of said two or more optical switches.

46. The optical system of claim 27, further comprising at least one optical measurement device, coupled to said output fiber port for measuring at least one optical property of the output optical signal of said output fiber port, for at least one of said two or more optical switches.

47. The optical switch of claim 46, further comprising a tap for coupling a portion of said output fiber port optical signal to a first monitoring input fiber port, for at least one of said two or more optical switches.

48. The optical switch of claim 47, further comprising at least one monitoring switching element of an array of monitoring switching elements for receiving and selectively reflecting at least one selected monitoring wavelength from said first monitoring input fiber port to a monitoring output fiber port according to a position of said at least one monitoring switching element of an array of monitoring switching elements, for at least one of said two or more optical switches.

49. The optical switch of claim 48, wherein said monitoring output fiber port is coupled to said optical measurement device, for at least one of said two or more optical switches.

50. The optical switch of claim 49, wherein said optical measurement device measures at least one optical property of the at least one selected monitoring wavelength from said monitoring output fiber port, for at least one of said two or more optical switches.

51. The optical system of claim 27, wherein a first optical switch of said two or more optical switches further comprising one or more input fiber ports and one output fiber port, and wherein a second optical switch of said two or more optical switches is configured as one input fiber port and one or more output fiber ports.

52. The optical system of claim 51, wherein said one output fiber port of said first optical switch is coupled to said one input fiber port of said second optical switch resulting in a single N×M optical switch.

53. The optical system of claim 52, wherein at least one wavelength from said one or more input fiber ports of said first optical switch is switched to said one output fiber port of said first optical switch, and wherein said second optical switch further receives the at least one wavelength, via said couple, on said one input fiber port of said second optical switch, and the at least one wavelength is further switched to one of said one or more output fiber ports of said second optical switch.

54. The optical system of claim 53, wherein the at least one wavelength of any of said one or more input fiber ports of said first optical switch is switched to any one of said one or more output fiber ports of said second optical switch.

55. The optical system of claim 54, further comprising a controller wherein said controller controls the at least one wavelength switching route from one of said one or more input fiber ports of said first optical switch to any one of said one or more output fiber ports of said second optical switch.

56. The optical system of claim 27, further comprising at least one optical measurement device, coupled to said output fiber port of at least one optical switch of said two or more optical switches, for measuring at least one optical property of the output optical signal of said output fiber port.

57. An optical system comprising two or more optical switches for switching one or more optical signals, the signals comprising one or more optical wavelengths, each optical wavelength constituting a work piece, each optical switch further comprising:

one or more shared optical elements, wherein each said optical element focuses the optical signals for each optical switch of said two or more optical switches;

at least one shared wavelength dispersive element for spatially separating at least one first wavelength of at least one input optical signal from at least one other wavelength of the at least one input optical signal and for recombining at least one first wavelength of at least one output optical signal with at least one other wavelength of the at least one output optical signal; wherein said at least one shared wavelength dispersive element is utilized by each said optical switch of said two or more optical switches;

a first optical switch of said two or more optical switches comprising a plurality of instances for switching one or more optical signals further comprising:

one or more input fiber ports grouped as a first input fiber port instance of said plurality of instances, each said input fiber port serving as an external interface for introducing the one or more input optical signals into said optical switch;

one output fiber port, said output fiber port serving as an external interface for extracting the output optical signal from said optical switch;

one or more fixed mirrors, a first fixed mirror of said one or more fixed mirrors grouped as a first fixed mirror instance of said plurality of instances;

one or more arrayed input switching elements, a first arrayed input switching element of said one or more arrayed input switching elements grouped as a first input switching element instance of said plurality of instances for receiving at least one wavelength from each of said one or more input fiber ports grouped as a first input fiber port instance of said plurality of instances and for switching the at least one selected wavelength from one of said one or more input fiber ports grouped as a first input fiber port instance of said plurality of instances to said first fixed mirror grouped as a first fixed mirror instance of said plurality of instances;

one or more beam steering elements, a first beam steering element of said one or more beam steering elements grouped as a first beam steering element instance of said plurality of instances configured to position each wavelength from each of said one or more input fiber ports grouped as a first input fiber port instance of said plurality of instances onto a designated input switching element of said first arrayed input switching element grouped as a first input switching element instance of said plurality of instances;

a second optical switch of said two or more optical switches comprising two or more instances for switching one or more optical signals further comprising:

one input fiber port, said input fiber port serving as an external interface for introducing one input optical signal into said optical switch;

one or more output fiber ports grouped as a first output fiber port instance of a plurality of instances, each said output fiber port serving as an external interface for extracting the one or more output optical signals from said optical switch;

one or more fixed mirrors, a first fixed mirror of said one or more fixed mirrors grouped as a first fixed mirror instance of said plurality of instances;

one array of input switching elements for receiving each wavelength of said one input optical signal from said one input fiber port and for switching the at least one wavelength from said input fiber port to said first fixed mirror of said one or more fixed mirrors grouped as a first fixed mirror instance of said plurality of instances;

one or more arrayed output switching elements, a first arrayed output switching element of said one or more arrayed output switching elements grouped as a first output switching element instance of said plurality of instances for receiving the at least one wavelength from said first fixed mirror of said one or more fixed mirrors grouped as a first fixed mirror instance of said plurality of instances and for switching the at least one wavelength from said first fixed mirror of said one or more fixed mirrors grouped as a first fixed mirror instance of said plurality of instances to one selected output port of said one or more output fiber ports grouped as a first output fiber port instance of said plurality of instances;

one or more beam steering elements, a first beam steering element of said one or more beam steering elements grouped as a first beam steering element instance of said plurality of instances and configured to position each wavelength from said first arrayed output switching element of said one or more arrayed output switching elements grouped as a first output switching element instance of said plurality of instances to one selected output fiber port of said one or more output fiber ports grouped as a first output fiber port instance of said plurality of instances; and wherein one input switching element of said first arrayed input switching element of said one or more arrayed input switching elements grouped as a first input switching element instance of said plurality of instances and one output switching element of said array of output switching elements are configured to switch the at least one wavelength from one of said one or more input fiber ports grouped as a first input fiber port instance of said plurality of instances to said one output fiber port for said first optical switch of said two or more optical switches;

wherein one input switching element of said one array of input switching elements and one output switching element of said first arrayed output switching element of said one or more arrayed output switching elements grouped as a first output switching element instance are configured to switch the at least one wavelength from said one input fiber port to one selected output fiber port of said one or more output fiber ports grouped as said first output fiber port instance of said plurality of instances for said second optical switch of said two or more optical switches.

58. The optical system of claim 57, wherein said one output fiber port of said first optical switch of said two or more optical switches is coupled to said one input fiber port of said second optical switch of said two or more optical switches resulting in a single N×M optical switch.

59. The optical system of claim 58, wherein at least one wavelength from said one or more input fiber ports of said first optical switch of said two or more optical switches is switched to said one output fiber port of said first optical switch of said two or more optical switches, and wherein said second optical switch of said two or more optical switches further receives the at least one wavelength, via said couple, on said one input fiber port, and the at least one wavelength is further switched to one of said one or more output fiber ports of said second optical switch of said two or more optical switches.

60. The optical system of claim 59, wherein the at least one wavelength from any of said one or more input fiber ports of said first optical switch of said two or more optical switches is further switched to any one of said one or more output fiber ports of said second optical switch of said two or more optical switches.

61. The optical system of claim 59, further comprising a controller wherein said controller controls the at least one wavelength switching route from said one or more input fiber ports of said first optical switch of said two or more optical switches to any one of said one or more output fiber ports of said second optical switch of said two or more optical switches.

* * * * *